(12) United States Patent
Masuno et al.

(10) Patent No.: US 8,199,229 B2
(45) Date of Patent: Jun. 12, 2012

(54) COLOR FILTER, IMAGE PROCESSING APPARATUS, IMAGE PROCESSING METHOD, IMAGE-CAPTURE APPARATUS, IMAGE-CAPTURE METHOD, PROGRAM AND RECORDING MEDIUM

(75) Inventors: Tomonori Masuno, Tokyo (JP); Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 1299 days.

(21) Appl. No.: 11/833,688

(22) Filed: Aug. 3, 2007

(65) Prior Publication Data

US 2008/0030603 A1 Feb. 7, 2008

(30) Foreign Application Priority Data

Aug. 4, 2006 (JP) ................. P2006-213539

(51) Int. Cl.
*H04N 9/083* (2006.01)
(52) U.S. Cl. ......... 348/276; 348/273; 348/277; 348/278
(58) Field of Classification Search .................. 348/273, 348/276–278
See application file for complete search history.

(56) References Cited

U.S. PATENT DOCUMENTS 4,760,441 A * 7/1988 Kohno .................... 348/278

FOREIGN PATENT DOCUMENTS

JP 4-88784 3/1992
WO WO 2006019025 A1 * 2/2006

* cited by examiner

*Primary Examiner* — David Ometz
*Assistant Examiner* — Dillon Durnford Geszvain
(74) *Attorney, Agent, or Firm* — Finnegan, Henderson, Farabow, Garrett & Dunner, L.L.P.

(57) ABSTRACT

A color filter allows a light signal to pass through by each pixel and be incident on an imaging device. The light signal is inputted through a lens and including one of plural different spectral components. The plural different spectral components include a first spectral component which has a widest frequency bandwidth among the plural different spectral components, a second spectral component corresponding to a predetermined frequency band close to a frequency that causes no chromatic aberration of the lens, and a third spectral component expressed in terms of a linear sum of a value resulting from multiplying the first spectral component by a first weighting factor and a value resulting from multiplying the second spectral component by a second weighting factor.

7 Claims, 33 Drawing Sheets

FIG. 1
"Prior Art"

| R | G | R | G |
|---|---|---|---|
| G | B | G | B |
| R | G | R | G |
| G | B | G | B |

FIG. 2
"Prior Art"

| Y | G | Y | G |
|---|---|---|---|
| R | Y | B | Y |
| Y | G | Y | G |
| B | Y | R | Y |

FIG. 3
"Prior Art"
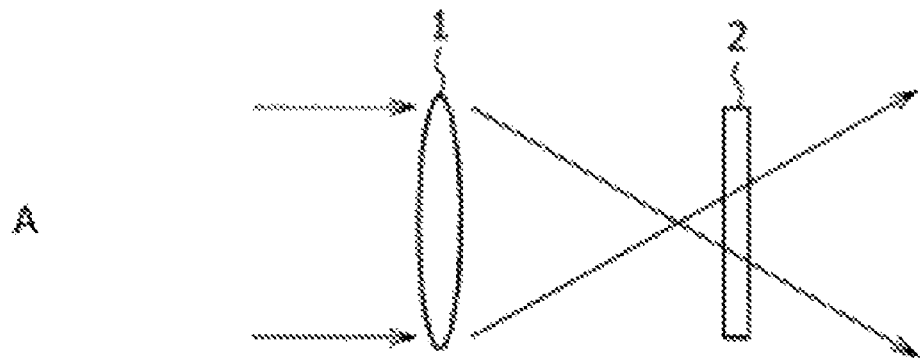
A
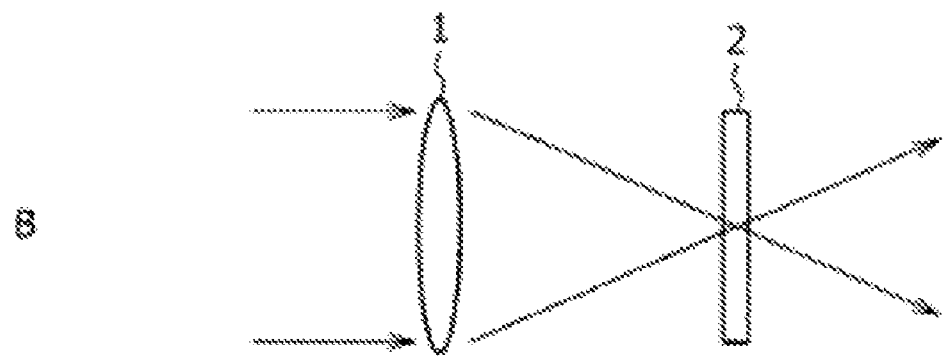
B
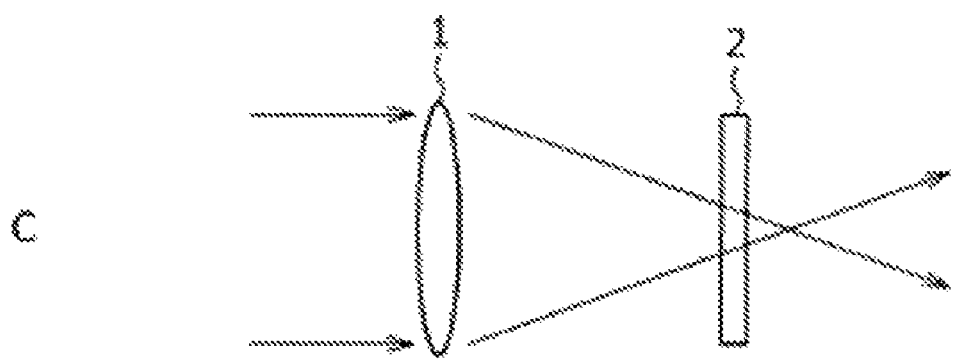
C

COLOR FILTER, IMAGE PROCESSING APPARATUS, IMAGE PROCESSING METHOD, IMAGE-CAPTURE APPARATUS, IMAGE-CAPTURE METHOD, PROGRAM AND RECORDING MEDIUM

BACKGROUND OF THE INVENTION

1. Field of the Invention

The present invention relates to a color filter, an image processing apparatus, an image processing method, an image-capture apparatus, an image-capture method, a program and a recording medium, and more particularly, to a color filter, an image processing apparatus, an image processing method, an image-capture apparatus, an image-capture method, a program and a recording medium, which allow to obtain chromatic aberration-cancelled and blur-free images.

2. Description of Related Art

In recent years, digital cameras are widely and commonly used. In the digital cameras, after an image signal, which is obtained using an imaging device (or an image sensor) such as CCDs and CMOSs through a lens, is digitized and then given appropriate image processing, a resultant image signal is recorded in a recording medium such as a flash memory or is directly transferred to an information processing apparatus such as a personal computer by means of cable connections, infrared communications, or the like. With respect to the information processing apparatus such as the personal computers, it is possible to display an image corresponding to the supplied image signal on a monitor such as CRTs (Cathode Ray Tubes) and liquid crystal displays.

An image sensor of a typical type widely used in related art is equipped with three types of color filters, R (red), G (green) and B (blue). Specifically, each pixel of the image sensor is configured for receiving only one of R (red), G (green) and B (blue) wavelength components. In other words, the image signal obtained using the image sensor includes a pixel group capable of acquiring a R (red) spectral component, a pixel group capable of acquiring a G (green) spectral component and a pixel group capable of acquiring a B (blue) spectral component. An example of color arrangement used in the color filter is shown in FIG. 1, being referred to as Bayer array.

If such an image-capture processing using the image sensor is to perform and a subject to be image-captured is in low brightness, i.e. the light amount obtained from the subject is insufficient, an output from the image sensor becomes small, and a resultant image signal is buried under noise, whereby the final output image also becomes an image containing much noise.

Accordingly, in the related art, a signal processing technology is used, which provides an image of high resolution using an imaging device having the color array shown in FIG. 2, or the Bayer array combining Y (white) serving as a luminance signal and R (red), G (green) and B (blue) (See Japanese Patent Application Publication Hei 04-88784, for instance). According to the technology of this type, assuming that Y pixels are arrayed in mosaic form as shown in FIG. 2 in a color filter array and that all the pixels are insensitive to infrared light, it is possible to achieve high resolution using the Y pixels included in pixels arrayed in mosaic form.

Specifically, according to the color filter array shown in FIG. 2, the Y pixels arrayed in mosaic form are sensitive to the substantially whole visible light, so that it is possible to obtain an image signal of higher intensity with respect to the same subject, as compared with the color filter array whose G (green) pixels are arrayed in mosaic form as shown in FIG. 1.

For that reason, the use of the color filter shown in FIG. 2 may increase S/N ratio of a signal that corresponds to the mosaic arrangement and controls the resolution, as compared with the use of the color filter whose G (green) pixels are arrayed in mosaic form as shown in FIG. 1.

SUMMARY OF THE INVENTION

A lens focuses incident light on the image sensor by taking advantage of a light refraction effect. Because of the use of the refraction effect, blur called chromatic aberration of the lens is produced depending on the wavelength of incident light. Typically, focusing is made with a lens position set up to ensure that a G (green) component is focused. Thus, an image taken in a focused state is an in-focus image in the G (green) component whereas a blur images in the components other than G (green).

The chromatic aberration is now described with reference to FIG. 3.

Specifically, with respect to an image sensor-mounted image-capture apparatus such as the digital cameras in the related art, a lens 1 and an image sensor 2 having a color filter are placed such that the incident light is focused on a position close to the image sensor 2 having the color filter, after being refracted by the lens 1.

Typically, the apparatus is configured such that a spectral component of G (green) is focused on a position of the image sensor 2. In this case, a spectral component of B (blue), which is shorter in wavelength than G (green), is focused on a position shifted from the image sensor 2 to the side of lens as shown in FIG. 3A. Furthermore, the spectral component of G (green) is focused on the image sensor 2 as shown in FIG. 3B. Furthermore, a spectral component of R (red), which is longer in wavelength than G (green), or the sum of spectral components of R (red) and IR (infrared) is focused on a position shifted from the image sensor 2 to the side opposite to the lens as shown in FIG. 3C. Accordingly, in the focused state as described the above, the components other than G (green) could not be focused exactly on the image sensor. In other words, the B (blue) component shorter in wavelength than G (green) and the R (red) component longer in wavelength than G (green) and/or the IR (infrared) component form a blur image on the image sensor.

To resolve the issue, it suffices to use a lens whose chromatic aberration is small. However, the lens of this type has a disadvantage of being expensive.

Accordingly, it is desirable to obtain an image while reducing noise and blur effect caused by chromatic aberration even under low luminance condition without using an expensive lens. The present invention has been undertaken in view of the above circumstances.

A color filter according to a first embodiment of the present invention is a color filter that allows a light signal to pass through by each pixel and be incident on an imaging device, the light signal being inputted through a lens and including one of plural different spectral components. The plural different spectral components includes a first spectral component having a widest frequency bandwidth among the plural different spectral components, a second spectral component corresponding to a predetermined frequency band close to a frequency that causes no chromatic aberration of the lens, and a third spectral component expressed in terms of a linear sum of a value resulting from multiplying the first spectral component by a first weighting factor and a value resulting from multiplying the second spectral component by a second weighting factor.

The first spectral component may include at least an infrared component.

The first spectral component may include an infrared component and all frequency bands of visible light.

The first spectral component may include all frequency bands of visible light.

The second spectral component may be a frequency component having a predetermined range that corresponds to a green component.

The third spectral component may be a spectral component resulted by excluding the second spectral component from the first spectral component.

The pixels corresponding to the second spectral component may be arranged in every other pixel in all of a 0-degree direction, a 45-degree direction, a 90-degree direction and a 135-degree direction assuming that one array direction of a plane, on which the pixels are arrayed, is set as the 0-degree direction.

The plural different spectral components are of five types of spectral components including the first spectral component, the second spectral component and the third spectral component, wherein the pixels corresponding to the first spectral component and the third spectral component and the pixels corresponding to a fourth spectral component and a fifth spectral component may be respectively arranged adjacent to the pixel corresponding to the second spectral component in one of a 0-degree direction, a 45-degree direction, a 90-degree direction and a 135-degree direction assuming that one array direction of a plane, on which the pixels are arrayed, is set as the 0-degree direction, and the pixels corresponding to the first spectral component and the third spectral component may be arrayed in a direction orthogonal to the pixel corresponding to the second spectral component, and the pixels corresponding to the fourth spectral component and the fifth spectral components may be arrayed in a direction orthogonal to the pixel corresponding to the second spectral component.

In the first embodiment of the present invention, the plural different spectral components with respect to the color filter may include a first spectral component having a widest frequency bandwidth among the plural different spectral components, a second spectral component corresponding to a predetermined frequency band close to a frequency that causes no chromatic aberration of the lens, and a third spectral component expressed in terms of a linear sum of a value resulting from multiplying the first spectral component by a first weighting factor and a value resulting from multiplying the second spectral component by a second weighting factor.

An image processing apparatus according to a second embodiment of the present invention is an image processing apparatus for receiving a light signal and generating image data based on the light signal for each pixel, the light signal being acquired by each pixel by inputting to a predetermined color filter through a lens and including one of plural different spectrum component. The apparatus includes contrast component operating means for operating a contrast component of the image data based on a first pixel value corresponding to the light signal on a predetermined pixel and a second pixel value resulting from interpolation processing performed using a pixel value of a pixel adjacent to the predetermined pixel. The contrast component operating means obtains the contrast component of the image data based on operational processing by the use of, between the first pixel value and the second pixel value, a pixel value corresponding to a first spectral component having a widest frequency bandwidth among the plural different spectral components, a pixel value corresponding to a second spectral component corresponding to a predetermined frequency band close to a frequency that causes no chromatic aberration of the lens, or a pixel value corresponding to a third spectral component expressed in terms of a linear sum of a value resulting from multiplying the first spectral component by a first weighting factor and a value resulting from multiplying the second spectral component by a second weighting factor.

The image data contrast component operated by the contrast component operating means may include a pixel value corresponding to the second spectral component.

The second spectral component may be a frequency component having a predetermined range that corresponds to a green component.

The contrast component operating means may include green component calculating means for calculating a pixel value of each pixel corresponding to a green component based on the first pixel value or the second pixel value, red component calculating means for calculating a pixel value of each pixel corresponding to a red component based on a pixel value corresponding to a predetermined frequency component corresponding to the red component among the plural different spectral components and a result of calculation by the green component calculating means, and blue component calculating means for calculating a pixel value of each pixel corresponding to a blue component based on a pixel value corresponding to a predetermined frequency component corresponding to the blue component among the plural different spectral components and the result of calculation by the green component calculating means.

The image processing apparatus may further include pattern direction estimating means for estimating a pattern direction in a vicinity of each pixel of the image data, wherein the contrast component operating means may operate the contrast component of the image data based on an estimation result in the pattern direction in the vicinity of each pixel by the pattern direction estimating means.

The image processing apparatus may further include pattern probability calculating means for calculating probability of having a pattern in each of a 0-degree direction, a 45-degree direction, a 90-degree direction and a 135-degree direction assuming that one array direction of a plane, on which the pixels are arrayed, is set as the 0-degree direction, wherein the pattern direction estimating means may estimate the pattern direction in the vicinity of each pixel of the image data based on a result of calculation by the pattern probability calculating means.

The pattern direction estimating means may decide, based on the result of calculation by the pattern probability calculating means, which direction has higher possibility of being close to the pattern direction in the vicinity of each pixel of the image data between the 0-degree direction or the 90-degree direction or between the 45-degree direction or the 135-degree direction.

The first spectral component may include at least an infrared component.

The first spectral component may include an infrared component and all frequency bands of visible light.

The first spectral component may include all frequency bands of visible light.

The third spectral component may be a spectral component resulted by excluding the second spectral component from the first spectral component.

The pixels corresponding to the second spectral component may be arranged in every other pixel in all of a 0-degree direction, a 45-degree direction, a 90-degree direction and a 135-degree direction assuming that one array direction of a plane, on which the pixels are arrayed, is set as the 0-degree direction.

The plural different spectral components are of five types of spectral components including the first spectral component, the second spectral component and the third spectral component, wherein the pixels corresponding to the first spectral component and the third spectral component and the pixels corresponding to a fourth spectral component and a fifth spectral component may be respectively arranged adjacent to the pixel corresponding to the second spectral component in one of a 0-degree direction, a 45-degree direction, a 90-degree direction and a 135-degree direction assuming that one array direction of a plane, on which the pixels are arrayed, is set as the 0-degree direction, and the pixels corresponding to the first spectral component and the third spectral component may be arrayed in a direction orthogonal to the pixel corresponding to the second spectral component, and the pixels corresponding to the fourth spectral component and the fifth spectral component may be arrayed in a direction orthogonal to the pixel corresponding to the second spectral component.

An image processing method according to the second embodiment of the present invention is an image processing method for an image processing apparatus for receiving a light signal and generating image data based on the light signal for each pixel, the light signal being acquired by each pixel by inputting to a predetermined color filter through a lens and including one of plural different spectrum component. The method includes: acquiring a first pixel value corresponding to the light signal on a predetermined pixel; acquiring a second pixel value by performing interpolation processing using a pixel value of a pixel adjacent to the predetermined pixel; and obtaining a contrast component of the image data based on operational processing by using, between the first pixel value and the second pixel value, a pixel value corresponding to a first spectral component having a widest frequency bandwidth among the plural different spectral components, a pixel value corresponding to a second spectral component corresponding to a predetermined frequency band close to a frequency that causes no chromatic aberration of the lens, or a pixel value corresponding to a third spectral component expressed in terms of a linear sum of a value resulting from multiplying the first spectral component by a first weighting factor and a value resulting from multiplying the second spectral component by a second weighting factor.

A program according to the second embodiment of the present invention is a program is a program executable by a computer for controlling processing of capturing an image and causing the computer to perform the processing including the steps of: controlling an operation to acquire a light signal, which is to be obtained, upon receipt of light inputted via a lens, as plural different spectral components for each pixel through a predetermined color filter; controlling an operation to covert the acquired light signal into a digital signal; controlling an operation to acquire a first pixel value corresponding to the light signal on a predetermined pixel from the converted digital signal; calculating a second pixel value by performing interpolation processing using a pixel value of a pixel adjacent to the predetermined pixel; obtaining a contrast component of the image data based on operational processing by using, between the first pixel value and the second pixel value, a pixel value corresponding to a first spectral component having a widest frequency bandwidth among the plural different spectral components, a pixel value corresponding to a predetermined frequency band close to a frequency that causes no chromatic aberration of the lens, or a pixel value corresponding to a third spectral component expressed in terms of a linear sum of a value resulting from multiplying the first spectral component by a first weighting factor and a value resulting from multiplying the second spectral component by a second weighting factor.

In the second embodiment of the present invention, a first pixel value corresponding to a light signal on a predetermined pixel is acquired, a second pixel value is acquired by performing interpolation processing using a pixel value of a pixel adjacent to the predetermined pixel, and a contrast component of image data is obtained based on operational processing by the use of, between the first pixel value and the second pixel value, a pixel value corresponding to a first spectral component having a widest frequency bandwidth among plural different spectral components, a pixel value corresponding to a second spectral component corresponding to a predetermined frequency band close to a frequency that causes no chromatic aberration of the lens, or a pixel value corresponding to a third spectral component expressed in terms of a linear sum of a value resulting from multiplying the first spectral component by a first weighting factor and a value resulting from multiplying the second spectral component by a second weighting factor.

An image-capture apparatus according to a third embodiment of the present invention relates to an image-capture apparatus for capturing an image. The apparatus includes: light signal acquiring means for acquiring, for each pixel through a predetermined color filter, light inputted via a lens as an light signal having plural different spectral components; converting means for converting the light signal acquired by the light signal acquiring means into a digital signal; and image processing means for processing the digital signal converted by the converting means to generate image data in which a set of pixel values respectively corresponding to predetermined plural color components is determined for all pixels with respect to all the pixels. The image processing means includes contrast component operating means for operating a contrast component of the image data based on a first pixel value corresponding to the light signal on a predetermined pixel, and a second pixel value resulting from interpolation processing performed using a pixel value of a pixel adjacent to the predetermined pixel. The contrast component operating means obtains the contrast component of the image data based on operational processing by the use of, between the first pixel value and the second pixel value, a pixel value corresponding to a first spectral component having a widest frequency bandwidth among the plural different spectral components, a pixel value corresponding to a second spectral component corresponding to a predetermined frequency band close to a frequency that causes no chromatic aberration of the lens, or a pixel value corresponding to a third spectral component expressed in terms of a linear sum of a value resulting from multiplying the first spectral component by a first weighting factor and a value resulting from multiplying the second spectral component by a second weighting factor.

The image data contrast component operated by the contrast component operating means may include a pixel value corresponding to the second spectral component.

The second spectral component may be a frequency component having a predetermined range that corresponds to a green component.

The contrast component operating means may include green component calculating means for calculating a pixel value of each pixel corresponding to a green component based on the first pixel value or the second pixel value, red component calculating means for calculating a pixel value of each pixel corresponding to a red component based on a pixel value corresponding to a predetermined frequency component corresponding to the red component among the plural different spectral components and a result of calculation by the green component calculating means, and blue component calculating means for calculating a pixel value of each pixel corresponding to a blue component based on a pixel value corresponding to a predetermined frequency corresponding to the blue component among the plural different spectral components and the result of calculation by the green component calculating means.

The image processing means may further include pattern direction estimating means for estimating a pattern direction in the vicinity of each pixel of the image data, wherein the contrast component operating means may operate the contrast component of the image data based on an estimation result of the pattern direction in the vicinity of each pixel by the pattern direction estimating means.

The image processing means may further include pattern probability calculating means for calculating probability of having a pattern in each of a 0-degree direction, a 45-degree direction, a 90-degree direction and a 135-degree direction assuming that one array direction of a plane, on which the pixels are arrayed, is set as the 0-degree direction, wherein the pattern direction estimating means may estimate the pattern direction in the vicinity of each pixel of the image data based on a result of calculation by the pattern probability calculating means.

The pattern direction estimating means may decide, based on the result of calculation by the pattern probability calculating means, which direction has higher possibility of being close to the pattern direction in the vicinity of each pixel of the image data between the 0-degree direction or the 90-degree direction or between the 45-degree direction or the 135-degree direction.

The first spectral component may include at least an infrared component.

The first spectral component may include an infrared component and all frequency bands of visible light.

The first spectral component may include all frequency bands of visible light.

The third spectral component may be a spectral component resulted by excluding the second spectral component from the first spectral component.

The pixels corresponding to the second spectral component may be arranged in every other pixel in all of a 0-degree direction, a 45-degree direction, a 90-degree direction and a 135-degree direction assuming that one array direction of a plane, on which the pixels are arrayed, is set as the 0-degree direction.

The plural different spectral components are of five types of spectral components including the first spectral component, the second spectral component and the third spectral component, wherein the pixels corresponding to the first spectral component and the third spectral component and the pixels corresponding to a fourth spectral component and a fifth spectral component may be respectively arranged adjacent to the pixel corresponding to the second spectral component in one of a 0-degree direction, a 45-degree direction, a 90-degree direction and a 135-degree direction assuming that one array direction of a plane, on which the pixels are arrayed, is set as the 0-degree direction, and the pixels corresponding to the first spectral component and the third spectral component may be arrayed in a direction orthogonal to the pixel corresponding to the second spectral component, and the pixels corresponding to the fourth spectral component and the fifth spectral component may be arrayed in a direction orthogonal to the pixel corresponding to the second spectral component.

An image-capture method according to the third embodiment of the present invention is an image-capture method for an image-capture apparatus for capturing an image. The method includes: acquiring, for each pixel through a predetermined color filter, light inputted via a lens as a light signal having plural different spectral components; converting the acquired light signal into a digital signal; acquiring a first pixel value corresponding to the light signal on a predetermined pixel from the converted digital signal; acquiring a second pixel value by performing interpolation processing using a pixel value of a pixel adjacent to the predetermined pixel; obtaining a contrast component of the image data based on operational processing by using, between the first pixel value and the second pixel value, a pixel value corresponding to a first spectral component having a widest frequency bandwidth among the plural different spectral components, a pixel value corresponding to a second spectral component corresponding to a predetermined frequency band close to a frequency that causes no chromatic aberration of the lens, or a pixel value corresponding to a third spectral component expressed in terms of a linear sum of a value resulting from multiplying the first spectral component by a first weighting factor and a value resulting from multiplying the second spectral component by a second weighting factor.

A program according to the third embodiment of the present invention is a program executable by a computer for controlling processing of capturing an image and causing the computer to perform the processing including the steps of: controlling an operation to acquire a light signal, which is to be obtained, upon receipt of light inputted via a lens, as plural different spectral components for each pixel through a predetermined color filter; controlling an operation to covert the acquired light signal into a digital signal; controlling an operation to acquire a first pixel value corresponding to the light signal on a predetermined pixel from the converted digital signal; calculating a second pixel value by performing interpolation processing using a pixel value of a pixel adjacent to the predetermined pixel; obtaining a contrast component of the image data based on operational processing by using, between the first pixel value and the second pixel value, a pixel value corresponding to a first spectral component having a widest frequency bandwidth among the plural different spectral components, a pixel value corresponding to a predetermined frequency band close to a frequency that causes no chromatic aberration of the lens, or a pixel value corresponding to a third spectral component expressed in terms of a linear sum of a value resulting from multiplying the first spectral component by a first weighting factor and a value resulting from multiplying the second spectral component by a second weighting factor.

In the third embodiment of the present invention, an light signal, upon receipt of light inputted via a lens, as plural different spectral components for each pixel through a predetermined color filter is acquired. The acquired light signal is converted into a digital signal. A first pixel value corresponding to the light signal on a predetermined pixel is acquired from the converted digital signal, a second pixel value is calculated through interpolation processing performed using a pixel value of a pixel adjacent to the predetermined pixel, and a contrast component of image data is obtained based on operational processing by the use of, between the first pixel value and the second pixel value, a pixel value corresponding to a first spectral component having a widest frequency bandwidth among the plural different spectral components, a pixel value corresponding to a second spectral component corresponding to a predetermined frequency band close to a frequency that causes no chromatic aberration of the lens, or a pixel value corresponding to a third spectral component expressed in terms of a linear sum of a value resulting from multiplying the first spectral component by a first weighting factor and a value resulting from multiplying the second spectral component by a second weighting factor.

The image-capture apparatus may be in form of an independent apparatus or a block responsible for the image-capture processing of the information processing apparatus.

As described the above, according to the first embodiment of the present invention, it is possible to provide a predetermined mosaic image. Specifically, with respect to image processing adapted to process the image data acquired using the color filter of the present invention, it is possible to realize chromatic aberration-cancelled demosaic processing using the pixel value of the pixel having the wider frequency-band spectral component, as compared with the related art.

According to the second embodiment of the present invention, it is possible to obtain the contrast component. Specifically, it is possible to perform chromatic aberration-cancelled demosaic processing using the pixel value of the pixel having the wider frequency-band spectral component, as compared with the related art.

According to the third embodiment of the present invention, it is possible to capture the image. Specifically, with respect to demosaic processing, it is possible to provide chromatic aberration-cancelled image data using the pixel value of the pixel having the wider frequency-band spectral component, as compared with the related art.

BRIEF DESCRIPTION OF THE DRAWINGS

FIG. 1 illustrates a color filter array in related art;

FIG. 2 illustrates a different type of color filter array in related art;

FIG. 3 illustrates chromatic aberration;

DETAILED DESCRIPTION OF EMBODIMENTS

Figure 4:
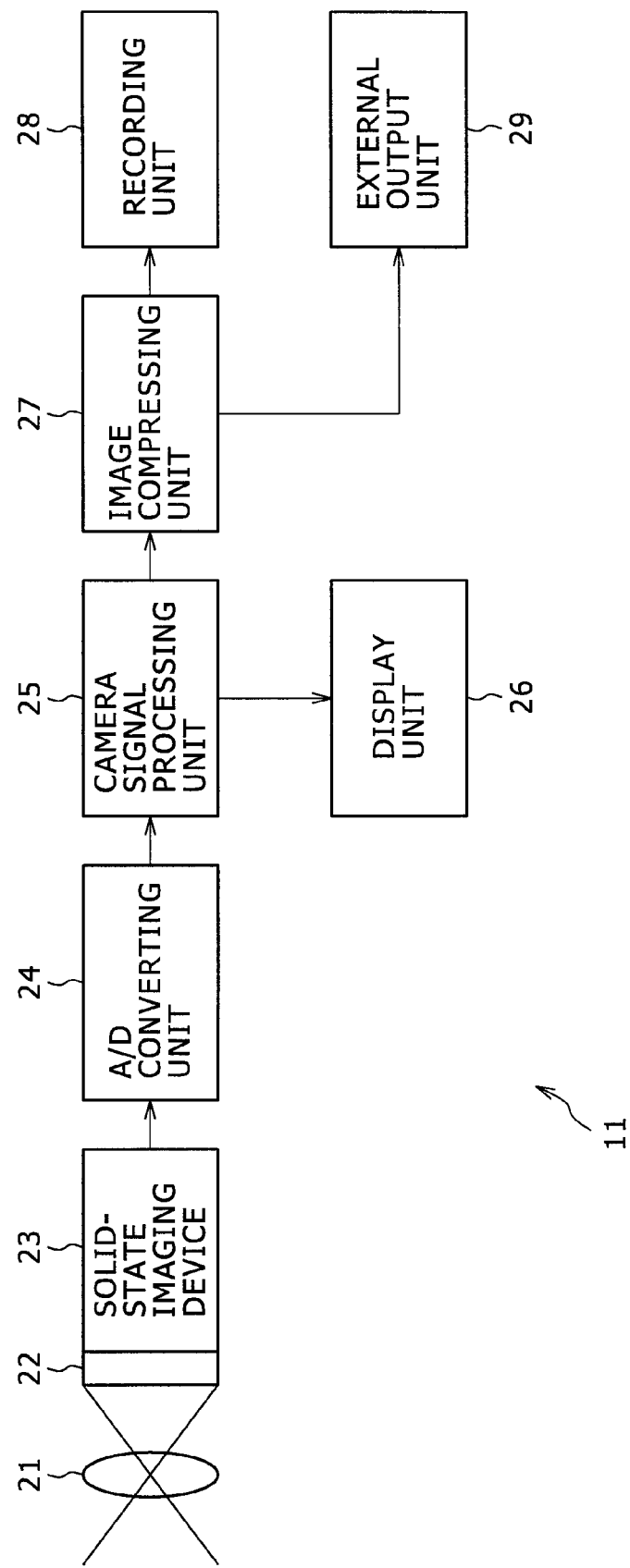
FIG. 4 is a block diagram showing a configuration of an image-capture apparatus.

An embodiment of the present invention is now described, where one illustration of a correspondence relation between constituting elements of the present invention and embodiments contained in the present specification or the drawings is given as follows. This is to make certain that the first embodiments supporting the present invention are contained in the present specification or the drawings. Thus, even if there are any other embodiments, which are not set forth in this section as those corresponding to the constituting elements of the present invention, but contained in the present specification or the drawings, this should not be interpreted as that the other embodiments are recognized to be not those corresponding to the constituting elements. Conversely, even if embodiments set forth in this section are given as those corresponding to the constituting elements, this should not be interpreted, too, as that the first embodiments are recognized to be those having no correspondence to constituting elements that are not described therein.

A color filter according to a first embodiment of the present invention is a color filter (a color filter 22 in FIG. 4, for instance) which allows a light signal to pass through by each pixel and be incident on an imaging device, the light signal being inputted through a lens and including one of plural different spectral components. The plural different spectral components includes a first spectral component (a spectral component corresponding to W, for instance) that has a widest frequency bandwidth among the plural different spectral components, a second spectral component (a spectral component corresponding to G, for instance) corresponding to a predetermined frequency band close to a frequency that causes no chromatic aberration of the lens, and a third spectral component (a spectral component corresponding to M, for instance) expressed in terms of a linear sum of a value resulting from multiplying the first spectral component by a first weighting factor and a value resulting from multiplying the second spectral component by a second weighting factor.

The plural different spectral components are of five types of spectral components including the first spectral component, the second spectral component and the third spectral component, wherein the pixels corresponding to the first spectral component and the third spectral component and the pixels corresponding to a fourth spectral component (a spectral component corresponding to R, for instance) and a fifth spectral component (a spectral component corresponding to B, for instance) may be respectively arranged adjacent to the pixel corresponding to the second spectral component in one of a 0-degree direction, a 45-degree direction, a 90-degree direction and a 135-degree direction assuming that one array direction of a plane, on which the pixels are arrayed, is set as the 0-degree direction, and the pixels corresponding to the first spectral component and the third spectral component may be arrayed in a direction orthogonal to the pixel corresponding to the second spectral component, and the pixels corresponding to the fourth spectral component and the fifth spectral component may be arrayed in a direction orthogonal to the pixel corresponding to the second spectral component.

An image processing apparatus according to a second embodiment of the present invention is an image processing apparatus (a demosaic processing unit 44 in FIG. 10 or a camera signal processing unit 25 in FIG. 8, for instance) for receiving a light signal and generating image data based on the light signal for each pixel, the light signal being acquired by each pixel by inputting to a predetermined color filter through a lens and including one of plural different spectrum component. The apparatus includes contrast component operating means (a 0-degree direction-interpolated G component image calculation processing unit 71, a 45-degree direction-interpolated G component image calculation processing unit 72, a 90-degree direction-interpolated G component image calculation processing unit 73, a 135-degree direction-interpolated G component image calculation processing unit 74 and a G component image calculation processing unit 75, or a R component image calculation processing unit 81 or a B component image calculation processing unit 82 in FIG. 10, for instance) for operating a contrast component of the image data based on a first pixel value corresponding to the light signal on a predetermined pixel, and a second pixel value resulting from interpolation processing performed using a pixel value of a pixel adjacent to the predetermined pixel. The contrast component operating means obtains the contrast component of the image data based on operational processing by the use of, between the first pixel value and the second pixel value, a pixel value corresponding to a first spectral component (the spectral component corresponding to W, for instance) having a widest frequency bandwidth among the plural different spectral components, a pixel value corresponding to a second spectral component (the spectral component corresponding to G, for instance) corresponding to a predetermined frequency band close to a frequency that causes no chromatic aberration of the lens, or a pixel value corresponding to a third spectral component (the spectral component corresponding to M, for instance) expressed in terms of a linear sum of a value resulting from multiplying the first spectral component by a first weighting factor and a value resulting from multiplying the second spectral component (the spectral component corresponding to G, for instance) by a second weighting factor.

The contrast component operating means may include green component calculating means (the G component image calculation processing unit 75 in FIG. 10, for instance) for calculating a pixel value of each pixel corresponding to a green component based on the first pixel value or the second pixel value, red component calculating means (the R component image calculation processing unit 81 in FIG. 10, for instance) for calculating a pixel value of each pixel corresponding to a red component based on a pixel value corresponding to a predetermined frequency component corresponding to the red component among the plural different spectral components and a result of calculation by the green component calculating means, and blue component calculating means (the B component image calculation processing unit 82 in FIG. 10, for instance) for calculating a pixel value of each pixel corresponding to a blue component based on a pixel value corresponding to a predetermined frequency component corresponding to the blue component among the plural different spectral components and the result of calculation by the green component calculating means.

The image processing apparatus may further include pattern direction estimating means (a pattern direction determination unit 65 in FIG. 10, for instance) for estimating a pattern direction in the vicinity of each pixel of the image data, wherein the contrast component operating means may operate the contrast component of the image data based on an estimation result in the pattern direction in the vicinity of each pixel by the pattern direction estimating means.

Figure 10:
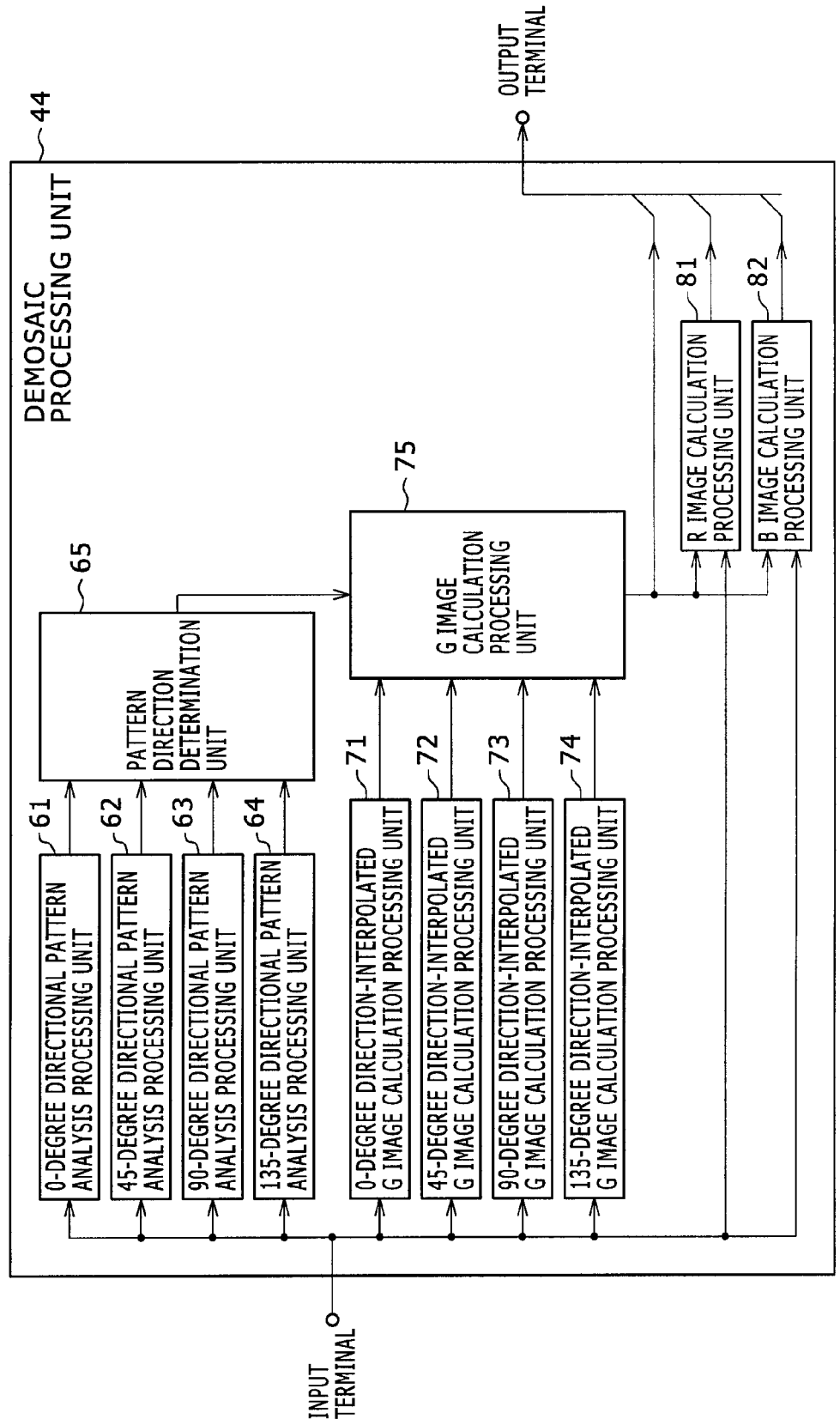
FIG. 10 is a block diagram showing a configuration of a demosaic processing unit shown in FIG. 8.

The image processing apparatus may further include pattern probability calculating means (a 0-degree directional pattern analysis processing unit 51, a 45-degree directional pattern analysis processing unit 52, a 90-degree directional pattern analysis processing unit 53 and a 135-degree directional pattern analysis processing unit 54 in FIG. 10, for instance) for calculating probability of having a pattern in each of a 0-degree direction, a 45-degree direction, a 90-degree direction and a 135-degree direction assuming that one array direction of a plane, on which the pixels are arrayed, is set as the 0-degree direction. The pattern direction estimating means may estimate the pattern direction in the vicinity of each pixel of the image data based on a result of calculation by the pattern probability calculating means.

The plural different spectral components are of five types of spectral components including the first spectral component, the second spectral component and the third spectral component, wherein the pixels corresponding to the first spectral component and the third spectral component and the pixels corresponding to a fourth spectral component (the spectral component corresponding to R, for instance) and a fifth spectral component (the spectral component corresponding to B, for instance) may be respectively arranged adjacent to the pixel corresponding to the second spectral component in one of a 0-degree direction, a 45-degree direction, a 90-degree direction and a 135-degree direction assuming that one array direction of a plane, on which the pixels are arrayed, is set as the 0-degree direction, and the pixels corresponding to the first spectral component and the third spectral component may be arrayed in a direction orthogonal to the pixel corresponding to the second spectral component, and the pixels corresponding to the fourth spectral component and the fifth spectral component may be arrayed in a direction orthogonal to the pixel corresponding to the second spectral component.

An image processing method according to the second embodiment of the present invention is an image processing method applied to an image processing apparatus (the demosaic processing unit 44 in FIG. 10 or the camera signal processing unit 25 in FIG. 8, for instance) for receiving a light signal and generating image data based on the light signal for each pixel, the light signal being acquired by each pixel by inputting to a predetermined color filter through a lens and including one of plural different spectrum component. The method includes: acquiring a first pixel value corresponding to the light signal on a predetermined pixel (processing of Step S41 in FIG. 12, for instance); acquiring a second pixel value by performing interpolation processing using a pixel value of a pixel adjacent to the predetermined pixel (processing of Steps such as those S244, 246 and 249 in FIG. 24, or the same processing as those in FIGS. 26, 27 and 29, for instance); obtaining a contrast component of the image data based on operational processing by the use of, between the first pixel value and the second pixel value, a pixel value corresponding to a first spectral component (the spectral component corresponding to W, for instance) having a widest frequency bandwidth among the plural different spectral components, a pixel value corresponding to a second spectral component (the spectral component corresponding to G, for instance) corresponding to a predetermined frequency band close to a frequency that causes no chromatic aberration of the lens, or a pixel value corresponding to a third spectral component (the spectral component corresponding to M, for instance) expressed in terms of a linear sum of a value resulting from multiplying the first spectral component by a first weighting factor and a value resulting from multiplying the second spectral component (the spectral component corresponding tog, for instance) by a second weighting factor (processing in FIG. 24 or those in FIGS. 26, 27, 29, 30 and 32, for instance).

A program according to the second embodiment of the present invention is a program executable by a computer for controlling processing of receiving a light signal and generating image data based on the light signal for each pixel, the light signal being acquired by each pixel by inputting to a predetermined color filter through a lens and including one of plural different spectrum component. The program causes the computer to perform processing including the steps of: controlling an operation to acquire a first pixel value corresponding to the light signal on a predetermined pixel (processing of Step S41 in FIG. 12, for instance); calculating a second pixel value by performing interpolation processing using a pixel value of a pixel adjacent to the predetermined pixel (processing of Steps such as those S244, S246 and S249 in FIG. 24 or the same processing as those in FIGS. 26, 27 and 29, for instance); and obtaining a contrast component of the image data based on operational processing by the use of, between the first pixel value and the second pixel value, a pixel value corresponding to a first spectral component (the spectral component corresponding to W, for instance) having a widest frequency bandwidth among the plural different spectral components, a pixel value corresponding to a second spectral component (the spectral component corresponding to G, for instance) corresponding to a predetermined frequency band close to a frequency that causes no chromatic aberration of the lens, or a pixel value corresponding to a third spectral component (the spectral component corresponding to M, for instance) expressed in terms of a linear sum of a value resulting from multiplying the first spectral component by a first weighting factor and a value resulting from multiplying the second spectral component (the spectral component corresponding to G, for instance) by a second weighting factor (processing in FIG. 24 or those in FIGS. 26, 27, 29, 30 and 31, for instance).

An image-capture apparatus according to a third embodiment of the present invention is an image-capture apparatus (an image-capture apparatus 11 in FIG. 4, for instance) for capturing an image, and includes light signal acquiring means (a solid-state imaging device 23 in FIG. 4, for instance) for acquiring, for each pixel through a predetermined color filter (a color filter 22 in FIG. 4, for instance), light inputted via a lens (a lens 21 in FIG. 4, for instance) as a light signal having plural different spectral components, converting means (a A/D converting unit 24 in FIG. 4, for instance) for converting the light signal acquired by the light signal acquiring means into a digital signal, and image processing means (the demosaic processing unit 44 in FIG. 10 or the camera signal processing unit 25 in FIG. 8, for instance) for processing the digital signal converted by the converting means to generate image data in which a set of pixel values respectively corresponding to predetermined plural color components is determined for all pixels with respect to all the pixels. The image processing means includes contrast component operating means (the 0-degree direction-interpolated G component image calculation processing unit 71, the 45-degree direction-interpolated G component image calculation processing unit 72, the 90-degree direction-interpolated G component image calculation processing unit 73, the 135-degree direction-interpolated G component image calculation processing unit 74 and the G component image calculation processing unit 75 or the R component image calculation processing unit 81 or the B component image calculation processing unit 82 in FIG. 10, for instance) for operating a contrast component of the image data based on a first pixel value corresponding to the light signal on a predetermined pixel, and a second pixel value resulting from interpolation processing performed using a pixel value of a pixel adjacent to the predetermined pixel. The contrast component operating means obtains the contrast component of the image data based on operational processing by the use of, between the first pixel value and the second pixel value, a pixel value corresponding to a first spectral component (the spectral component corresponding to W, for instance) having a widest frequency bandwidth among the plural different spectral components, a pixel value corresponding to a second spectral component (the spectral component corresponding to G, for instance) corresponding to a predetermined frequency band close to a frequency that causes no chromatic aberration of the lens, or a pixel value corresponding to a third spectral component (the spectral component corresponding to M, for instance) expressed in terms of a linear sum of a value resulting from multiplying the first spectral component by a first weighting factor and a value resulting from multiplying the second spectral component (the spectral component corresponding to G, for instance) by a second weighting factor.

The contrast component operating means may include green component calculating means (the G component image calculation processing unit 75 in FIG. 10, for instance) for calculating a pixel value of each pixel corresponding to a green component based on the first pixel value or the second pixel value, red component calculating means (the R component image calculation processing unit 81 in FIG. 10, for instance) for calculating a pixel value of each pixel corresponding to a red component based on a pixel value corresponding to a predetermined frequency component corresponding to the red component among the plural different spectral components and a result of calculation by the green component calculating means, and blue component calculating means (the B component image calculation processing unit 82 in FIG. 10, for instance) for calculating a pixel value of each pixel corresponding to a blue component based on a pixel value corresponding to a predetermined frequency component corresponding to the blue component among the plural different spectral components and the result of calculation by the green component calculating means.

The image processing means may further include pattern direction estimating means (the pattern direction determination unit 65 in FIG. 10, for instance) for estimating a pattern direction in the vicinity of each pixel of the image data, wherein the contrast component operating means may operate the contrast component of the image data based on an estimation result of the pattern direction in the vicinity of each pixel by the pattern direction estimating means.

The image processing means may further include pattern probability calculating means (the 0-degree directional pattern analysis processing unit 51, the 45-degree directional pattern analysis processing unit 52, the 90-degree directional pattern analysis processing unit 53 and the 135-degree directional pattern analysis processing unit 54 in FIG. 10, for instance) for calculating probability of having a pattern in each of a 0-degree direction, a 45-degree direction, a 90-degree direction and a 135-degree direction assuming that one array direction of a plane, on which the pixels are arrayed, is set as the 0-degree direction, wherein the pattern direction estimating means may estimate the pattern direction in the vicinity of each pixel of the image data based on a result of calculation by the pattern probability calculating means.

The plural different spectral components are of five types of spectral components including the first spectral component, the second spectral component and the third spectral component, wherein the pixels corresponding to the first spectral component and the third spectral component and the pixels corresponding to a fourth spectral component (the spectral component corresponding to R, for instance) and a fifth spectral component (the spectral component corresponding to B, for instance) may be respectively arranged adjacent to the pixel corresponding to the second spectral component in one of a 0-degree direction, a 45-degree direction, a 90-degree direction and a 135-degree direction assuming that one array direction of a plane, on which the pixels are arrayed, is set as the 0-degree direction, and the pixels corresponding to the first spectral component and the third spectral component may be arrayed in a direction orthogonal to the pixel corresponding to the second spectral component, and the pixels corresponding to the fourth spectral component and the fifth spectral component may be arrayed in a direction orthogonal to the pixel corresponding to the second spectral component.

Figure 24:
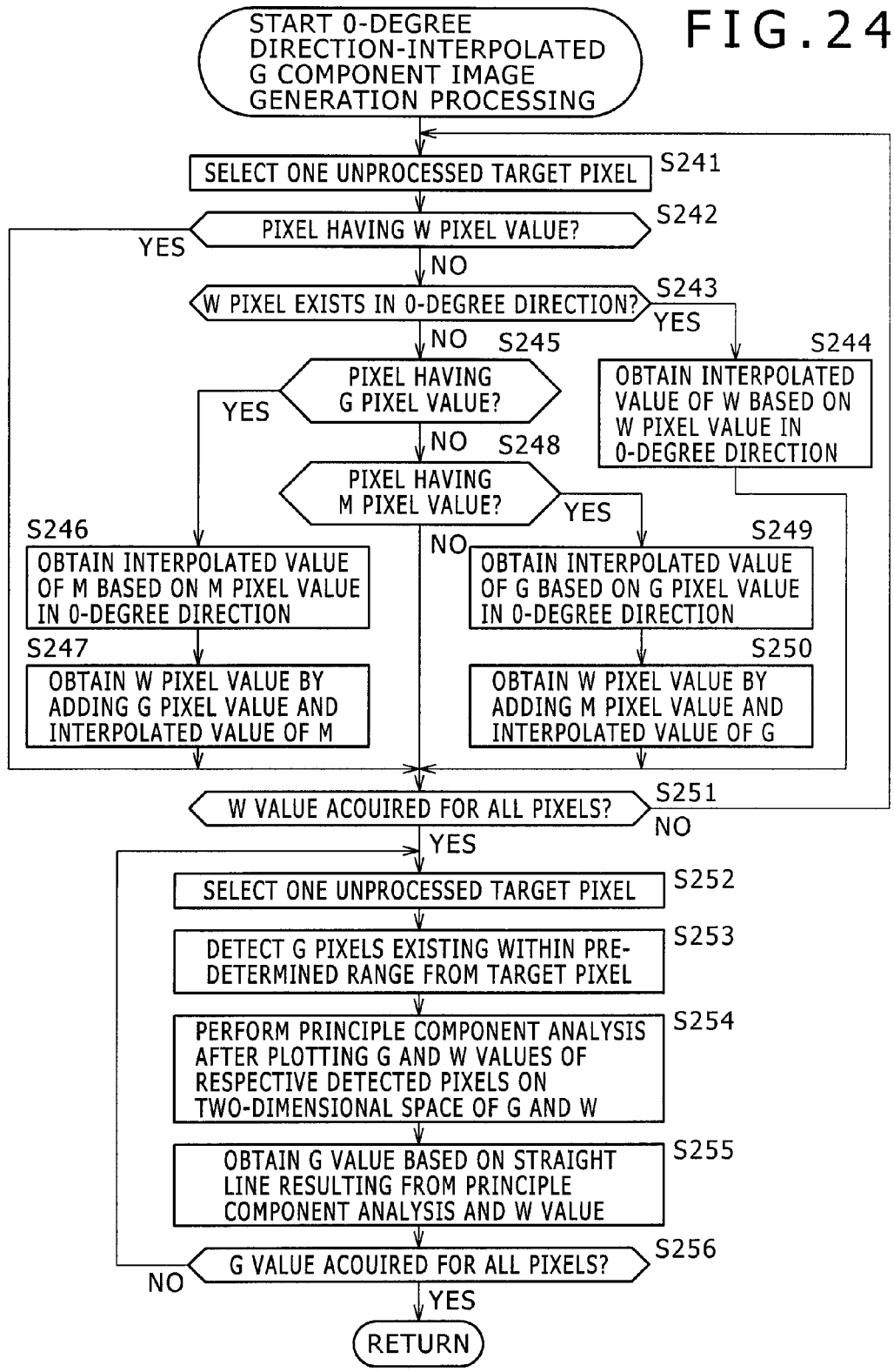
FIG. 24 is a flowchart illustrating 0-degree direction-interpolated G component image generation processing.

An image-capture method according to the third embodiment of the present invention is an image-capture method for an image-capture apparatus (the image-capture apparatus 11 in FIG. 4, for instance) for capturing an image, and includes: acquiring, for each pixel through a predetermined color filter (the color filter 22 in FIG. 4, for instance), light inputted via a lens (the lens 21 in FIG. 4, for instance) as a light signal having plural different spectral components (processing of Step S1 in FIG. 11, for instance); converting the acquired light signal into a digital signal (processing of Step S2 in FIG. 11, for instance); acquiring, from the converted digital signal, a first pixel value corresponding to the light signal on a predetermined pixel (processing of Step S41 in FIG. 12, for instance); acquiring a second pixel value by performing interpolation processing using a pixel value of a pixel adjacent to the predetermined pixel (processing of Steps such as those S244, S246 and S249 in FIG. 24 or the same processing as those in FIGS. 26, 27 and 29, for instance); and obtaining a contrast component of the image data based on operational processing by the use of, between the first pixel value and the second pixel value, a pixel value corresponding to a first spectral component (the spectral component corresponding to W, for instance) having a widest frequency bandwidth among the plural different spectral components, a pixel value corresponding to a second spectral component (the spectral component corresponding to G, for instance) corresponding to a predetermined frequency band close to a frequency that causes no chromatic aberration of the lens, or a pixel value corresponding to a third spectral component (the spectral component corresponding to M, for instance) expressed in terms of a linear sum of a value resulting from multiplying the first spectral component by a first weighting factor and a value resulting from multiplying the second spectral component (the spectral component corresponding tog, for instance) by a second weighting factor (processing in FIG. 24 or those in FIGS. 26, 27, 29, 30 and 32, for instance).

Figure 26:
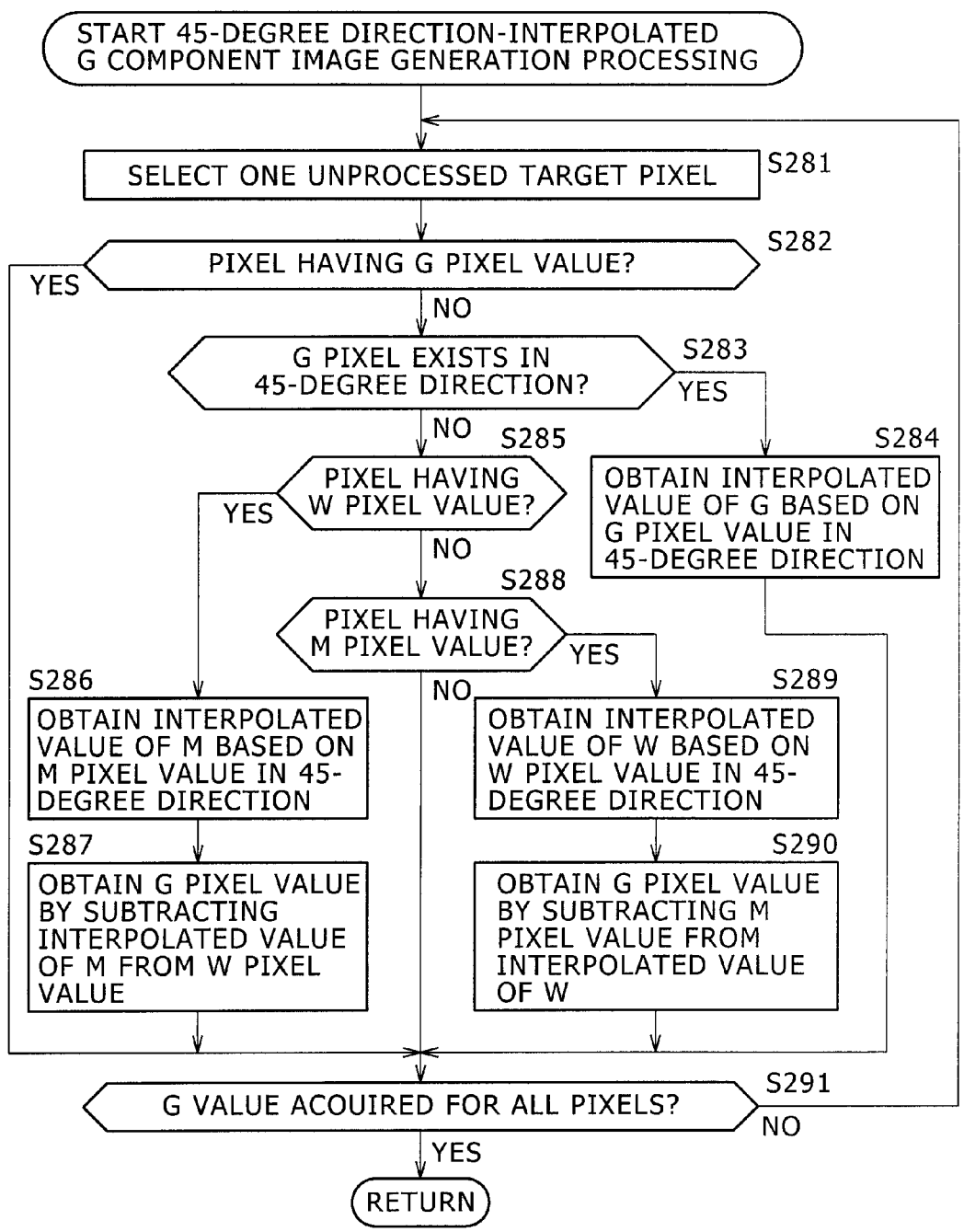
FIG. 26 is a flowchart illustrating 45-degree direction-interpolated G component image generation processing.
Figure 27:
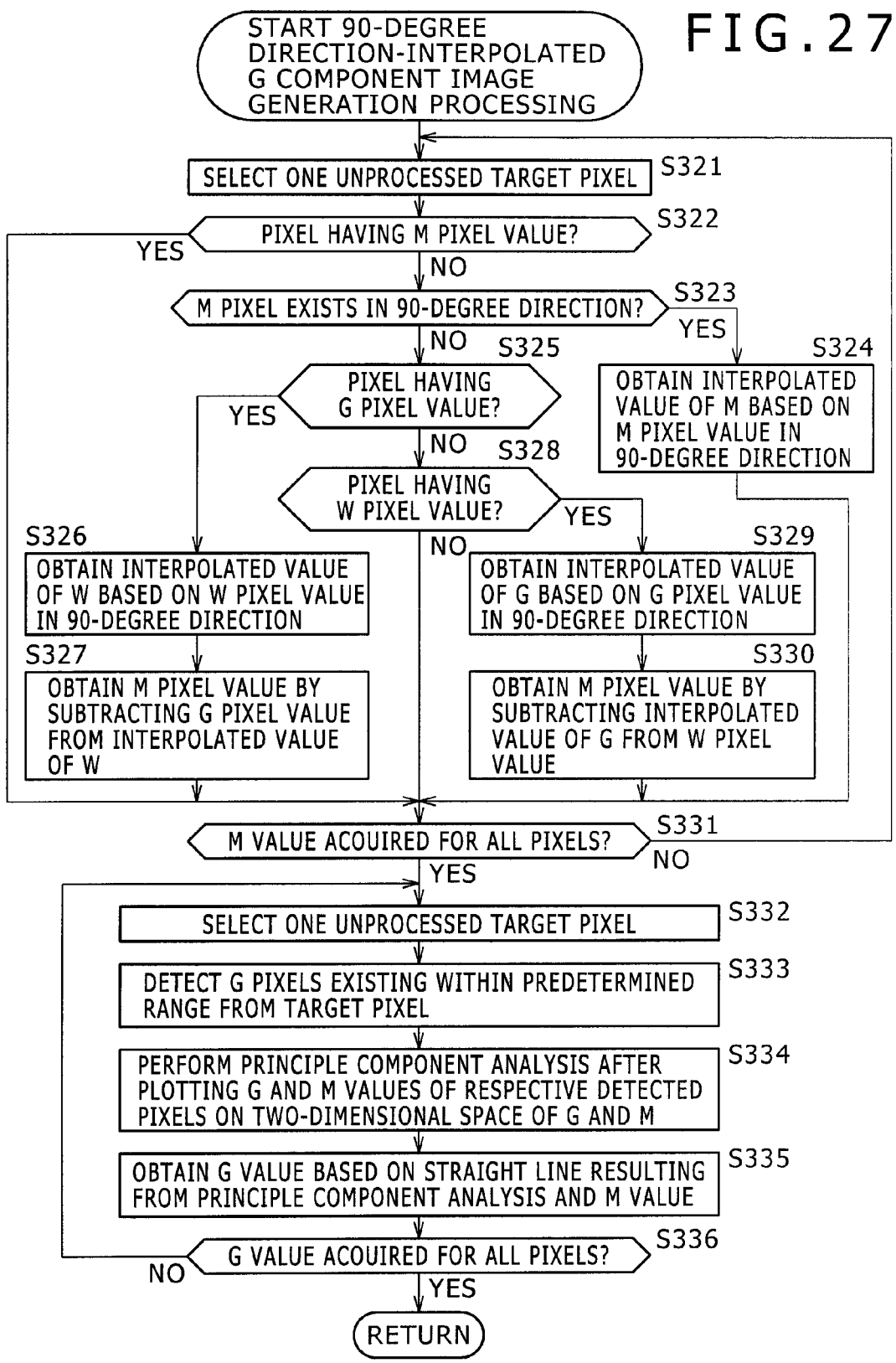
FIG. 27 is a flowchart illustrating 90-degree direction-interpolated G component image generation processing.
Figure 29:
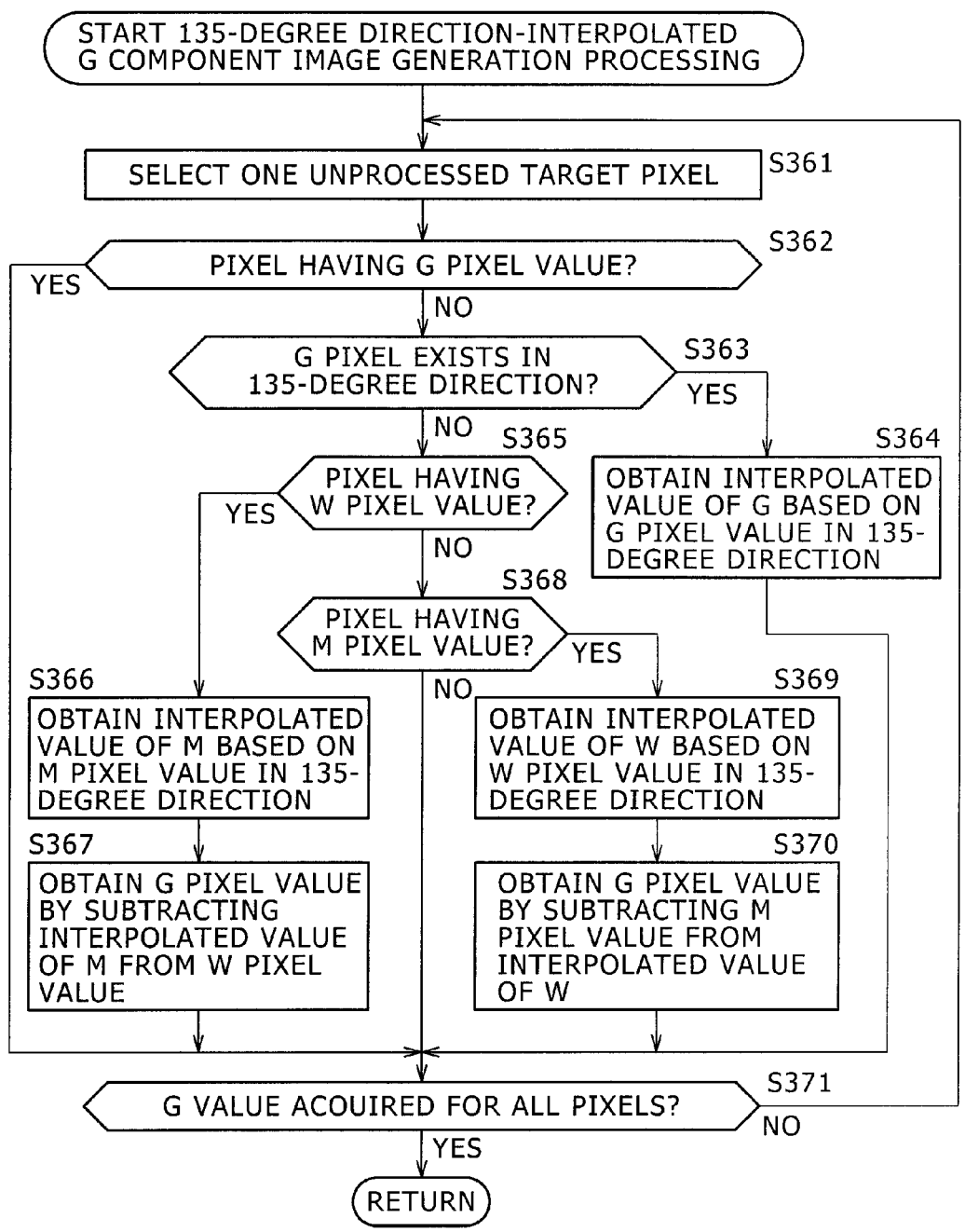
FIG. 29 is a flowchart illustrating 135-degree direction-interpolated G component image generation processing.

A program according to the third embodiment of the present invention is a program executable by a computer for controlling processing of capturing an image, and causing the computer to perform processing including the steps of: controlling an operation to acquire a light signal, which is to be obtained, upon receipt of light inputted via a lens (the lens 21 in FIG. 4, for instance), as plural different spectral components for each pixel through a predetermined color filter (the color filter 22 in FIG. 4, for instance) (processing of Step S1 in FIG. 11, for instance), controlling an operation to convert the acquired light signal into a digital signal (processing of Step S2 in FIG. 11, for instance), controlling an operation to acquire a first pixel value corresponding to the light signal on a predetermined pixel from the converted digital signal (processing of Step S41 in FIG. 12, for instance), calculating a second pixel value by performing interpolation processing using a pixel value of a pixel adjacent to the predetermined pixel (processing of Steps such as those S244, 246 and 249 or the same processing as those in FIGS. 26, 27 and 29, for instance), obtaining a contrast component of the image data based on operational processing by the use of, between the first pixel value and the second pixel value, a pixel value corresponding to a first spectral component (the spectral component corresponding to W, for instance) having a widest frequency bandwidth among the plural different spectral components, a pixel value corresponding to a second spectral component (the spectral component corresponding to G, for instance) corresponding to a predetermined frequency band close to a frequency that causes no chromatic aberration of the lens, or a pixel value corresponding to a third spectral component (the spectral component corresponding to M, for instance) expressed in terms of a linear sum of a value resulting from multiplying the first spectral component by a first weighting factor and a value resulting from multiplying the second spectral component (the spectral component corresponding to G, for instance) by a second weighting factor (processing in FIG. 24 or those in FIG. 26, 27, 29, 30 or 32, for instance).

An embodiment of the present invention is now described with reference to the drawings.

FIG. 4 is a block diagram showing a configuration of the image-capture apparatus 11 having a solid-state imaging device.

Incident light through the optical lens 21 falls on the color filter 22.

The color filter 22 has an array form, which is described later with reference to FIG. 6, and allows light of a predetermined frequency to pass through for each pixel and to be incident on the solid-state imaging device 23.

The solid-state imaging device 23 detects, among the incident light through the optical lens 11, the light passed through the color filter 22 to yield optical energy, and converts the resultant optical energy into an electric signal by means of photoelectric conversion for each pixel. An image signal outputted as the electric signal resulting from the photoelectric conversion using the solid-state imaging device 23 is supplied to the camera signal processing unit 25, after being converted into a digital signal by the A/D converting unit 24.

The camera signal processing unit 25 performs processing such as clipping, gamma correction, white balance correction and demosaic processing to the supplied digital signal, and supplies the processed signal to a display unit 26 or an image compressing unit 27. The demosaic processing to be performed by the camera signal processing unit 25 is described later in detail.

The display unit 26 includes, for instance, a liquid crystal display element, a driver for driving the element and the like, and displays, at need, an image corresponding to image data resulting from predetermined processing by the camera signal processing unit 25.

The image compressing unit 27 performs compressing processing to the supplied image signal to reduce data volume of the image signal, converts it into image data of predetermined recording image format, and outputs the converted image data to a recording unit 28 or an external output unit 29. The recording unit 28 records the converted image data, for instance, in a storage element such as hard disks and semiconductor memories or in a detachable recording medium mounted in a predetermined driver. The external output unit 29 outputs the converted image data to a different apparatus via wire or radio communications. It should be noted that the image compressing may not be always performed by the image compressing unit 27 to the signal to be recorded or externally outputted. In recent years, the number of pixels of the imaging device is increasing, and a demand exists for miniaturization of the apparatus itself. Accordingly it is preferable that the image compressing is applied to cases where the image data is to be recorded or to be externally outputted through a predetermined medium.

Spectral characteristics of the color filter 22 shown in FIG. 4 are described with reference to FIG. 5, together with those of a typical type of color filter.

With respect to the typical type of color filter having the Bayer array as previously described with reference to FIG. 1, for instance, filters corresponding to B channels are of filters providing high transmittance of light signals whose wavelength is in the range of about 200 to 300 nm, which is equivalent to the wavelength of a blue component. Also, filters corresponding to G channels are of filters providing high transmittance of light signals whose wavelength is in the range of about 450 to 550 nm, which is equivalent to the wavelength of a green component. Further, filters corresponding to R channels are of filters providing high transmittance of light signals whose wavelength is in the range of about 550 to 650 nm, which is equivalent to the wavelength of a red component. These RGB corresponding filters have the property of passing almost no infrared component having the wavelength of about 700 nm or more.

On the other hand, the color filter 22 has five filters capable of acquiring a light signal containing, in addition to R, G and B spectral components, two more wavelength-band spectral components.

In order to meet cases where a subject is not well lighted, the color filter 22 includes, for instance, a filter for acquiring the whole visible light of R, G and B components or a light signal containing visible light and an invisible light component such as infrared light, as a filter for obtaining a pixel group (hereinafter referred to as a first pixel group) capable of acquiring a light signal containing a spectral component whose wavelength band is wider (hereinafter referred to as a first spectral component).

Under low illumination condition, a light source of a type that has a low color temperature and radiates much infrared light is frequently used. In addition, the use of invisible light such as the infrared light as an auxiliary light results in less damage to the atmosphere. From the above, a need exists for a technology that increases effective image-capture sensitivity under the presence of the light source containing much invisible light such as the infrared light.

Accordingly, it is preferable to acquire the light signal containing, as the first spectral component, the visible light and the infrared light. Alternatively, the first spectral component may be the whole visible light of the R, G and B components, except the infrared light, or otherwise, a spectral component resulted by excluding only a predetermined wavelength band from a wavelength band containing the visible light and the infrared light, or a spectral component resulted by excluding only a predetermined wavelength band from the visible light. It becomes possible to increase the image-capture sensitivity as much as an amount of increase in the wavelength bandwidth of the first spectral component.

Specifically, even if the color filter 22 uses a filter capable of acquiring the whole visible light, as the filter for acquiring the light signal containing a spectral component having the widest wavelength bandwidth, it becomes also possible to provide a better SN ratio, as compared with the color filter in the related art. In this case, satisfactory sensitivity may be obtained as long as there is sufficient illumination. However, no satisfactory sensitivity is attained and a high quality image with less noise may not be obtained under the environment like a dark place where there is not sufficient illumination, and/or low illumination condition where much infrared light is contained in the light source, or image-capture condition where an infrared auxiliary light is used at low illumination. On the other hand, using a color filter of a type that uses filters for acquiring the light signal containing the visible light and the invisible light component such as the infrared light as the filters capable of acquiring the light signal containing the first spectral component specified as the spectral component having the widest wavelength bandwidth preferably makes it possible to generate the high quality image with less noise, even under the environment like the dark place where there is not sufficient illumination, and/or the low illumination condition where much infrared light is contained in the light source or the image-capture condition where the infrared auxiliary light is used at low illumination.

Figure 5:
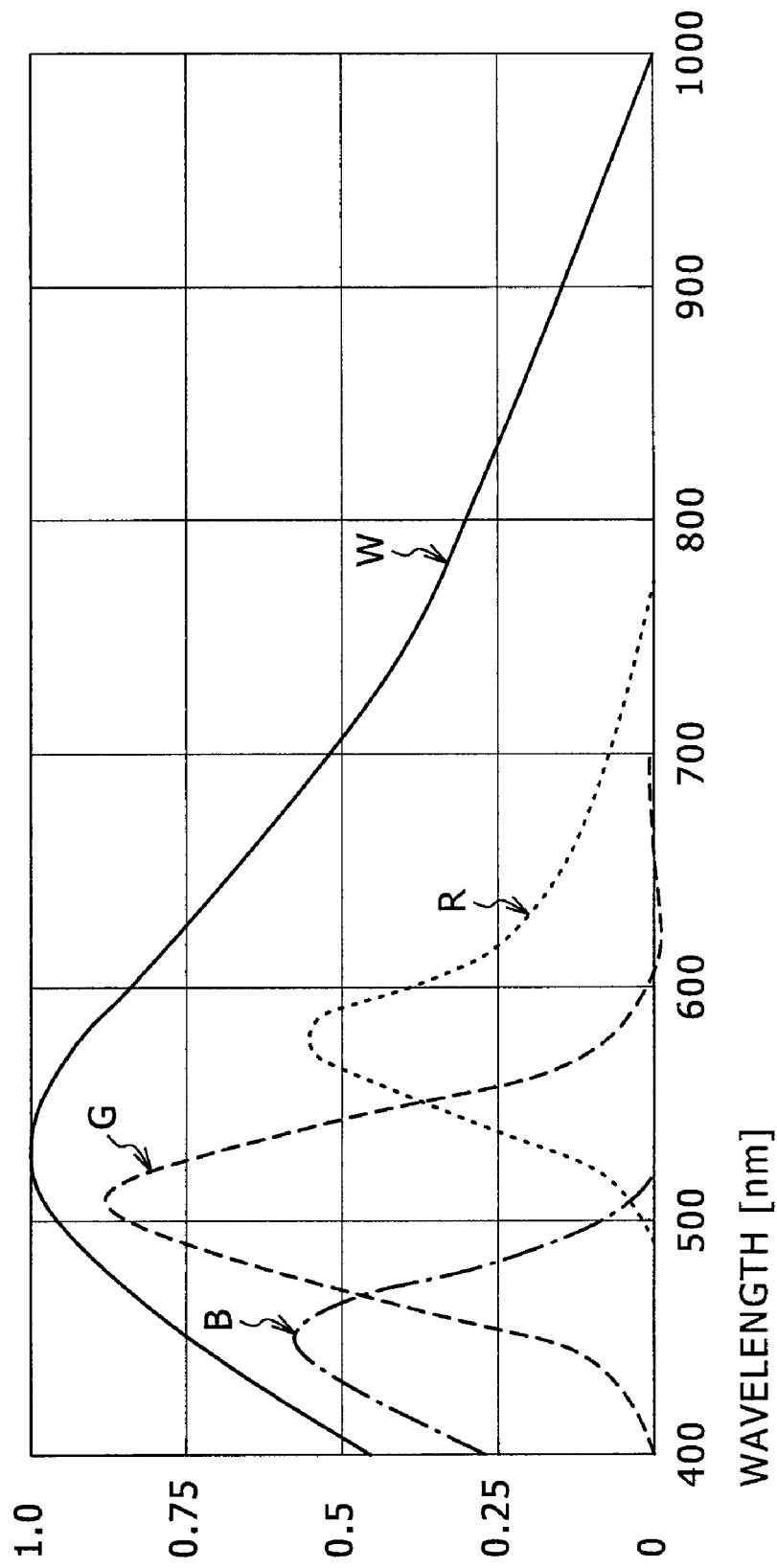
FIG. 5 is a graphic representation of spectral components of a color filter.

The filters for acquiring the light signal containing the visible light and the invisible light component such as the infrared light have the property of passing not only all R, G and B component signals but also infrared component having the frequency of 700 nm or more while having the peak in the vicinity of about 530 nm as shown by spectral characteristics indicated by W in FIG. 5.

Below, the color filter 22 is described as of filters capable of acquiring the light signal containing, as the first spectral component, the visible light and the invisible light component (hereinafter also referred to as W) such as the infrared light.

In addition, the color filter 22 may also obtain a different pixel group (hereinafter referred to as a second pixel group) capable of acquiring a spectral component (hereinafter referred to as a second spectral component) resulted by excluding a wavelength component in a predetermined range from the first spectral component.

The second spectral component may be a spectral component resulted by excluding a wavelength component corresponding to any one of the R, G and B components from the first spectral component. In order to easily obtain a focused image, it is preferable that a spectral component resulted by excluding a component having no chromatic aberration from the first spectral component is applied to the second spectral component. From the fact that sensibility to light of wavelengths around a green component wavelength of 555 nm is the most agreeable to the human eyes, a lens is typically set up to ensure that no chromatic aberration occurs in the green component. Thus, it is particularly preferable that a spectral component resulted by excluding a wavelength component corresponding to G (green) from the first spectral component, that is, a spectral component corresponding to a color component of magenta is applied to the second spectral component.

The second spectral component may be, of course, a spectral component resulted by excluding a wavelength component corresponding to B (blue) from the first spectral component, that is, a yellow spectral component, or otherwise, a spectral component resulted by excluding a wavelength component corresponding to R (red) from the first spectral component, that is, a spectral component resulted by excluding a wavelength component corresponding to C (cyan).

In the following, the color filter 22 is described as of filters capable of acquiring the light signal containing, as the second spectral component, the spectral component resulted by excluding the wavelength component corresponding to G (green) from the wavelength band of the visible light and the invisible light component such as the infrared light, that is, the spectral component (hereinafter also referred to as M) corresponding to M (magenta).

Using the color filter 22 as described the enables the solid-state imaging device 23 to obtain, in addition to the pixel groups adapted to acquire the respective R, G and B spectral components like the color filter in the related art, both the pixel group capable of acquiring the first spectral component specified as the spectral component longer in wavelength bandwidth than each of the R, G and B components in the color filter of the related art, and the pixel group capable of acquiring the second spectral component specified as the spectral component resulted by excluding the wavelength component of the predetermined band from the first spectral component so as to ensure that sufficient incident light falls on the solid-state imaging device 23 even in cases where the subject is not well-lighted.

With respect to pixel data obtained in this manner, subtracting the pixel data of the second pixel group from the pixel data of the first pixel group (in other words, calculating the linear sum of the respective pixel values of the first pixel group and the second pixel group based on weights W1 and W1, where the weight W1=1, and the weight W2=(−1), makes it possible to obtain pixel data of a wavelength component of a predetermined band. When there is no chromatic aberration in the pixel data of the wavelength component of the predetermined band, it is possible to obtain a clear in-focus image. In other words, with the lens 21 set up so as to get having no chromatic aberration with respect to the wavelength of the predetermined band resulting from subtracting the pixel data of the second pixel group from the pixel data of the first pixel group, the use of, as a contrast component, the pixel data of the wavelength component of the predetermined band, or the pixel data resulted by excluding the chromatic aberration makes it possible to create pixel data having no chromatic aberration, leading to creation of a chromatic aberration-canceled clear image.

One instance of a color filter array with respect to the color filter 22 is described with reference to FIG. 6, together with the pixels obtained in the solid-state imaging device 23. FIG. 6 shows a part of the filter array of the color filter 22.

In the solid-state imaging device 23, the pixels adapted to provide a difference in spectral components respectively acquirable by the color filter 22 are classified into five categories, pixels indicated by W, pixels indicated by M, pixels indicated by G, pixels indicated by R and pixels indicated by B.

The pixels (or the pixels corresponding to the first pixel group adapted to acquire the first spectral component) indicated by W are pixels used to acquire the wide wavelength-band spectral component (or the first spectral component). Specifically, the pixels indicated by W are, for instance, pixels capable of acquiring all of the B (blue), G (green), R (red) and IR (infrared) spectral components. It should be noted that with respect to the color filter 22, no attempt to give processing to front surfaces of the corresponding pixels of the solid-state imaging device 23 typically results in formation of the pixels capable of acquiring the first spectral component in the solid-state imaging device 23.

The pixels (or the pixels corresponding to the second pixel group adapted to acquire the second spectral component) indicated by M are pixels used to acquire the spectral component (or the second spectral component) resulted by excluding the wavelength component in the predetermined range (or a wavelength component in a predetermined range corresponding to G (green), for instance) from the first spectral component. Specifically, the pixels indicated by M are, for instance, pixels capable of acquiring the B (blue), R (red) and IR (infrared) spectral components. It should be noted that with respect to the color filter 22, fitting color filters that allows to pass the magenta component on the front surfaces of the corresponding pixels of the solid-state imaging device 23 typically results in formation of the pixels capable of acquiring the second spectral component in the solid-state imaging device 23.

The pixels indicated by G are pixels capable of acquiring the G (green) spectral component. It should be noted that with respect to the color filter 22, fitting color filters that allows to pass the green component, together with infrared cut filters, on the front surfaces of the corresponding pixels of the solid-state imaging device 23 typically results in formation of pixels capable of acquiring the G (green) spectral component in the solid-state imaging device 23.

The pixels indicated by R are pixels capable of acquiring the R (red) spectral component. It should be noted that with respect to the color filter 22, fitting color filters that allows to pass the red component, together with infrared cut filters, on the front surfaces of the corresponding pixels of the solid-state imaging device 23 typically results in formation of the pixels capable of acquiring the B (blue) spectral component in the solid-state imaging device 23.

The pixels indicated by B are pixels capable of acquiring the B (blue) spectral component. It should be noted that with respect to the color filter 22, fitting color filters that allows to pass the blue component, together with infrared cut filters, on the front surfaces of the corresponding pixels of the solid-state imaging device 23 typically results in formation of the pixels capable of acquiring the B (blue) spectral component in the solid-state imaging device 23.

Figure 6:
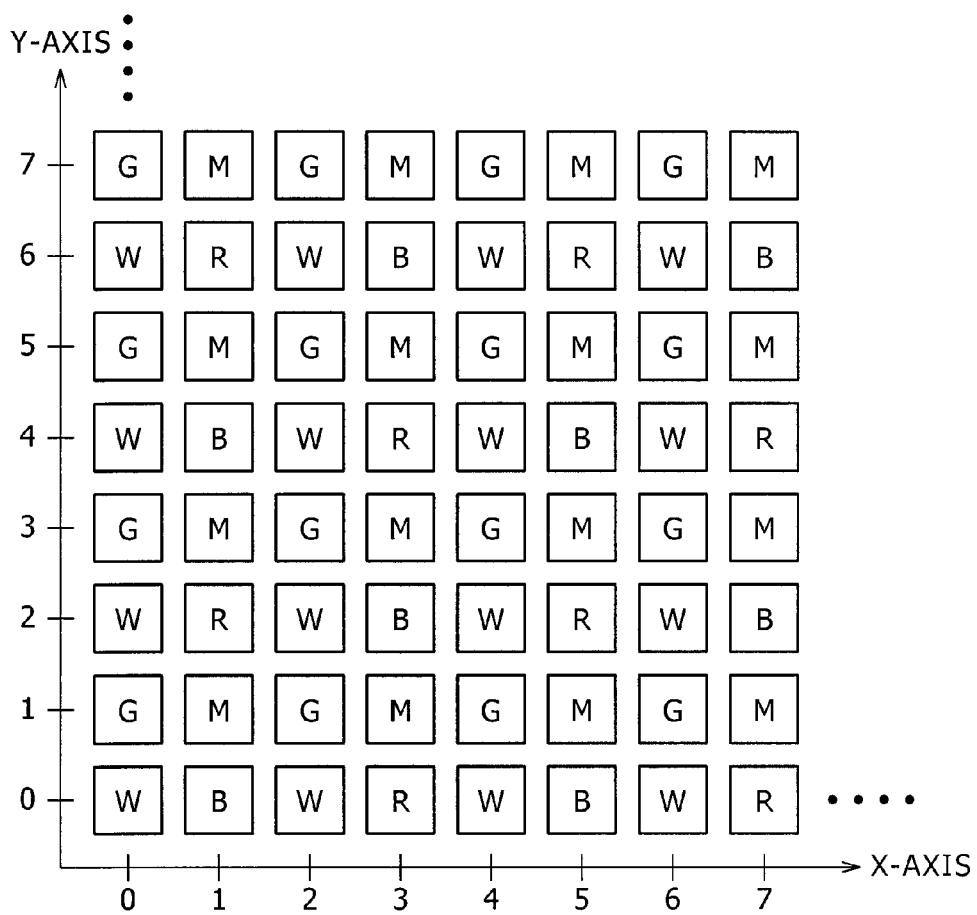
FIG. 6 illustrates a color array of the color filter shown in FIG. 4.

As shown in FIG. 6, the color filter 22 has a filter array of a size whose minimum unit is in the form of a 4×4 matrix, in which assuming that a certain pixel indicated by W is set as a reference, or shown in the drawing as the coordinates (0, 0), the pixels indicated by W are arranged at positions represented by the coordinates (0,0), (2,0), (0,2) and (2,2), the pixels indicated by M are arranged at positions represented by the coordinates (1,1), (1,3), (3,1) and (3,3), the pixels indicated by G are arranged at positions represented by the coordinates (0,1), (0,3), (2,1) and (2,3), the pixels indicated by B are arranged at positions represented by the coordinates (1,0) and (3,2), and pixels indicated by R are arranged at positions represented by the coordinates (3,0) and (1,2).

Specifically, referring to the pixels indicated by G assuming that a direction of X-axis is set as a 0-degree direction with respect to the color filter 22, the pixels indicated by G are disposed in every other pixel in all of the 0-degree direction, a 45-degree direction, a 90-degree direction and a 135-degree direction. Both the pixels adjacent to the pixel indicated by G in the 0-degree direction are of the pixels indicated by M. Both the pixels adjacent to the pixel indicated by G in the 90-degree direction are of the pixels indicated by W. Both the pixels adjacent to the pixel indicated by G in the 45-degree direction are of the pixels indicated by R or B. Both the pixels adjacent to the pixel indicated by G in the 135-degree direction are of the pixels indicated by either R or B different from the pixels adjacent in the 45-degree direction.

The predetermined processing is performed by the camera signal processing unit 25 to the image data resulting from image-capturing using the color filter 22 and the solid-state imaging device 23 as described the above, permitting a final output image to be obtained.

It should be noted that with respect to the color filter 22, the reversed arrangement of the pixels respectively indicated by W and M is also adaptable to perform the demosaic processing as described later in the same manner. In addition, the reversed arrangement of the pixels respectively indicated by B and R is also adaptable to perform the demosaic processing as described later in the same manner.

Five wavelength bands with respect to the color filter 22 previously described with reference to FIG. 6 are now described with reference to FIG. 7.

Figure 7:
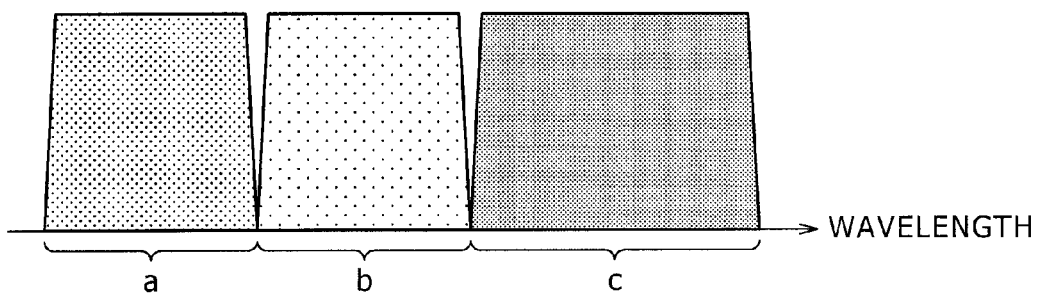
FIG. 7 illustrates spectral components of the color filter shown in FIG. 4.

In FIG. 7, a horizontal axis represents a wavelength, wherein (a) indicates the B (blue) spectral component, (b) indicates the G (green) spectral component, and (c) indicates the R (red) spectral component or the sum of R (red) and IR (infrared) spectral components.

Then, the wavelength component (or the first spectral component) to be acquired by the first pixel group indicated by W is assumed to be a total of wavelength components indicated by (a), (b) and (c) in FIG. 7. The wavelength component (or the second spectral component) to be acquired by the second pixel group indicated by M is assumed to be a total of wavelength components indicated by (a) and (c) in FIG. 7.

Specifically, subtracting the light signal acquired by the second pixel group indicated by M from the light signal acquired by the first pixel group indicated by W may provide the G (green) spectral component having no chromatic aberration as shown by (b) in FIG. 7. The use of, as the contrast component, the G (green) spectral component pixel data with no chromatic aberration may lead to creation of a chromatic aberration-canceled, in-focus, high-contrast, clear image.

As described the above, the data inputted to the camera signal processing unit 25 is of the pixel groups corresponding to the respectively different spectral components indicated by W, M, G, B and R outputted from the solid-state imaging device 23. Specifically, the pixels contained in the image data inputted to the camera signal processing unit 25 are made classifiable into the pixel groups indicated by W, M, G, B and R. Assuming that with respect to the pixel coordinates (X, Y) where each of the pixels indicated by W is placed, X and Y are both even-numbered, it follows that with respect to the pixel coordinates (X, Y) where each of the pixels indicated by M is placed, X and Y are supposed to be both odd-numbered. And, with respect to the pixel coordinates (X, Y) where each of the pixels indicated by G is placed, X and Y are supposed to be respectively even-numbered and odd-numbered. Further, with respect to the pixel coordinates (X, Y) where each of the pixels indicated by B is placed, X and Y are supposed to be respectively odd-numbered and even-numbered, in which case, X−Y−1 takes a multiple of 4. Further, with respect to the pixel coordinates (X, Y) where each of the pixels indicated by R is placed, X and Y are supposed to be respectively odd-numbered and even-numbered, in which case, X−Y−3 takes a multiple of 4.

In other words, when assuming that the pixel position of the certain pixel indicated by W is set as a reference point (0, 0), among the pixels contained in the data inputted to the camera signal processing unit 25, the pixels at the coordinates where X and Y are both even-numbered correspond to W. The pixels at the coordinates where X and Y are both odd-numbered correspond to M. The pixels at the coordinates where X is even-numbered and Y is odd-numbered correspond to G. The pixels at the coordinates where X is odd-numbered, Y is even-numbered and X−Y−1 is the multiple of 4 correspond to B. The pixels at the coordinates where X is odd-numbered, Y is even-numbered and X−Y−3 is the multiple of 4 correspond to R.

The image data outputted from the camera signal processing unit 25 appears as data containing three components, R (red), G (green) and B (blue), with respect to all the pixel positions, or demosaic processed image data.

Figure 8:
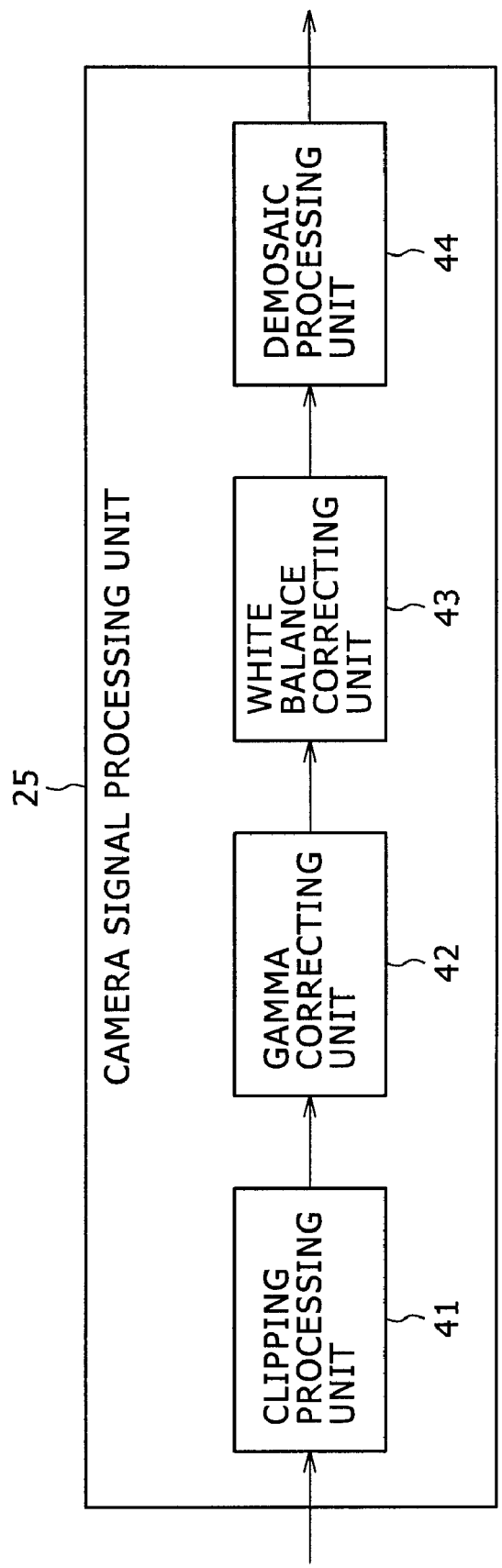
FIG. 8 is a block diagram showing a configuration of a camera signal processing unit shown in FIG. 4.

FIG. 8 is a block diagram showing a more detailed configuration of the camera signal processing unit 25. The camera signal processing unit 25 includes a clipping unit 41, a gamma correcting unit 42, a white balance correcting unit 43 and a demosaic processing unit 44.

The clipping unit 41 checks to see whether or not the pixel value of each pixel in the supplied image data falls in a defined range of pixel values. When the checked pixel value is less than a lower limit in the defined range, the clipping unit 41 corrects the pixel value so as to reach the lower limit (or clips to a noise level). On the other hand, when the checked pixel value exceeds an upper limit in the defined range, the clipping unit 42 corrects the pixel value so as to reach the upper limit (or clips to a saturation level).

The gamma correcting unit 42 performs gamma correction to the pixel value of each pixel in an inputted mosaic image.

The white balance correcting unit 43 corrects a white balance, or a difference in color taste depending on the light source used during shooting.

The demosaic processing unit 44 performs, when any one of the R, G and B components is absent in the respective pixels in the color filter array, interpolation of the absent color component, or the demosaic processing, based on a supplied mosaic image in a predetermined color filter array, to generate image data in which all the pixels hold respectively the R, G and B pixel values.

In the present embodiment, the image processing is performed by an array of units disposed in order of the clipping unit 41, the gamma correcting unit 42, the white balance correcting unit 43 and the demosaic processing unit 44. Alternatively, it is also allowable to configured the array of units, for instance, in order of the clipping processing unit 41, the demosaic processing unit 44, the gamma correcting unit 42 and the white balance correcting unit 43 to perform the image processing. It should be noted that, even if the image processing is performed in the latter order, the demosaic processing unit 44 as described later may perform the similar demosaic processing.

In the demosaic processing unit 44, it is necessary to, after referring each pixel contained in the image to as a target pixel, obtain R, G and B values with respect to each pixel (represented as the coordinates (H, K), where H and K are both integers). However, only one data among W, M, G, R and B data exists in the pixel (H, K) of the input data. Thus, the demosaic processing unit 44 calculates the R, G and B values with respect to each pixel by performing interpolation processing for estimating the pixel value from the pixels in the vicinity of the pixel represented as the coordinates (H, K).

The pixel value resulting from the interpolation processing may sometimes differ depending on that the pixel value of the pixel used for the interpolation is adjacent in which direction, that is, a direction of interpolation. One specific instance of the interpolation processing is described with reference to FIG. 9.

Figure 9:
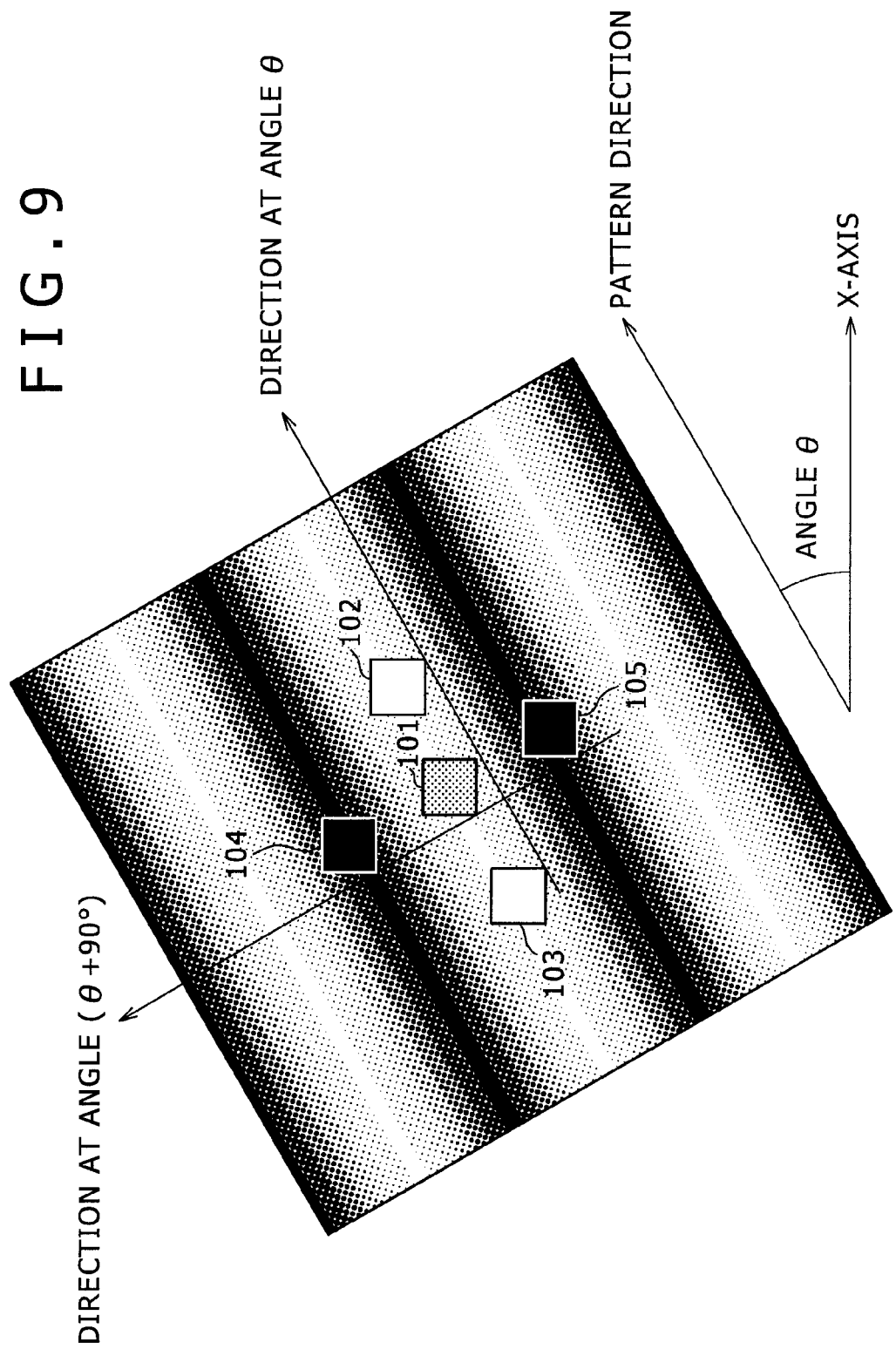
FIG. 9 illustrates a relation between a pattern direction and interpolation.

Below it is assumed that the processing is performed for interpolating a target pixel 101 using the neighboring pixels with respect to an image of a type that contains white and black gradation patterns in a direction at a predetermined angle $\theta$, for instance, as shown in FIG. 9. Although the interpolation will take place using the adjacent pixels in practice, a description is herein given with somewhat spaced pixels so as to ensure that influences of an interpolation result depending on the direction of the pixels used for the interpolation may appear to an extreme.

It is now assumed that the interpolation processing is performed on an actually white or nearly white-colored target pixel 101 using either the substantially same-colored pixels 102, 103 specified as the pixels in the vicinity of the target pixel or pixels 104 and 105 that, although being also specified as the pixels in the vicinity of the target pixel, exist at an angle of 90° to the pattern angle $\theta$ and are thus dark-colored unlike the target pixel. In this processing, using the pixels 104, 105 for the interpolation processing causes the pixel value of the pixel 101 to appear darker than it really is. On the other hand, using the pixels 102, 103 for the interpolation processing may provide a correct result.

Specifically, the interpolation processing needs to be performed using the neighboring pixels in an appropriate direction based on the pattern (inclusive of a change in color and lightness) in the vicinity of the target pixel.

Thus, the demosaic processing unit 44 calculates numerical values corresponding to a possibility that the directions of pattern in the vicinity of the target pixel agree respectively with a 0-degree direction, a 45-degree direction, a 90-degree direction and a 135-degree direction, in other words, numerical values corresponding to probability or possibility of having a pattern in a certain angle direction. The calculated numerical values are referred to as 0-degree directional pattern probability, 45-degree directional pattern probability, 90-degree directional pattern probability and 135-degree directional pattern probability with respect to each pixel position. The pattern probability is described later in detail.

The demosaic processing unit 44 calculates, based on the 0-degree directional pattern probability, the 45-degree directional pattern probability, the 90-degree directional pattern probability and the 135-degree directional pattern probability, numerical values representing appropriateness of the interpolation processing with respect to each angle or a possibility that the interpolation processing by the use of the neighboring pixel values with the each angle is appropriate.

In this processing, it is assumed that "the pattern probability" with respect to each angle is used as an index of accuracy in determining whether or not the angle concerned is accurate, without taking angles other than the one concerned into consideration. On the other hand, it is assumed that "the appropriateness" of the interpolation processing with respect to each angle is used as an index of accuracy in determining whether or not the angle concerned is accurate, with taking consideration of angles other than the one concerned.

The demosaic processing unit 44 is also adaptable to provide G (green) component-only-image data under consideration of the pattern direction by, after calculating, with respect to the G (green) component, an interpolated G (green) component pixel value resulting from the interpolation by the use of the neighboring pixel values in the 0-degree direction, an interpolated G (green) component pixel value resulting from the interpolation by the use of the neighboring pixel values in the 45-degree direction, an interpolated G (green) component pixel value resulting from the interpolation by the use of the neighboring pixel values in the 90-degree direction and an interpolated G (green) component pixel value resulting from the interpolation by the use of the neighboring pixel values in the 135-degree direction, performing weighted addition that performs weighting based on the appropriateness of the interpolation with respect to each angle.

Then, the demosaic processing unit 44 calculates, based on the G (green) component image data obtained under consideration of the pattern direction, a coefficient of correlation between the G (green) component and the R (red) component and a coefficient of correlation between the G (green) component and the B (blue) component, and is followed by calculating each of the R (red) and B (blue) pixel values. By this calculation, each of the R (red), G (green) and B (blue) pixel values with respect to each pixel position is obtained, so that the demosaic processing unit 44 outputs the each pixel value as a resultant image.

FIG. 10 is a block diagram showing a detailed configuration of the demosaic processing unit 44 of the camera signal processing unit 24 previously described with reference to FIG. 8.

The demosaic processing unit 44 includes the 0-degree directional pattern analysis processing unit 61, the 45-degree directional pattern analysis processing unit 62, the 90-degree directional pattern analysis processing unit 63, the 135-degree directional pattern analysis processing unit 64, the pattern direction determination unit 65, the 0-degree direction-interpolated G component image calculation processing unit 71, the 45-degree direction-interpolated G component image calculation processing unit 72, the 90-degree direction-interpolated G component image calculation processing unit 73, the 135-degree direction-interpolated G component image calculation processing unit 74, the G component image calculation processing unit 75, the R component image calculation processing unit 81 and the B component image calculation processing unit 82.

The 0-degree directional pattern analysis processing unit 61, the 45-degree directional pattern analysis processing unit 62, the 90-degree directional pattern analysis processing unit 63 and the 135-degree directional pattern analysis processing unit 64 perform the interpolation processing in the respective directions depending on the filter array of the color filter 22 and based on each pixel value of the pixels existing within a predetermined range from the target pixel. With respect to the filter array previously described with reference to FIG. 6, assuming that the direction of X-axis is set as the 0-degree direction, the interpolation processing in the 0-degree direction is performed on one of the adjacent pixels, G and M, using the other. The interpolation processing in the 45-degree direction is performed on one of the adjacent pixels, W and M, using the other. The interpolation processing in the 90-degree direction is performed on one of the adjacent pixels, G and W, using the other. The interpolation processing in the 135-degree direction is performed on one of the adjacent pixels, W and M, using the other. The pattern probability with respect to each angle is calculated by, after obtaining, in addition to the naturally contained color component pixel value, the other color component pixel value through the interpolation processing with respect to more than one pixel and within the predetermined range, performing principle component analysis of these two color component pixel values.

Specifically, the 0-degree directional pattern analysis processing unit 61 makes reference to a pixel having a G component pixel value within the predetermined range from the target pixel to perform the principle component analysis by, after effecting the interpolation processing using each pixel value of two M component pixels adjacent to the reference pixel in the 0-degree direction with respect to the X-axis, calculating variance of pixel values in more than one pair of the G component pixel value and an interpolated pixel value of the M component. In this analysis, if a high contribution rate of a first principle component is found, it may be stated that the pattern probability in the 0-degree direction is high. It should be noted that the 0-degree directional pattern analysis processing unit 61 is also adaptable to obtain the pattern probability in the 0-degree direction, likewise, if attempting to make reference to a pixel having a M component pixel value within the predetermined range from the target pixel to perform the principle component analysis through the interpolation processing using each pixel value of two G component pixels adjacent to the reference pixel in the 0-degree direction with respect to the X-axis.

The 45-degree directional pattern analysis processing unit 62 makes reference to a pixel having a W component pixel value within the predetermined range from the target pixel to perform the principle component analysis by, after effecting the interpolation processing using each pixel value of two M component pixels adjacent to the reference pixel in the 45-degree direction to the X-axis, calculating variance of pixel values in more than one pair of the W component pixel value and an interpolated pixel value of the M component. In this analysis, if a high contribution rate of the first principle component is found, it may be stated that the pattern probability in the 45-degree direction is high. It should be noted that the 45-degree directional pattern analysis processing unit 61 is also adaptable to obtain the pattern probability in the 45-degree direction, likewise, if attempting to make reference to a pixel having a M component pixel value within the predetermined range from the target pixel to perform the principle component analysis through the interpolation processing using each pixel value of two W component pixels adjacent to the reference pixel in the 45-degree direction with respect to the X-axis.

The 90-degree directional pattern analysis processing unit 63 makes reference to a pixel having a G component pixel value within the predetermined range from the target pixel to perform the principle component analysis by, after effecting the interpolation processing using each pixel value of two W component pixels adjacent to the reference pixel in the 90-degree direction with respect to the X-axis, calculating variance of pixel values in more than one pair of the G component pixel value and an interpolated pixel value of the W component. In this analysis, if a high contribution rate of the first principle component is found, it may be stated that the pattern probability in the 90-degree direction is high. It should be noted that the 90-degree directional pattern analysis processing unit 63 is also adaptable to obtain the pattern probability in the 90-degree direction, likewise, if attempting to make reference to a pixel having a W component pixel value within the predetermined range from the target pixel to perform the principle component analysis through the interpolation processing using each pixel value of two G component pixels adjacent to the reference pixel in the 90-degree direction with respect to the X-axis.

The 135-degree directional pattern analysis processing unit 64 makes reference to a pixel having a W component pixel value within the predetermined range from the target pixel to perform the principle component analysis by, after effecting the interpolation processing using each pixel value of two M component pixels adjacent to the reference pixel in the 135-degree direction to the X-axis, calculating variance of pixel values in more than one pair of the W component pixel value and an interpolated pixel value of the M component. In this analysis, if a high contribution rate of the first principle component is found, it may be stated that the pattern probability in the 135-degree direction is high. It should be noted that the 135-degree directional pattern analysis processing unit 64 is also adaptable to obtain the pattern probability in the 135-degree direction, likewise, if attempting to make reference to a pixel having a M component pixel value within the predetermined range from the target pixel to perform the principle component analysis through the interpolation processing using each pixel value of two W component pixels adjacent to the reference pixel in the 135-degree direction with respect to the X-axis.

As described the above, it is assumed that "the pattern probability" with respect to each angle is used as the index of accuracy in determining whether or not the angle concerned is accurate as the angle in the pattern direction, without taking angles other than the one concerned into consideration. One instance of calculations of the respective pattern probabilities is described later in detail with reference to FIGS. 14 to 21.

The pattern direction determination unit 65 calculates the appropriateness of the 0-degree directional interpolation, the appropriateness of the 45-degree directional interpolation, the appropriateness of the 90-degree directional interpolation and the appropriateness of the 135-degree directional interpolation based on the pattern probability already obtained with respect to each angle by each of the 0-degree directional pattern analysis processing unit 61, the 45-degree directional pattern analysis processing unit 62, the 90-degree directional pattern analysis processing unit 63 and the 135-degree directional pattern analysis processing unit 64.

In this processing, as described the above, it is assumed that "the appropriateness" of the interpolation processing with respect to each angle is used as the index of accuracy in determining whether or not the angle concerned is accurate, with taking consideration of angles other than the one concerned. One instance of calculations of the appropriateness of the interpolation with respect to each angle is described later in detail with reference to flowcharts in FIGS. 22 and 23.

The 0-degree direction-interpolated G component image calculation processing unit 71 generates the G (green) component-only-image data by performing the 0-degree directional interpolation processing with respect to each pixel having no G component. Specifically, the 0-degree direction-interpolated G component image calculation processing unit 71 acquires the W component for all the pixels by taking advantage of the fact that adding the G and M pixel values permits the W pixel value to be estimated, because the use of the color filter array previously described with reference to FIG. 6 ensures that the pixel indicated by W is adjacent to the pixels indicated by R and B in the 0-degree direction, and the pixels indicated by G and M are adjacent to each other in the 0-degree direction. One instance of an operation procedure of this processing is described later in detail with reference to FIGS. 24 and 25.

The 45-degree direction-interpolated G component image calculation processing unit 72 generates the G (green) component-only-image data by performing the 45-degree directional interpolation processing with respect to each pixel having no G component. Specifically, the 45-degree direction-interpolated G component image calculation processing unit 72 acquires the G component for all the pixels by taking advantage of the fact that subtracting the M pixel value from the W pixel value permits the G pixel value to be estimated, since the use of the color filter array previously described with reference to FIG. 6 ensures that the pixel indicated by G is adjacent to the pixels indicated by R and B in the 45-degree direction, and the pixels indicated by W and M are adjacent to each other in the 45-degree direction. One instance of an operational procedure of this processing is described later in detail with reference to FIG. 26.

The 90-degree direction-interpolated G component image calculation processing unit 73 generates the G (green) component-only-image data by performing the 90-degree directional interpolation processing with respect to each pixel having no G (green) component. Specifically, the 90-degree direction-interpolated G component image calculation processing unit 73 estimates the M component for all the pixels by taking advantage of the fact that subtracting the G pixel value from the W pixel value permits the M pixel value to be estimated, since the use of the color filter array previously described with reference to FIG. 6 ensures that the pixel indicated by M is adjacent to the pixels indicated by R and B in the 90-degree direction, and the pixels indicated by G and W are adjacent to each other in the 90-degree direction. Then, the G component of the target pixel is calculated by, after extracting the pixels having the G component with respect to an input signal, among the pixels within the predetermined range in the vicinity of the target pixel, performing the principle component analysis of the G and M components contained in more than one extracted pixel. One instance of an operational procedure of this processing is described later in detail with reference to FIGS. 27 and 28.

The 135-degree direction-interpolated G component image calculation processing unit 74 generates the G (green) component-only-image data by performing the 135-degree directional interpolation processing with respect to each pixel having no G (green) component. Specifically, the 135-degree direction-interpolated G component image calculation processing unit 74 acquires the G component for all the pixels by taking advantage of the fact that subtracting the M pixel value from the W pixel value permits the G pixel value to be estimated, since the use of the color filter array previously described with reference to FIG. 6 ensures that the pixel indicated by G is adjacent to the pixels indicated by R and B in the 135-degree direction, and the pixels indicated by W and M are adjacent to each other in the 135-degree direction. One instance of an operational procedure of this processing is described later in detail with reference to FIG. 29.

The G component image calculation processing unit 75 calculates the G component image data under consideration of the pattern direction by performing weighted addition in such a manner as to give weighting to the G component image data, which is already generated through the respective directional interpolation processing by the 0-degree direction-interpolated G component image calculation processing unit 71, the 45-degree direction-interpolated G component image calculation processing unit 72, the 90-degree direction-interpolated G component image calculation processing unit 73 and the 135-degree direction-interpolated G component image calculation processing unit 74, based on the 0-degree directional interpolation appropriateness, the 45-degree directional interpolation appropriateness, the 90-degree directional interpolation appropriateness and the 135-degree directional interpolation appropriateness, which are respectively already obtained through the processing by the pattern direction determination unit 65.

The R component image calculation processing unit 81 calculates the correlation between the R component and the G component by performing the principle component analysis based on the R component pixel value contained in the image data, together with the G component image data already obtained by the G component image calculation processing unit 75, followed by calculating the R component image data based on the calculated correlation. This calculation processing is described later in detail with reference to FIGS. 30 and 31.

The B component image calculation processing unit 82 calculates the correlation between the B component and the G component by performing the principle component analysis based on the B component pixel value contained in the image data, together with the G component image data already obtained by the G component image calculation processing unit 75, followed by calculating the B component image data based on the calculated correlation. This calculation processing is described later in detail with reference to FIGS. 32 and 33.

Imaging processing to be performed by the image-capture apparatus 11 is now described with reference to a flowchart in FIG. 11.

In Step S1, an image sensor, that is, the color filter 22 and the solid-state imaging device 23 detect the incident light passed through the lens 21, then convert the resultant optical energy into an electric signal by means of photoelectric conversion for each pixel to acquire the image data, and then supplies the resultant image data to the A/D converting unit 24. The color components that the respective pixels of the resultant image data hold are determined depending on the filter array shown in FIG. 6. The color filter 22 has the filter array previously described with reference to FIG. 6.

In Step S2, the A/D converting unit 24 performs A/D conversion, that is, converts the supplied analog image data into image data in the form of digital signal.

In Step S3, the camera signal processing unit 25 performs the clipping with the clipping processing unit 41, the gamma correction with the gamma correcting unit 42, and the white balance correction with the white balance correcting unit 43.

In Step S4, the camera signal processing unit 25 performs the demosaic processing as described later with reference to flowcharts in FIGS. 12 and 13.

In Step S5, the camera signal processing unit 25 judges whether or not the completely processed image is to be displayed. When the result of judgment in the Step S5 is that the image is not displayed, the processing goes on to Step S7.

When the result of judgment in the Step S5 is that the image is to be displayed, the camera signal processing unit 25 supplies the completely processed image data to the display unit 26 in Step S6. The display unit 26 displays an image corresponding to the supplied image data.

When the result of judgment in the Step S5 is that the image is not displayed, or after the completion of the processing in the Step S6, the camera signal processing unit 25 judges whether or not the completely processed image is to be externally outputted in Step S7. When the result of judgment in the Step S7 is that the image is not externally outputted, the processing goes onto Step S9 as described later.

When the result of judgment in the Step S7 is that the image is to be externally outputted, the camera signal processing unit 25 supplies the completely processed image data to the image compressing unit 37 in Step S8. The image compressing unit 37 compresses the supplied image data at need, and supplies the compressed image data to the external output unit 29. The external output unit 29 externally outputs the supplied image data.

When the result of judgment in the Step S7 is that the image is not externally outputted, or after the completion of the processing in the Step S8, the camera signal processing unit 25 judges whether or not the completely processed image is to be recorded in Step S9. When the result of judgment in the Step S9 is that the image is not recorded, the processing is brought to an end.

When the result of judgment in the Step S9 is that the image is to be recorded, the camera signal processing unit 25 supplies the completely processed image data to the image compressing unit 37 in Step S10. The image compressing unit 37 compresses the supplied image data at need, and supplies the compressed image data to the recording unit 28. The recording unit 28 records the supplied image data in the storage element such as hard disks and semiconductor memories or in the detachable recording medium mounted in the predetermined driver, for instance, leading to the end of the processing.

The processing like the enables the image data containing the pixels, which are capable of acquiring the wide frequency-band light signal, to be imaged, then given various processing including the demosaic processing, and finally displayed, externally outputted or recorded at need. With respect to the demosaic processing as described later with reference to the flowcharts in FIGS. 12 and 13, the contrast component is extracted with care not to cause the chromatic aberration.

Figure 11:
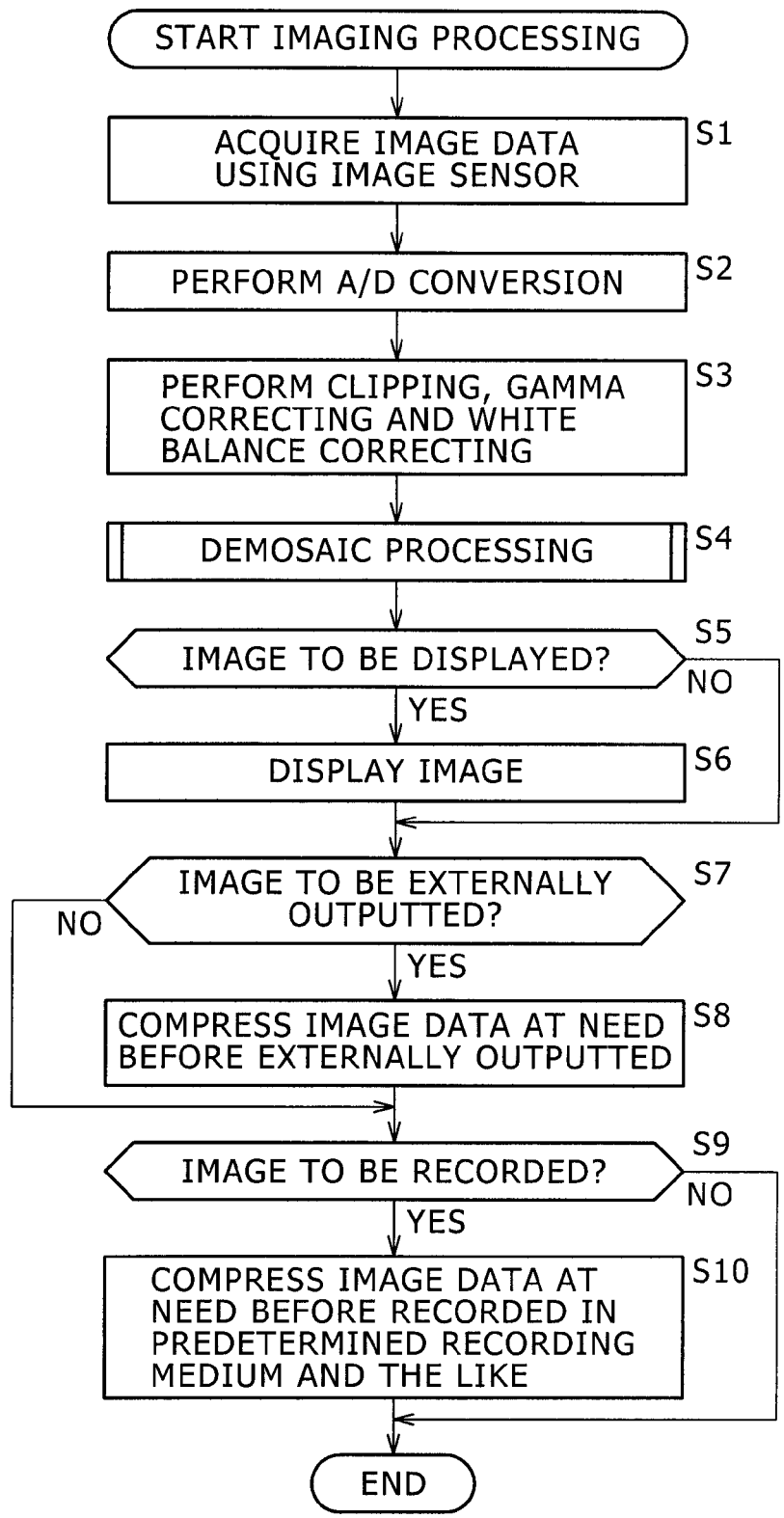
FIG. 11 is a flowchart illustrating image-capture processing.

The demosaic processing to be performed in the Step S4 in FIG. 11 is now described with reference to the flowcharts in FIGS. 12 and 13.

In Step S41, the demosaic processing unit 44 acquires the image data whose each pixel holds any one of the R, G, B, W and M component pixel values based on the filter array previously described with reference to FIG. 6.

Figure 14:
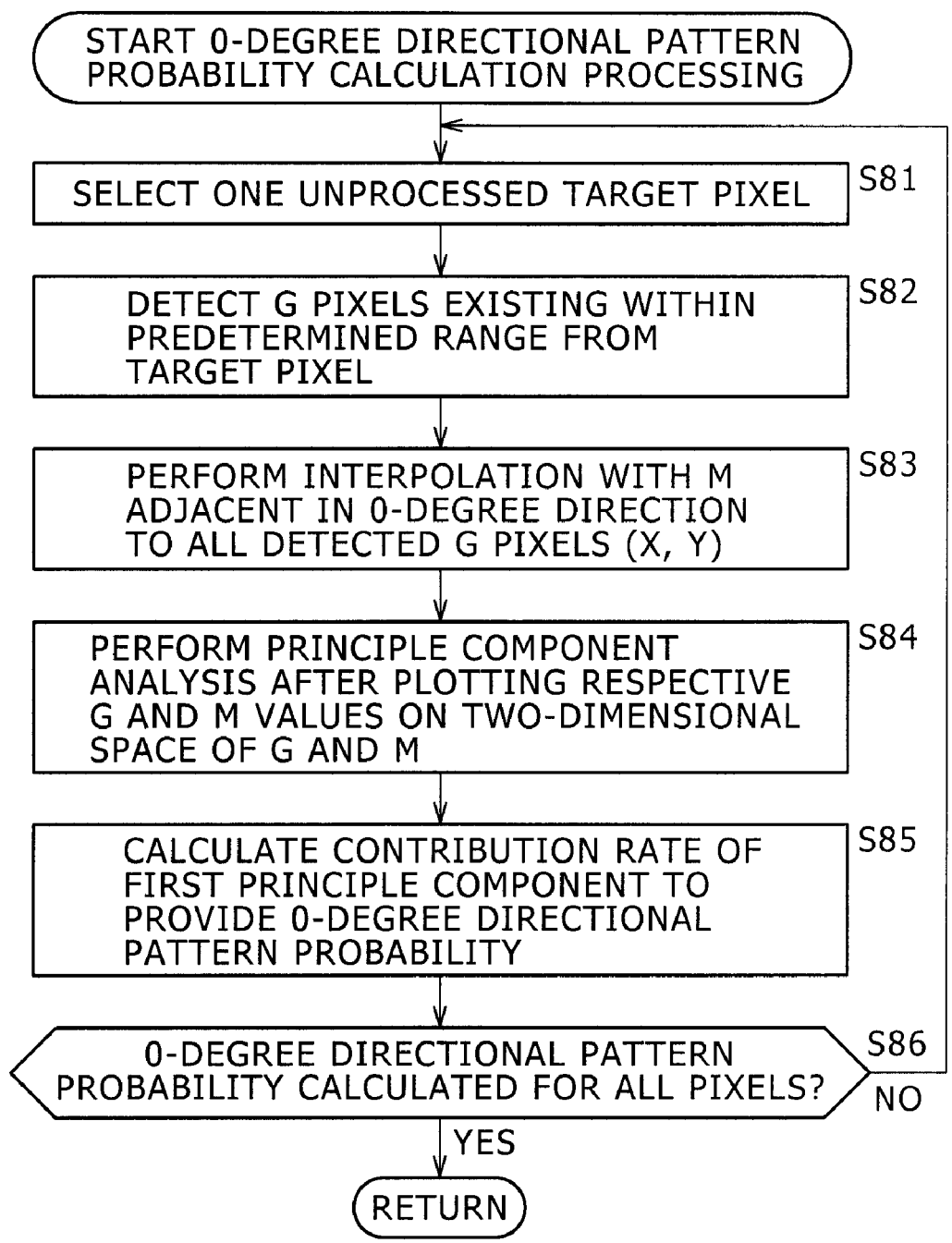
FIG. 14 is a flowchart illustrating 0-degree directional pattern probability calculation processing.

In Step S42, the 0-degree directional pattern probability calculation processing as described later with reference to the flowchart in FIG. 14 is performed.

Specifically, in the Step S42, the 0-degree directional pattern analysis processing unit 61 calculates the contribution rate of the first principle component as the pattern probability in the 0-degree direction by performing the principle component analysis about the 0-degree direction-interpolated data with respect to the target pixel contained in the output image. A low contribution rate of the first principle component is interpreted as a high possibility that there is a disagreement with the pattern in the 0-degree direction, or that the interpolation processing by the use of the adjacent pixels in the 0-degree direction is not appropriate. On the other hand, a high contribution rate of the first principle component is interpreted as a high possibility that although a change of the pattern may exist in the 90-degree direction, there is no change of the pattern at least in the 0-degree direction, or that the interpolation processing by the use of the adjacent pixels in the 0-degree direction is appropriate.

Figure 16:
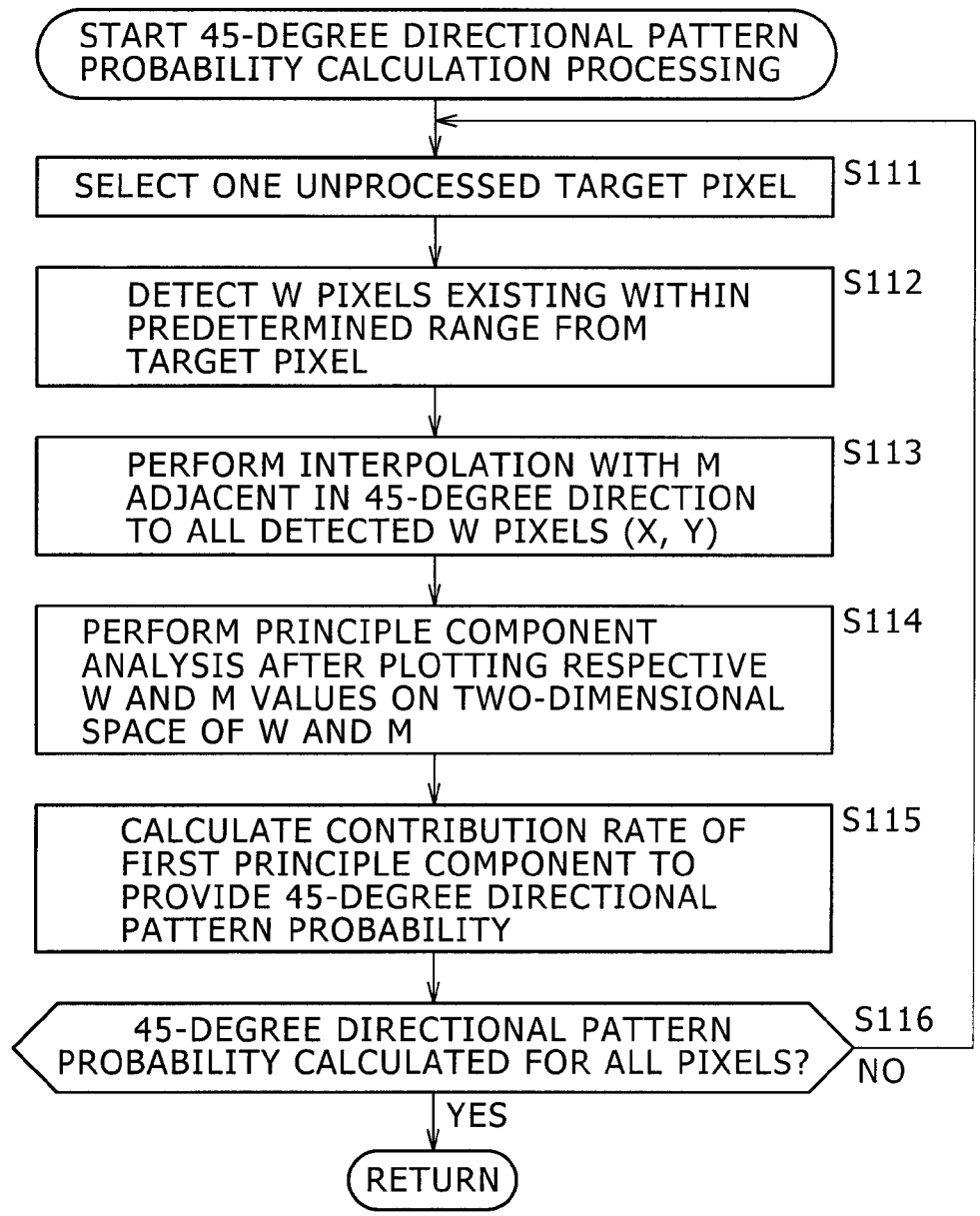
FIG. 16 is a flowchart illustrating 45-degree directional pattern probability calculation processing.

In Step S43, the 45-degree directional pattern probability calculation processing as described later with reference to the flowchart in FIG. 16 is performed.

Specifically, in the Step S43, the 45-degree directional pattern analysis processing unit 62 calculates the contribution rate of the first principle component as the pattern probability in the 45-degree direction by performing the principle component analysis about the 45-degree direction-interpolated data with respect to the target pixel contained in the output image. A low contribution rate of the first principle component is interpreted as a high possibility that there is a disagreement with the pattern in the 45-degree direction, or that the interpolation processing by the use of the adjacent pixels in the 45-degree direction is not appropriate. On the other hand, a high contribution rate of the first principle component is interpreted as a high possibility that although a change of the pattern may exist in the 135-degree direction, there is no change of the pattern at least in the 45-degree direction, or that the interpolation processing by the use of the adjacent pixels in the 45-degree direction is appropriate.

Figure 18:
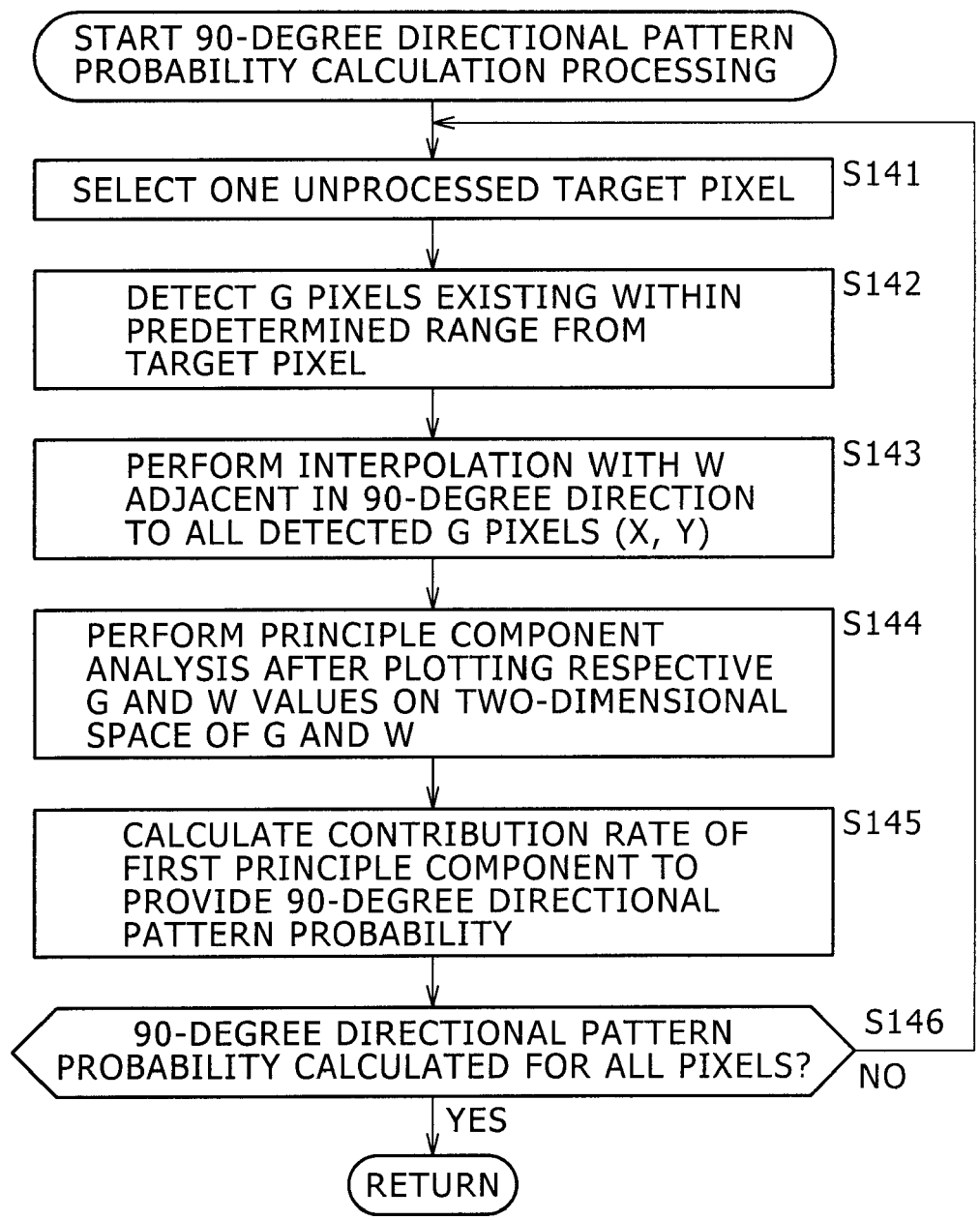
FIG. 18 is a flowchart illustrating 90-degree directional pattern probability calculation processing.

In Step S44, the 90-degree directional pattern probability calculation processing as described later with reference to the flowchart in FIG. 18 is performed.

Specifically, in the Step S44, the 90-degree directional pattern analysis processing unit 63 calculates the contribution rate of the first principle component as the pattern probability in the 90-degree direction by performing the principle component analysis about the 90-degree direction-interpolated data with respect to the target pixel contained in the output image. A low contribution rate of the first principle component is interpreted as a high possibility that there is a disagreement with the pattern in the 90-degree direction, or that the interpolation processing by the use of the adjacent pixels in the 90-degree direction is not appropriate. On the other hand, a high contribution rate of the first principle component is interpreted as a high possibility that although a change of the pattern may exist in the 0-degree direction, there is no change of the pattern at least in the 90-degree direction, or that the interpolation processing by the use of the adjacent pixels in the 90-degree direction is appropriate.

Figure 20:
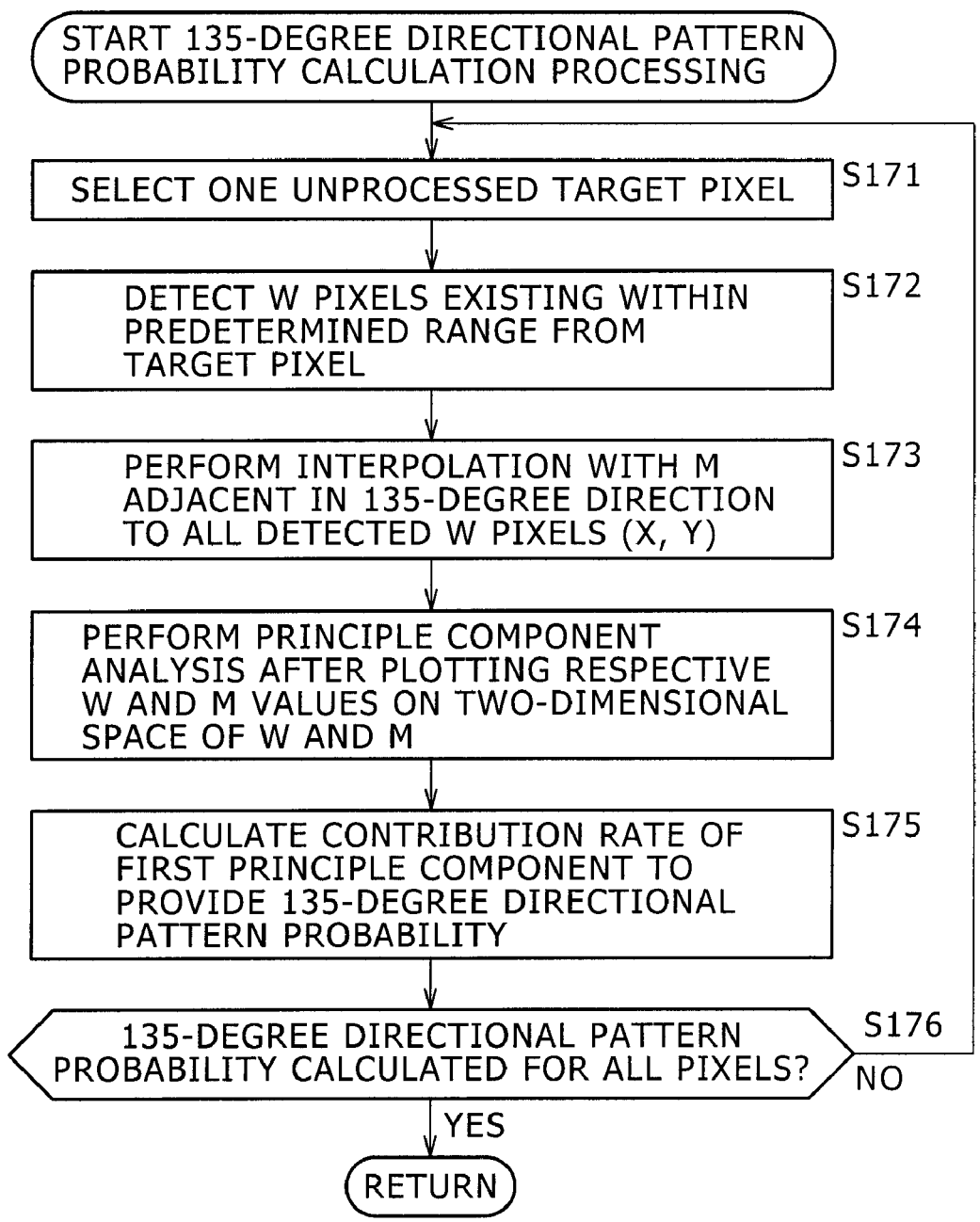
FIG. 20 is a flowchart illustrating 135-degree directional pattern probability calculation processing.

In Step S45, the 135-degree directional pattern probability calculation processing as described later with reference to the flowchart in FIG. 20 is performed.

Specifically, in the Step S45, the 135-degree directional pattern analysis processing unit 64 calculates the contribution rate of the first principle component as the pattern probability in the 135-degree direction by performing the principle component analysis about the 135-degree direction-interpolated data with respect to the target pixel contained in the output image. A low contribution rate of the first principle component is interpreted as a high possibility that there is a disagreement with the pattern in the 135-degree direction, or that the interpolation processing by the use of the adjacent pixels in the 135-degree direction is not appropriate. On the other hand, a high contribution rate of the first principle component is interpreted as a high possibility that although a change of the pattern may exist in the 45-degree direction, there is no change of the pattern at least in the 135-degree direction, or that the interpolation processing by the use of the adjacent pixels in the 135-degree direction is appropriate.

Figure 22:
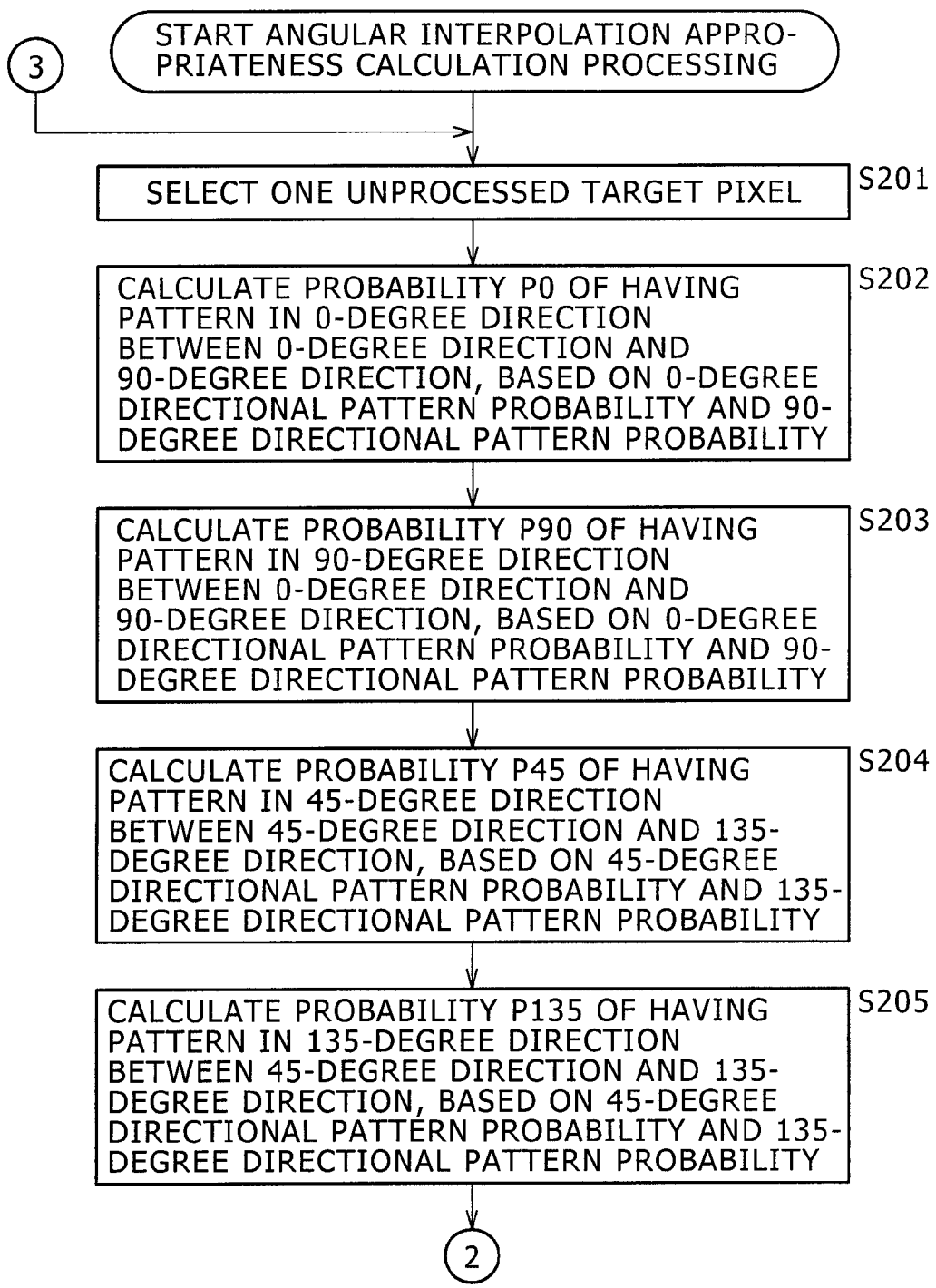
FIG. 22 is a flowchart illustrating angular interpolation appropriateness calculation processing.
Figure 23:
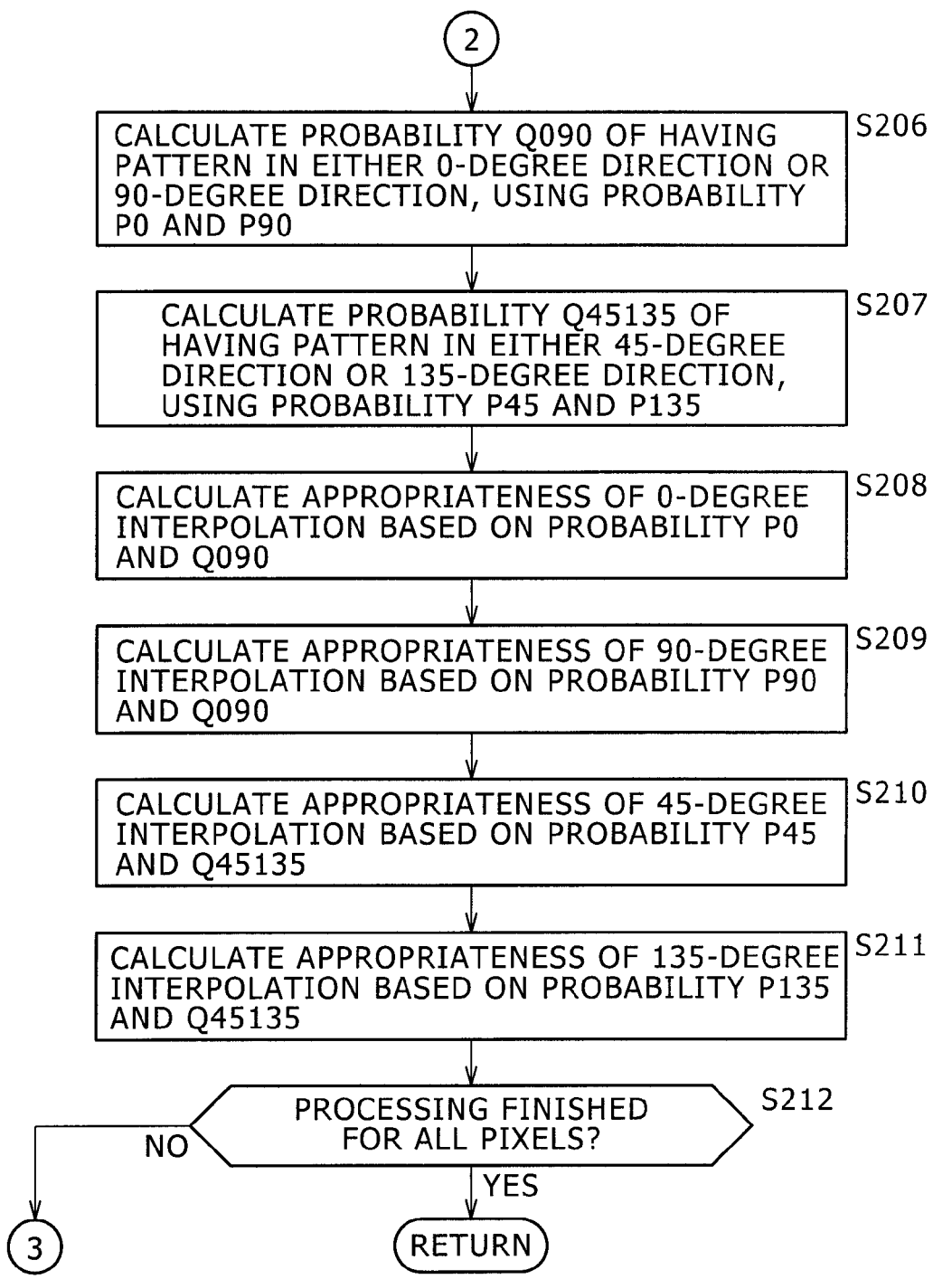
FIG. 23 is a flowchart following the flowchart in FIG. 22 to illustrate the angular interpolation appropriateness calculation processing.

In Step S46, the angular interpolation appropriateness calculation processing as described later with reference to the flowcharts in FIGS. 22 and 23 is performed.

Specifically, in the Step S46, the pattern direction determination unit 65 respectively calculates, with respect to the target pixel, the 0-degree directional interpolation appropriateness, the 45-degree directional interpolation appropriateness, the 90-degree directional interpolation appropriateness and the 135-degree directional interpolation appropriateness based on the four directional pattern probabilities already calculated through the processing in the Steps S42 to S45.

In Step S47, the 0-degree direction-interpolated G component image generation processing as described later with reference to the flowchart in FIG. 24 is performed.

Specifically, in the Step S47, the 0-degree direction-interpolated G component image calculation processing unit 71 generates the G (green) component image data resulting from the 0-degree directional interpolation processing.

In Step S48, the 45-degree direction-interpolated G component image generation processing as described later with reference to the flowchart in FIG. 26 is performed.

Specifically, in the Step S48, the 45-degree direction-interpolated G component image calculation processing unit 72 generates the G (green) component image data resulting from the 45-degree directional interpolation processing.

In Step S49, the 90-degree direction-interpolated G component image generation processing as described later with reference to the flowchart in FIG. 27 is performed.

Specifically, in the Step S49, the 90-degree direction-interpolated G component image calculation processing unit 73 generates the G (green) component image data resulting from the 90-degree directional interpolation processing.

In Step S50, the 135-degree direction-interpolated G component image generation processing as described later with reference to the flowchart in FIG. 29 is performed.

Specifically, in the Step S50, the 135-degree direction-interpolated G component image calculation processing unit 74 generates the G (green) component image data resulting from the 135-degree directional interpolation processing.

In Step S51, the G component image calculation processing unit 75 calculates the G (green) component image data under consideration of the pattern direction by performing weighted addition of the G (green) component image data resulting from the interpolation in the respective directions through the processing of the Steps S47 to S50 based on the respective angular correction appropriateness already calculated through the processing of the Step S46.

Specifically, assuming that the coordinates of the target pixel position is represented as (H, K), the G component image calculation processing unit 75 calculates, with respect to the target pixel, a value of "0-degree directional interpolation appropriateness×0-degree direction-interpolated G component image pixel value+45-degree directional interpolation appropriateness×45-degree direction-interpolated G component image pixel value+90-degree directional interpolation appropriateness×90-degree direction-interpolated G component image pixel value+135-degree directional interpolation appropriateness×135-degree direction-interpolated G component image pixel value" as a pixel value with respect to the coordinates (H, K) of the G (green) component image data to be obtained under consideration of the pattern direction. Then, this operation is performed with respect to all the pixels, leading to generation of the G (green) component image data under consideration of the pattern direction.

The G (green) component image data generated through the processing is given using the data of the W and M components acceptable to light whose frequency band is wider than that corresponding to any one of the R, G and B components in the related art. Specifically, the G (green) component image data generated through the processing may provide a satisfactory image even in the cases where the subject is not well-lighted, as compared with the image generated with only each of the R, G and B components like the related art. In addition, the data of the W and M components is used to generate the G component having no chromatic aberration, so that it is possible to obtain G component image data that permits a suppression of an out-of-focus effect caused by the chromatic aberration, although the light in the wide frequency band is accepted.

Figure 30:
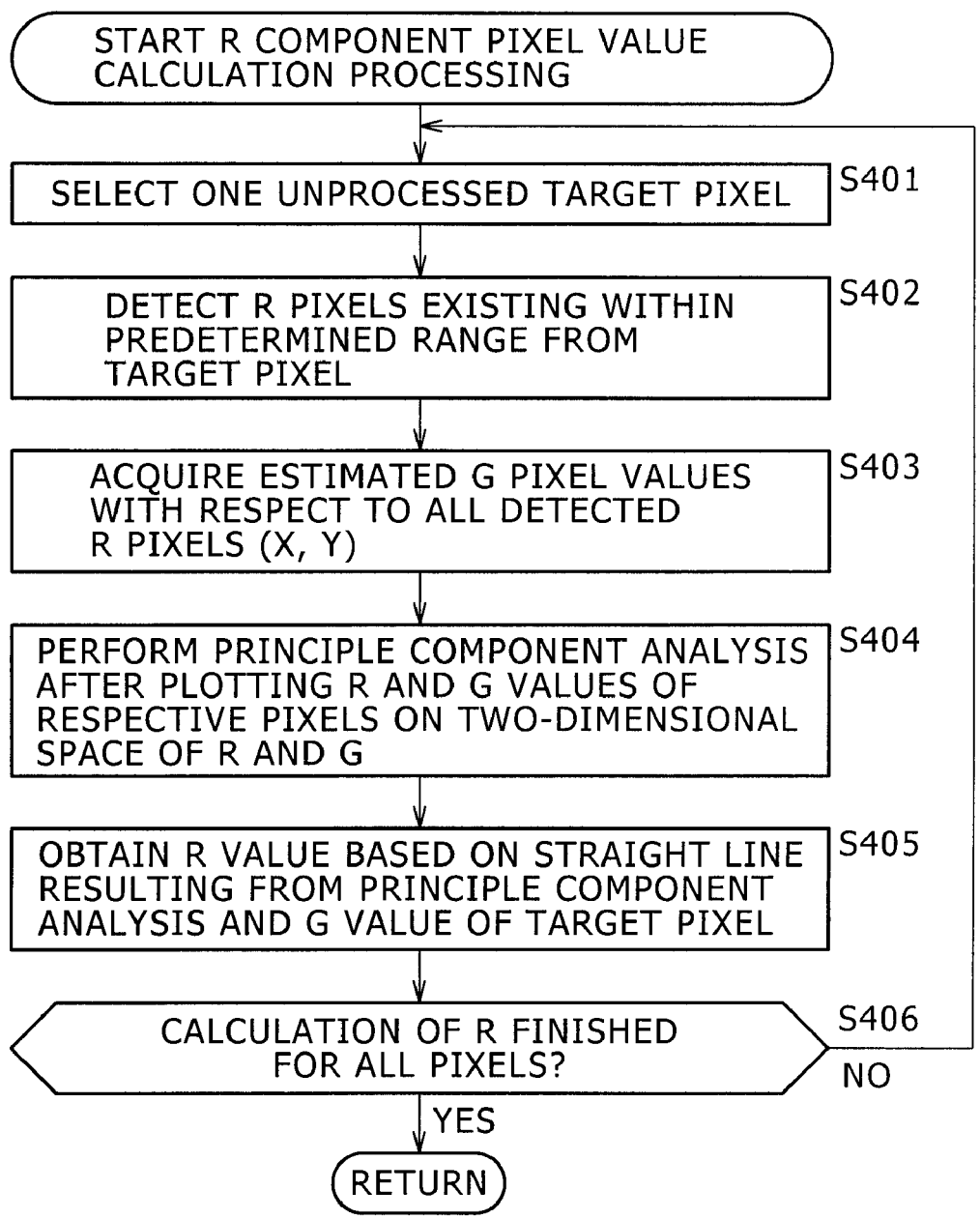
FIG. 30 is a flowchart illustrating R component pixel value calculation processing.

In Step S52, the R component pixel value calculation processing as described later with reference to the flowchart in FIG. 30 is performed.

Specifically, in the Step S52, the R component image calculation processing unit 81 calculates the correlation between the R component and the G component by performing the principle component analysis based on the R component pixel value contained in the input signal, together with the G component image data already calculated by the G component image calculation processing unit 75, followed by calculating R component image data based on the calculated correlation.

Figure 32:
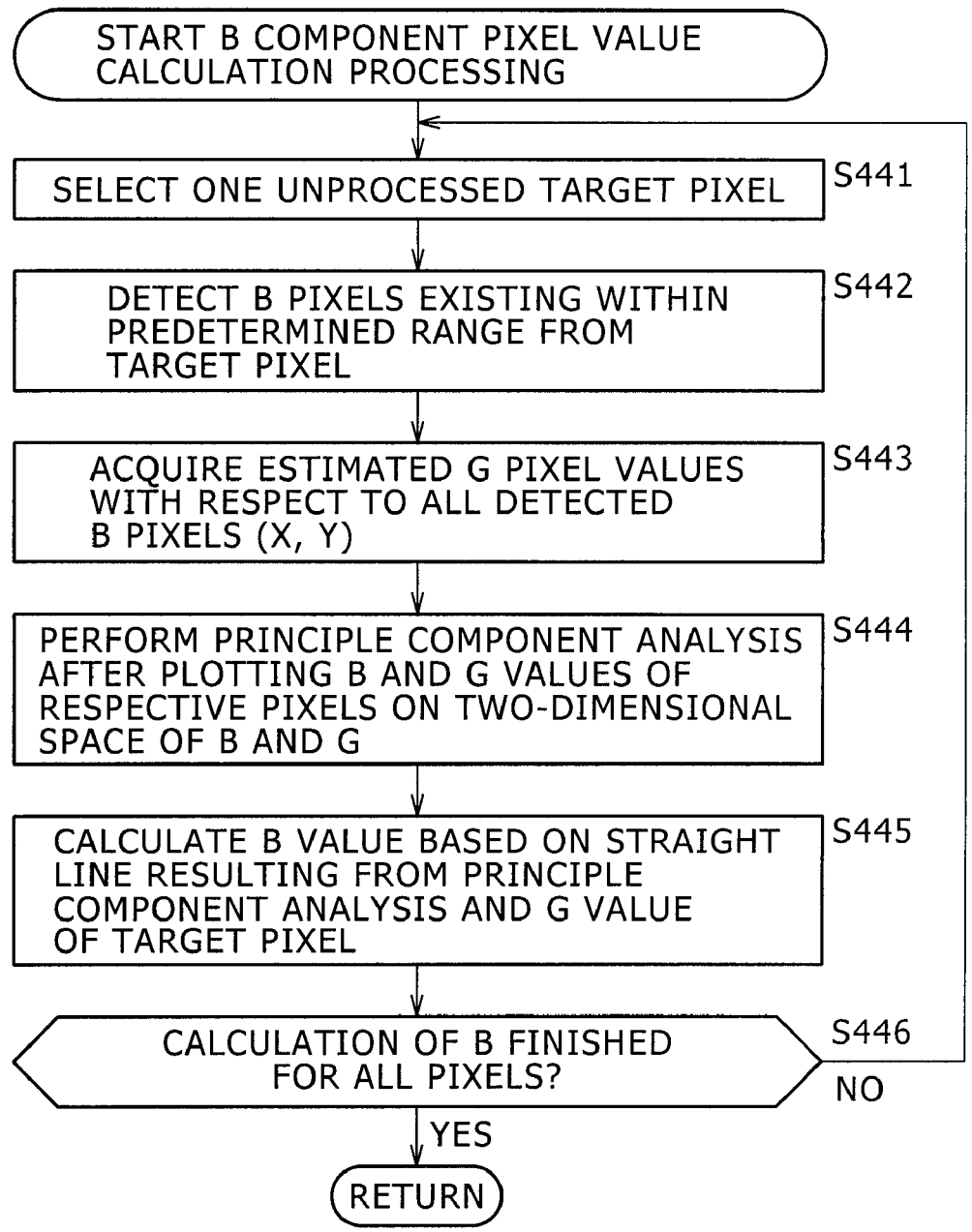
FIG. 32 is a flowchart illustrating B component pixel value calculation processing.

In Step S53, the B component pixel value calculation processing as described later with reference to the flowchart in FIG. 32 is performed.

Specifically, in the Step S53, the B component image calculation processing unit 82 calculates the correlation between the B component and the G component by performing the principle component analysis based on the B component pixel value contained in the input signal, together with the G component image data already calculated by the G component image calculation processing unit 75, followed by calculating B component image data based on the calculated correlation.

Then, in Step S54, the demosaic processing unit 44 outputs, as output image data, the G, R and B pixel values already calculated for each pixel by the G component image calculation processing unit 75, the R component image calculation processing unit 81 and the B component image calculation processing unit 82, and the processing returns to the Step S4 in FIG. 11, and is followed by the Step S5.

The processing like the brings the demosaic processing into realization, and thus may provide image data whose respective pixels hold completely the R, G and B components, from the mosaic image containing five color components, R, G, B, W and W.

In addition, the G component image data having no chromatic aberration is generated using each pixel value of the W and M components wider in frequency band than each of the R, G and B components, or greater in quantity of light detected, as compared with the R, G and B components, followed by generating the R and B component image data based on the generated G component image data, so that it is possible to obtain a satisfactory image even in cases where the subject is not well-lighted, for instance.

Further, an attempt is made to perform the interpolation processing under consideration of the pattern direction contained in the image, so that it is possible to obtain a more satisfactory image, as compared with the interpolation processing by the use of pixel values of the neighboring pixels in all directions without taking the pattern direction into consideration at all.

Figure 12:
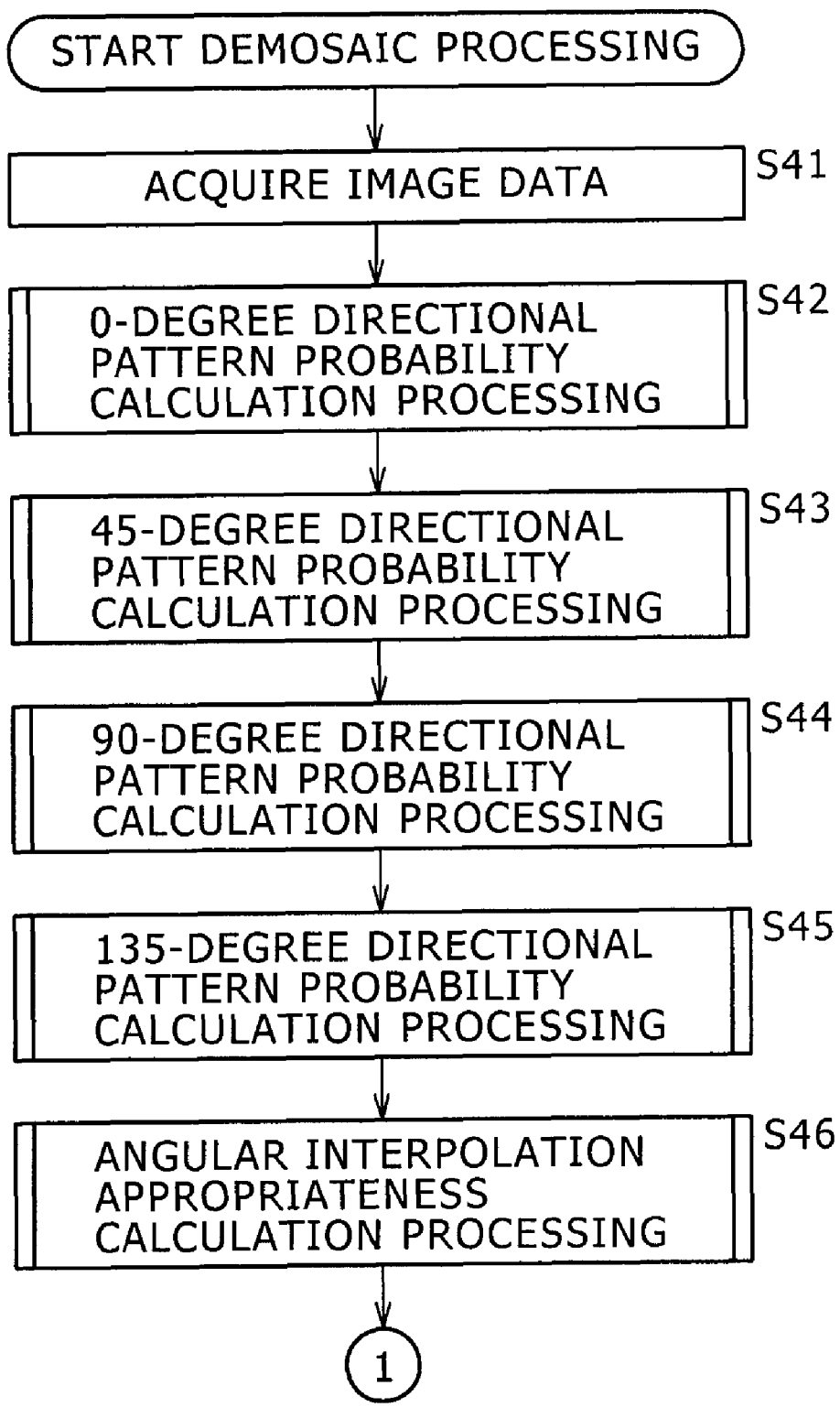
FIG. 12 is a flowchart illustrating demosaic processing.

The 0-degree directional pattern probability calculation processing to be performed in the Step S42 in FIG. 12 is now described with reference to the flowchart in FIG. 14.

In Step S81, the 0-degree directional pattern analysis processing unit 61 selects one unprocessed target pixel, wherein it is assumed that a target pixel position is represented as the coordinates (H, K), for instance In Step S82, the 0-degree directional pattern analysis processing unit 61 detects the G pixels existing within the predetermined range from the target pixel.

With respect to the filter array previously described with reference to FIG. 6, for instance, the pixel indicated by G is placed at more then one position represented by the coordinates (X, Y), where X is even-numbered, and Y is odd-numbered. Thus, the 0-degree directional analysis processing unit 61 detects the G pixels represented by the coordinates like the above, wherein the predetermined range indicates a range experientially or experimentally determined based on conditions such as the number of samples for the principle component analysis and the closeness of correlation depending on a distance from the target pixel. Assuming that the target pixel position is represented as the coordinates (H, K), for instance, the predetermined range may include those such as a range having a size of 9×9 pixels represented by the coordinates (X, Y) where H−4≦X≦H+4 and K+4≦Y≦K+4. Alternatively, a range having a different size or a range covering the predetermined number of pixels selected from the pixels existing close to each other with the target pixel as the center may also be used.

In Step S83, the 0-degree directional pattern analysis processing unit 61 performs the interpolation using the M pixels adjacent in the 0-degree direction to all the detected G pixels (X, Y).

Figure 15:
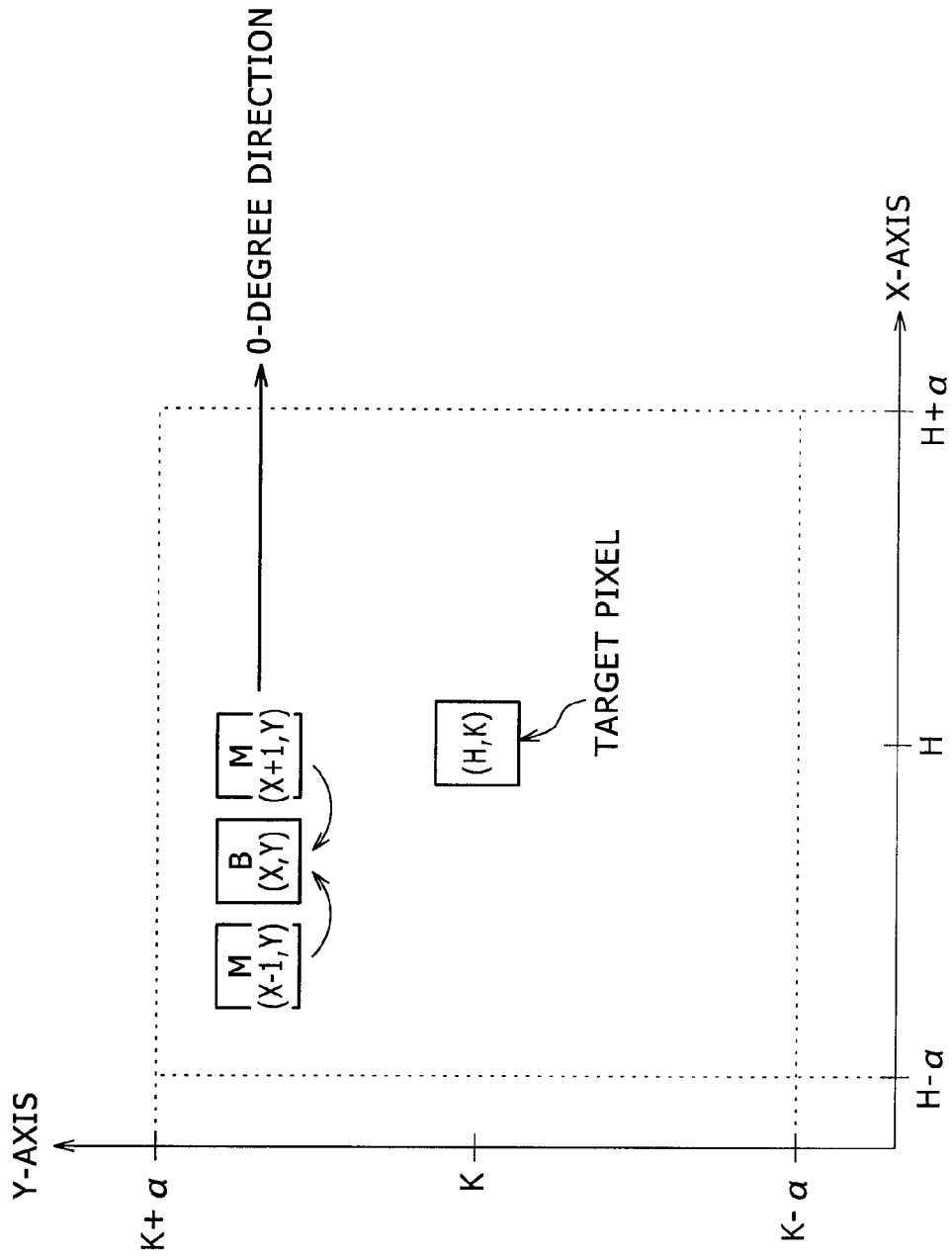
FIG. 15 is a graphic representation of interpolation processing in a 0-degree direction.

Specifically, with respect to the detected G pixels represented by the coordinates (X, Y) in the Step S82, the M pixels represented by the coordinates (X−1, Y) and (X+1, Y) are arranged adjacent in the 0-degree direction, as shown in FIG. 15. Thus, calculating an average of pixel values of the M pixels represented by the two coordinates may provide an interpolated pixel value of the 0-degree direction-interpolated M pixel with respect to the coordinates (X, Y). Specifically, the 0-degree directional pattern analysis processing unit 61 may calculate, according to an equation (1), a 0-degree direction-interpolated M pixel value with respect to the coordinates (X, Y), where X is even-numbered and Y is odd-numbered.

0-degree direction-interpolated $M$ pixel value with respect to coordinates $(X, Y)$={($M$ pixel value at coordinates $(X−1, Y)$)+($M$ pixel value at coordinates $(X+1, Y)$)}÷2    (1)

where X is even-numbered and Y is odd-numbered.

In Step S84, the 0-degree directional pattern analysis processing unit 61 performs the principle component analysis by plotting, on a two-dimensional space of G and M, the G pixel value, together with the interpolated M pixel value already obtained in the Step S83, with respect to each of the pixel positions corresponding to the G pixels already detected within the predetermined range in the Step S82.

Specifically, within the predetermined range, the G pixel value exists in the input image at each position represented by the coordinates (X, Y), where X is even-numbered, and Y is odd-numbered, while the 0-degree direction-interpolated M pixel value at the corresponding position is already obtained in the Step S83. Based on the fact, a pair of G and M pixel values is supposed to hold within the predetermined range with respect to more than one coordinates (X, Y), where X is even-numbered, and Y is odd-numbered. Thus, the 0-degree directional pattern analysis processing unit 61 may perform the principle component analysis by plotting more than one pair of G and M pixel values on the two-dimensional space of G and M.

In Step S85, the 0-degree directional pattern analysis processing unit 61 calculates the contribution rate of the first principle component with respect to the principle component analysis in the Step S84 to provide the 0-degree directional pattern probability.

The contribution rate of the first principle component is found by (Variance value of the first principle component)/(Sum of variances of each variable), which is equivalent to (Variance value of the first principle component)/(Amount of scattering of the whole samples). Specifically, for portions where there is no change of the pattern in the 0-degree direction, the plotted pairs obtained on the two-dimensional space of G and M after the interpolation properly performed by means of the 0-degree directional interpolation ought to fall on a single straight line. In other words, when there is no change of the pattern in the 0-degree direction, the result of the principle component analysis shows that the contribution rate of components other than the first principle component appears as approximately 0. Thus, the contribution rate of the first principle component is equivalent to the 0-degree directional pattern probability with respect to the target pixel. If the principle component analysis results in a low contribution rate of the first principle component, it is supposed that the change of the pattern exists in the 0-degree direction. Thus, it becomes possible to estimates that the 0-degree directional interpolation is not adaptable to obtain a correctly interpolated image.

In this processing, It should be noted that the G and M pixel values are assumed to be correlated to each other with respect to local ranges such as those represented by H−4≦X≦H+4 and K+4≦Y≦K+4. In addition, hue usually remains unchanged at positions where there is the change of the pattern. That is, the G and M pixel values are usually supposed to have a proportional relation (where a coefficient of proportion is positive) with each other. Thus, in calculating the first principle component, it is also allowable to make a condition that it is necessary to pass through the origin. Alternatively, when the direction of the first principle component forms a negative inclination, it is also allowable to make an attempt to reduce a value of the 0-degree directional pattern probability at a predetermined rate.

In Step S86, the 0-degree directional pattern analysis processing unit 61 judges whether or not the 0-degree directional pattern probability has been already calculated for all the pixels. When the result of judgment in the Step S86 is that the 0-degree directional pattern probability is not calculated yet for all the pixels, the processing returns to the Step S81, causing reprocessing to be performed from the Step S81. When the result of judgment in the Step S86 is that the 0-degree directional pattern probability has been already calculated for all the pixels, the processing returns to the Step S42 in FIG. 12, and is followed by the Step S43.

The processing like the may calculate the possibility that the direction of the pattern in the vicinity of the target pixel agrees with the 0-degree direction, in other words, the probability (or possibility) of having the pattern in the 0-degree direction, using the pixel value of the pixel having the G component and the pixel value of the pixel having the M component among the pixels in the input image data.

The 45-degree directional pattern probability calculation processing to be performed in the Step S42 in FIG. 12 is now described with reference to the flowchart in FIG. 16.

In Step S111, the 45-degree directional pattern analysis processing unit 62 selects one unprocessed target pixel, wherein it is assumed that the target pixel position is represented as coordinates (H, K), for instance.

In Step S112, the 45-degree directional pattern analysis processing unit 62 detects the W pixels existing within the predetermined range from the target pixel.

With respect to the filter array previously described with reference to FIG. 6, for instance, the pixel indicated by W is placed at more than one position represented by the coordinates (X, Y), where X and Y are both even-numbered. The 45-degree directional analysis processing unit 62 detects the W pixels represented by the coordinates like the.

In Step S113, the 45-degree directional pattern analysis processing unit 62 performs the interpolation using the M pixels adjacent in the 45-degree direction to all the detected W pixels (X, Y).

Figure 17:
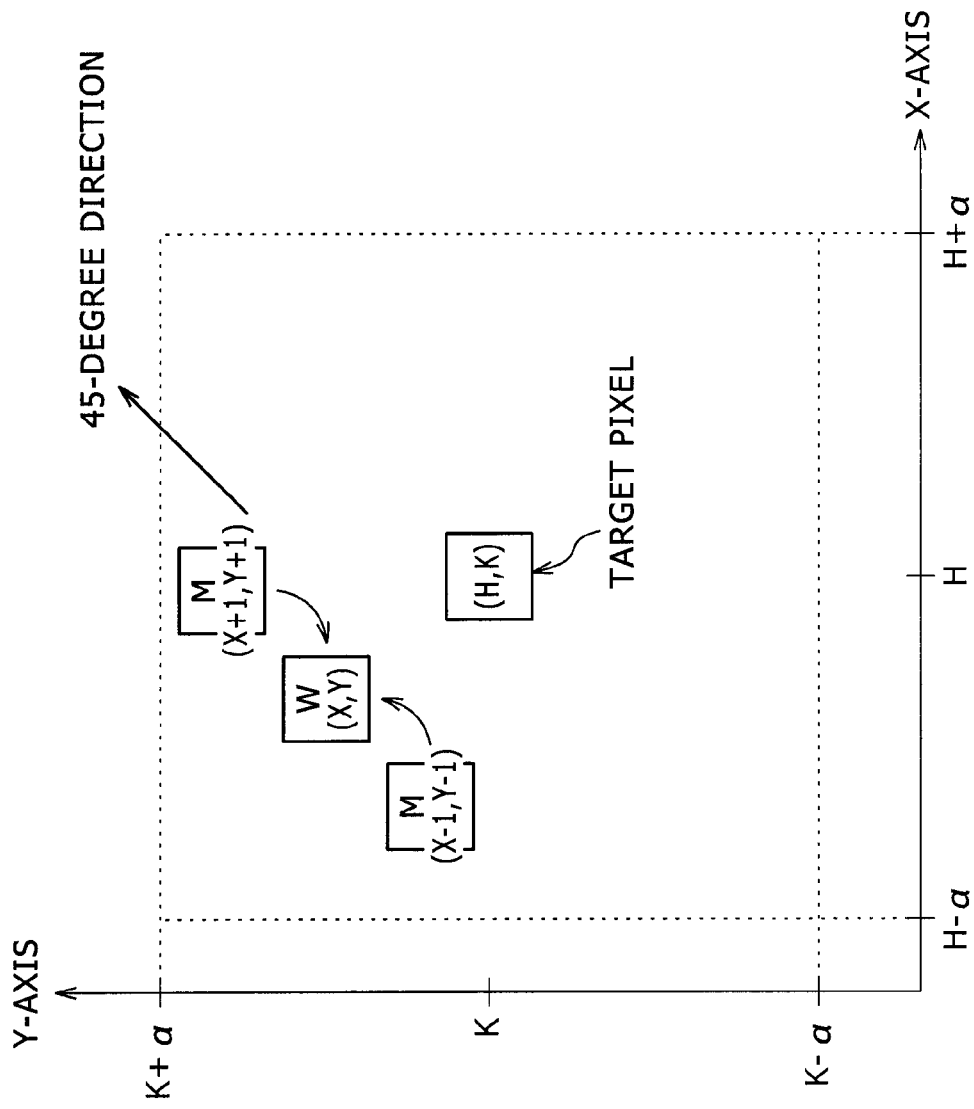
FIG. 17 is a graphic representation of interpolation processing in a 45-degree direction.

Specifically, with respect to the detected W pixels represented by the coordinates (X, Y) in the Step S112, the M pixels represented by the coordinates (X−1, Y−1) and (X+1, Y+1) are arranged adjacent in the 45-degree direction as shown in FIG. 17. Thus, calculating an average of pixel values of the M pixels represented by the two coordinates may provide an interpolated pixel value of the 45-degree direction-interpolated M pixel with respect to the coordinates (X, Y). Specifically, the 45-degree directional pattern analysis processing unit 62 may calculate, according to an equation (2), a 45-degree direction interpolated M pixel value with respect to the coordinates (X, Y), where X and Y are both even-numbered.

45-degree direction-interpolated $M$ pixel value with respect to coordinates $(X, Y)=\{(M$ pixel value at coordinates $(X-1, Y-1))+(M$ pixel value at coordinates $(X+1, Y+1))\}\div 2$ (2)

where X and Y are both even-numbered

In Step S114, the 45-degree directional pattern analysis processing unit 62 performs the principle component analysis by plotting, on a two-dimensional space of W and M, the W pixel value, together with the interpolated M pixel value already obtained in the Step S113, with respect to each of the pixel positions corresponding to the W pixels already detected within the predetermined range in the Step S112.

Specifically, within the predetermined range, the W pixel value exists in the input image at each position represented by the coordinates (X, Y), where X and Y are both even-numbered, while the 45-degree direction-interpolated M pixel value at the corresponding position is already obtained in the Step S113. Based on the fact, a pair of W and M pixel values is supposed to hold within the predetermined range with respect to more than one coordinates (X, Y), where X and Y are both even-numbered. Thus, the 45-degree directional pattern analysis processing unit 62 may perform the principle component analysis by plotting more than one pair of W and M pixel values on the two-dimensional space of W and M.

In Step S115, the 45-degree directional pattern analysis processing unit 62 calculates the contribution rate of the first principle component with respect to the principle component analysis in the Step S114 to provide the 45-degree directional pattern probability.

The contribution rate of the first principle component is found by (Variance value of the first principle component)/(Sum of variances of each variable), which is equivalent to (Variance value of the first principle component)/(Amount of scattering of the whole samples). Specifically, for portions where there is no change of the pattern in the 45-degree direction, the plotted pairs obtained on the two-dimensional space of the W and M components after the interpolation properly performed by means of the 45-degree directional interpolation ought to fall on a single straight line. In other words, when there is no change of the pattern in the 45-degree direction, the result of the principle component analysis shows that a contribution rate of the components other than the first principle component appears as approximately 0. Thus, the contribution rate of the first principle component is equivalent to the 45-degree directional pattern probability with respect to the target pixel. If the principle component analysis results in a low contribution rate of the first principle component, it is supposed that the change of the pattern exists in the 45-degree direction. Thus, it becomes possible to assume that the 45-degree directional interpolation cannot obtain a correctly interpolated image.

In this processing, It should be noted that the W and M pixel values are assumed to be correlated to each other with respect to local regions such as those shown by H−4≦X≦H+4 and K+4≦Y≦K+4. In addition, hue usually remains unchanged at positions where there is the change of the pattern. That is, the W and M pixel values are usually supposed to have a proportional relation (where a coefficient of proportion is positive) with each other. Thus, in calculating the first principle component, it is also allowable to make a condition that it is necessary to pass through the origin. Alternatively, when the direction of the first principle component forms a negative inclination, it is also allowable to make an attempt to reduce a value of the 45-degree directional pattern probability at a predetermined rate.

In Step S116, the 45-degree directional pattern analysis processing unit 62 judges whether or not the 45-degree directional pattern probability has been already calculated for all the pixels. When the result of judgment in the Step S116 is that the 45-degree directional pattern probability is not calculated yet for all the pixels, the processing returns to the Step S111, causing reprocessing to be performed from the Step S111. When the result of judgment in the Step S116 is that the 45-degree directional pattern probability has been already calculated for all the pixels, the processing returns to the Step S43 in FIG. 12, and is followed by the Step S44.

The processing like the may calculate the possibility that the direction of the pattern in the vicinity of the target pixel agrees with the 45-degree direction, in other words, the probability (or possibility) of having the pattern in the 45-degree direction, using the pixel value of the pixel having the W component and the pixel value of the pixel having the M component among the pixels in the input image data.

The 90-degree directional pattern probability calculation processing to be performed in the Step S44 in FIG. 12 is now described with reference to the flowchart in FIG. 18.

In Step S141, the 90-degree directional pattern analysis processing unit 63 selects one unprocessed target pixel, wherein it is assumed that the target pixel position is represented as the coordinates (H, K), for instance.

In Step S142, the 90-degree directional pattern analysis processing unit 63 detects the G pixels existing within the predetermined range from the target pixel.

As described the above, with respect to the filter array previously described with reference to FIG. 6, for instance, the pixel indicated by G is placed at more than one position represented by the coordinates (X, Y), where X is even-numbered and Y is odd-numbered. The 90-degree directional analysis processing unit 63 detects the G pixels represented by the coordinates like the.

In Step S143, the 90-degree directional pattern analysis processing unit 63 performs the interpolation using the M pixels adjacent in the 90-degree direction to all the detected G pixels (X, Y).

Figure 19:
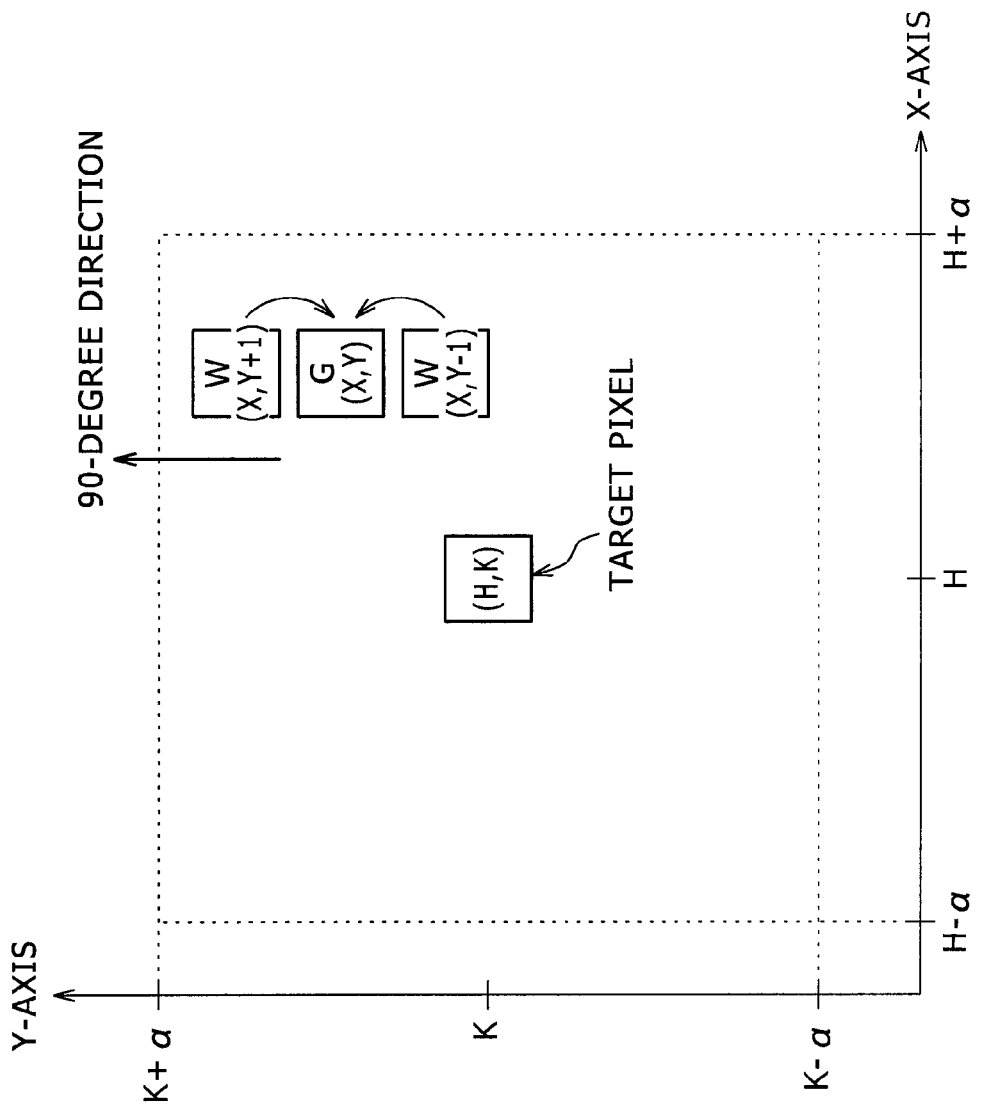
FIG. 19 is a graphic representation of interpolation processing in a 90-degree direction.

Specifically, with respect to the detected G pixels represented by the coordinates (X, Y) in the Step S142, the W pixels represented by the coordinates (X, Y+1) and (X, Y−1) are arranged adjacent in the 90-degree direction as shown in FIG. 19. Thus, calculating an average of pixel values of the W pixels represented by the two coordinates may provide an interpolated pixel value of the 90-degree direction-interpolated W pixel with respect to the coordinates (X, Y). Specifically, the 90-degree directional pattern analysis processing unit 63 may calculate, according to an equation (3), a 90-degree direction-interpolated W pixel value with respect to the coordinates (X, Y), where the X is even-numbered and Y is odd-numbered.

90-degree direction-interpolated $W$ pixel value with respect to coordinates $(X, Y)=\{(W$ pixel value at coordinates $(X, Y+1))+(W$ pixel value at coordinates $(X, Y-1))\}\div 2$ (3)

where X is even-numbered and Y is odd-numbered

In Step S144, the 90-degree directional pattern analysis processing unit 63 performs the principle component analysis by plotting, on a two-dimensional space of G and W, the G pixel value, together with an interpolated W pixel value already obtained in the Step S143, with respect to each of the pixel positions corresponding to the G pixels already detected within the predetermined range in the Step S142.

Specifically, within the predetermined range, the G pixel value exists in the input image at each position represented by the coordinates (X, Y), where X is even-numbered, and Y is odd-numbered, while the 90-degree direction-interpolated W pixel value at the corresponding position is already obtained in the Step S143. Based on the fact, a pair of G and W pixel values is supposed to hold within the predetermined range with respect to more than one coordinates (X, Y) where X is even-numbered, and Y is odd-numbered. Thus, the 90-degree directional pattern analysis processing unit 63 may perform the principle component analysis by plotting more than one pair of G and W pixel values on the two-dimensional space of G and W.

In Step S145, the 90-degree directional pattern analysis processing unit 63 calculates the contribution rate of the first principle component with respect to the principle component analysis in the Step S144 to provide the 90-degree directional pattern probability.

The contribution rate of the first principle component is found by (Variance value of the first principle component)/(Sum of variances of each variable), which is equivalent to (Variance value of the first principle component)/(Amount of scattering of the whole samples). Specifically, for portions where there is no change of the pattern in the 90-degree direction, the plotted pairs obtained on the two-dimensional space of G and W after the interpolation properly performed by means of the 90-degree directional interpolation ought to fall on a single straight line. In other words, when there is no change of the pattern in the 90-degree direction, the result of the principle component analysis shows that a contribution rate of the components other than the first principle component appears as approximately 0. Thus, the contribution rate of the first principle component is equivalent to the 90-degree directional pattern probability with respect to the target pixel. If the principle component analysis results in a low contribution rate of the first principle component, it is supposed that the change of the pattern exists in the 90-degree direction. Thus, it becomes possible to estimates that the 90-degree directional interpolation is not adaptable to obtain a correctly interpolated image.

In this processing, It should be noted that the G and W pixel values are assumed to be correlated to each other with respect to local regions such as those shown by $H-4 \leq X \leq H+4$ and $K+4 \leq Y \leq K+4$. In addition, hue usually remains unchanged at positions where there is the change of the pattern. That is, the G and W pixel values are usually supposed to have a proportional relation (where a coefficient of proportion is positive) with each other. Thus, in calculating the first principle component, it is also allowable to make a condition that it is necessary to pass through the origin. Alternatively, when the direction of the first principle component forms a negative inclination, it is also allowable to make an attempt to reduce a value of the 90-degree directional pattern probability at a predetermined rate.

In Step S146, the 90-degree directional pattern analysis processing unit 63 judges whether or not the 90-degree directional pattern probability has been already calculated for all the pixels. When the result of judgment in the Step S146 is that the 90-degree directional pattern probability is not calculated yet for all the pixels, the processing returns to the Step S141, causing reprocessing to be performed from the Step S141. When the result of judgment in the Step S146 is that the 90-degree directional pattern probability has been already calculated for all the pixels, the processing returns to the Step S44 in FIG. 12, and is followed by the Step S45.

The processing like the may calculate the possibility that the direction of the pattern in the vicinity of the target pixel agrees with the 90-degree direction, in other words, the probability (or possibility) of having the pattern in the 90-degree direction, using the pixel value of the pixel having the G component and the pixel value of the pixel having the W component among the pixels in the input image data.

The 135-degree directional pattern probability calculation processing to be performed in the Step S45 in FIG. 12 is now described with reference to the flowchart in FIG. 20.

In Step S171, the 135-degree directional pattern analysis processing unit 64 selects one unprocessed target pixel, wherein it is assumed that the target pixel position is represented as the coordinates (H, K), for instance.

In Step S172, the 135-degree directional pattern analysis processing unit 64 detects the W pixels existing within the predetermined range from the target pixel.

With respect to the filter array preciously described with reference to FIG. 6, for instance, the pixel indicated by W exists at more than one position represented by the coordinates (X, Y), where X and Y are both even-numbered. The 135-degree directional analysis processing unit 64 detects the W pixels represented by the coordinates like the.

In Step S173, the 135-degree directional pattern analysis processing unit 64 performs the interpolation using the M pixels adjacent in the 135-degree direction to all the detected W pixels (X, Y).

Figure 21:
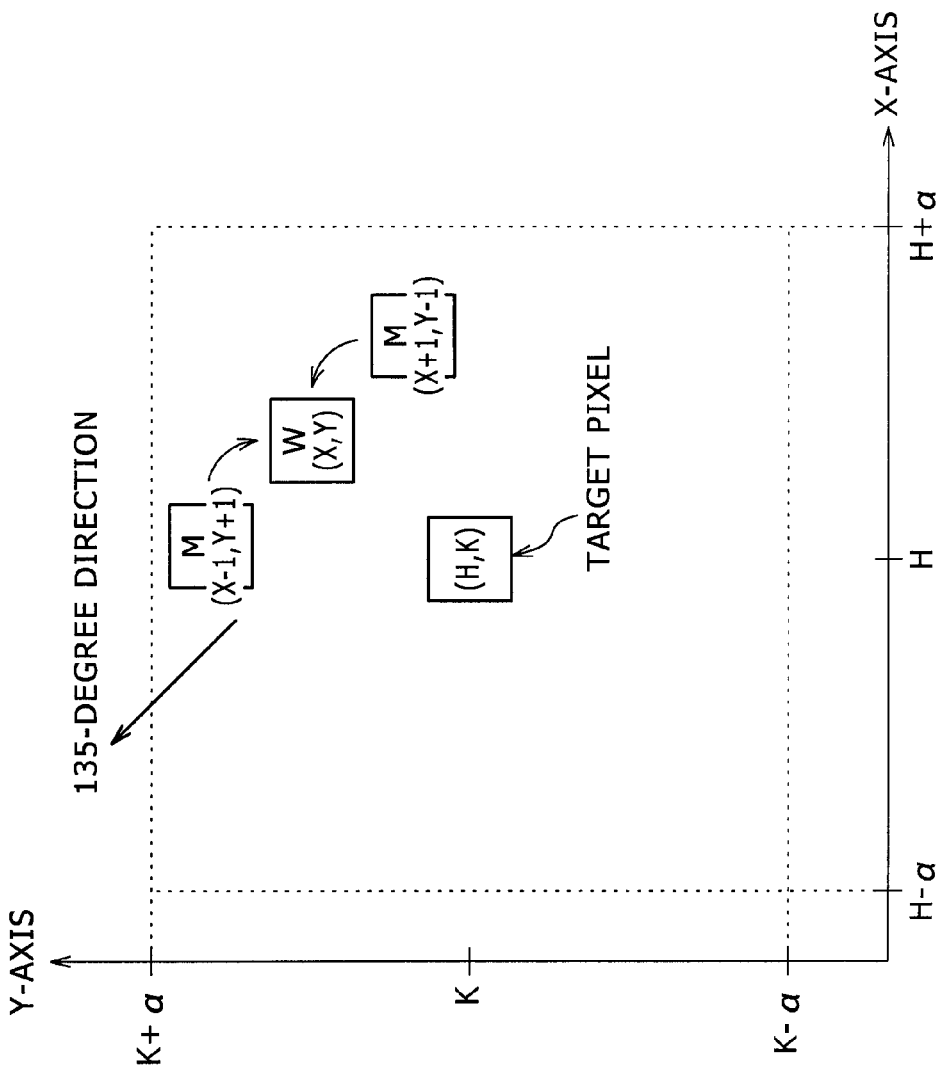
FIG. 21 is a graphic representation of interpolation processing in a 135-degree direction.

Specifically, with respect to the detected W pixels represented by the coordinates (X, Y) in the Step S172, the M pixels represented by the coordinates (X−1, Y+1) and (X+1, Y−1) are arranged adjacent in the 135-degree direction as shown in FIG. 21. Thus, calculating an average of pixel values of the M pixels represented by the two coordinates may provide an interpolated pixel value of the 135-degree direction-interpolated M pixel with respect to the coordinates (X, Y). Specifically, the 135-degree directional pattern analysis processing unit 64 may calculate, according to an equation (4), a 135-degree direction-interpolated M pixel value with respect to the coordinates (X, Y) where the X and Y are both even-numbered.

135-degree direction-interpolated *M* pixel value with respect to coordinates (*X, Y*)={(*M* pixel value at coordinates (*X*−1, *Y*+1))+(*M* pixel value at coordinates (*X*+1, *Y*−1))}÷2     (4)

where X and Y are both even-numbered

In Step S174, the 135-degree directional pattern analysis processing unit 64 performs the principle component analysis by plotting, on a two-dimensional space of W and M, the W pixel value, together with the interpolated M pixel value already obtained in the Step S173, with respect to each of the pixel positions corresponding to the W pixels already detected within the predetermined range in the Step S172.

Specifically, within the predetermined range, the W pixel value exists in the input image at each position represented by the coordinates (X, Y), where X and Y are both even-numbered, while the 135-degree interpolated M pixel value at the corresponding position is already obtained in the Step S173. Based on the fact, a pair of W and M pixel values is supposed to hold within the predetermined range with respect to more than one coordinates (X, Y), where X and Y are both even-numbered. Thus, the 135-degree directional pattern analysis processing unit 64 may perform the principle component analysis by plotting more than one pair of W and M pixel values on the two-dimensional space of W and M.

In Step S175, the 135-degree directional pattern analysis processing unit 64 calculates the contribution rate of the first principle component with respect to the principle component analysis in the Step S174 to provide the 135-degree directional pattern probability.

The contribution rate of the first principle component is found by (Variance value of the first principle component)/ (Sum of variances of each variable), which is equivalent to (Variance value of the first principle component)/(Amount of scattering of the whole samples). Specifically, for portions where there is no change of the pattern in the 135-degree direction, the plotted pairs obtained on the two-dimensional space of W and M after the interpolation properly performed by means of the 135-degree directional interpolation ought to fall on a single straight line. In other words, when there is no change of the pattern in the 135-degree direction, the result of the principle component analysis shows that a contribution rate of the components other than the first principle component appears as approximately 0. Thus, the contribution rate of the first principle component is equivalent to the 135-degree directional pattern probability with respect to the target pixel. If the principle component analysis results in a low contribution rate of the first principle component, it is supposed that the change of the pattern exists in the 135-degree direction. Thus, it becomes possible to estimates that the 135-degree directional interpolation is not adaptable to obtain a correctly interpolated image.

In this processing, It should be noted that the W and M pixel values are assumed to be correlated to each other with respect to local regions such as those shown by $H-4 \leq X \leq H+4$ and $K+4 \leq Y \leq K+4$. In addition, hue usually remains unchanged at positions where there is the change of the pattern. That is, the W and M pixel values are usually supposed to have a proportional relation (where a coefficient of proportion is positive) with each other. Thus, in calculating the first principle component, it is also allowable to make a condition that it is necessary to pass through the origin. Alternatively, when the direction of the first principle component forms a negative inclination, it is also allowable to make an attempt to reduce a value of the 135-degree directional pattern probability at a predetermined rate.

In Step S176, the 135-degree directional pattern analysis processing unit 64 judges whether or not the 135-degree directional pattern probability has been already calculated for all the pixels. When the result of judgment in the Step S176 is that the 135-degree directional pattern probability is not calculated yet for all the pixels, the processing returns to the Step S171, causing reprocessing to be performed from the Step S171. When the result of judgment in the Step S176 is that the 135-degree directional pattern probability has been already calculated for all the pixels, the processing returns to the Step S45 in FIG. 12, and is followed by the Step S46.

The processing like the may calculate the possibility that the direction of the pattern in the vicinity of the target pixel agrees with the 135-degree direction, in other words, the probability (or possibility) of having the pattern in the 135-degree direction, using the pixel value of the pixel having the W component and the pixel value of the pixel having the M component among the pixels in the input image data.

The angular interpolation appropriateness calculation processing to be performed in the Step S46 is now described with reference to the flowchart in FIGS. 22 and 23.

In this processing, the pattern probability at the respective angles as previously described with reference to FIGS. 14 to 21 is used as the index to determine whether or not the angle concerned is accurate as the pattern angle, without taking any angles other than the one concerned into consideration. On the other hand, the term of the appropriateness is used as the index in determining whether or not the angle concerned is accurate as the pattern angle, in consideration of angles other than the one concerned.

In Step S201, the pattern direction determination unit 65 selects one unprocessed target pixel.

In Step S202, the pattern direction determination unit 65 calculates, based on the 0-degree directional pattern probability and the 90-degree directional pattern probability of the target pixel, probability P0 that there is the pattern in the 0-degree direction between the 0-degree direction and the 90-degree direction. Specifically, the pattern direction determination unit 65 determines the probability P0 that there is the pattern in the 0-degree direction between the 0-degree direction and the 90-degree direction by the calculation of (0-degree directional pattern probability)÷{(0-degree directional pattern probability)+(90-degree directional pattern probability)}.

In Step S203, the pattern direction determination unit 65 calculates, based on the 0-degree directional pattern probability and the 90-degree directional pattern probability of the target pixel, probability P90 that there is the pattern in the 90-degree direction between the 0-degree direction and the 90-degree direction. Specifically, the pattern direction determination unit 65 determines the probability P90 that there is the pattern in the 90-degree direction between the 0-degree direction and the 90-degree direction by the calculation of (90-degree directional pattern probability)÷{(0-degree directional pattern probability)+(90-degree directional pattern probability)}.

In Step S204, the pattern direction determination unit 65 calculates, based on the 45-degree directional pattern probability and the 135-degree directional pattern probability of the target pixel, probability P45 that there is the pattern in the 45-degree direction between the 45-degree direction and the 135-degree direction. Specifically, the pattern direction determination unit 65 determines the probability P45 that there is the pattern in the 45-degree direction between the 45-degree direction and the 135-degree direction by the calculation of (45-degree directional pattern probability)÷{(45-degree directional pattern probability)+(135-degree directional pattern probability)}.

In Step S205, the pattern direction determination unit 65 calculates, based on the 45-degree directional pattern probability and the 135-degree directional pattern probability of the target pixel, probability P135 that there is the pattern in the 135-degree direction between the 45-degree direction and the 135-degree direction. Specifically, the pattern direction determination unit 65 determines the probability P135 that there is the pattern in the 135-degree direction between the 45-degree direction and the 135-degree direction from the calculation of (135-degree directional pattern probability)÷{(45-degree directional pattern probability)+(135-degree directional pattern probability)}.

It should be noted that the probabilities P0 and P90 obtained in the Steps S202 and S203 are assumed to be values calculated without taking the 45-degree directional pattern probability and the 135-degree directional pattern probability into consideration, and that the probabilities P45 and P135 obtained in the Steps S204 ad S205 are assumed to be values calculated without taking the 0-degree directional pattern probability and the 90-degree directional pattern probability into consideration.

In Step S206, the pattern direction determination unit 65 calculates, using the calculated probabilities P0 and P90, probability Q090 whose pattern exists in either the 0-degree direction or the 90-degree direction. Specifically, the pattern direction determination unit 65 determines the probability Q090 whose pattern exists in either the 0-degree direction or the 90-degree direction by the calculation of (P0−Absolute value of P90)÷{(P0−Absolute value of P90)+(P45−Absolute value of P135)}.

In Step S207, the pattern direction determination unit 65 calculates, using the calculated probabilities P45 and P135, probability Q45135 whose pattern exists in either the 45-degree direction or the 135-degree direction. Specifically, the pattern direction determination unit 65 determines the probability Q45135 whose pattern exists in either the 45-degree direction or the 135-degree direction by the calculation of (P45−Absolute value of P135)÷{(P0−Absolute value of P90)+(P45−Absolute value of P135)}.

In Step S208, the pattern direction determination unit 65 calculates appropriateness of the 0-degree directional interpolation based on the calculated probabilities P0 and Q090. Specifically, the pattern direction determination unit 65 determines the appropriateness of the 0-degree directional interpolation by the calculation of P0× Q090.

In Step S209, the pattern direction determination unit 65 calculates appropriateness of the 90-degree directional interpolation based on the calculated probabilities P90 and Q090. Specifically, the pattern direction determination unit 65 determines the appropriateness of the 90-degree directional interpolation by the calculation of P0× Q090.

In Step S210, the pattern direction determination unit 65 calculates appropriateness of the 45-degree directional interpolation based on the calculated probabilities P45 and Q45135. Specifically, the pattern direction determination unit 65 determines the appropriateness of the 45-degree directional interpolation by the calculation of P45×Q45135.

In Step S211, the pattern direction determination unit 65 calculates appropriateness of the 135-degree directional interpolation based on the calculated probabilities P135 and Q45135. Specifically, the pattern direction determination unit 65 determines the appropriateness of the 135-degree directional interpolation by the calculation of P135×Q45135.

In Step S212, the pattern direction determination unit 65 judges whether or not the processing has been already completed for all the pixels. When the result of judgment in the Step S212 is that the processing is not completed yet for all the pixels, the processing returns to the Step S201, causing reprocessing to be performed from the Step S201. When the result of judgment in the Step S212 is that the processing has been already completed for all the pixels, the processing returns to the Step S46 in FIG. 12, and is followed by the Step S47.

According to the processing like the above, firstly, a ratio of the appropriateness of the 0-degree directional interpolation to the appropriateness of the 90-degree directional interpolation is obtained from two pattern probabilities, the 0-degree directional pattern probability and the 90-degree directional pattern probability, while a ratio of the appropriateness of the 45-degree directional interpolation to the appropriateness of the 135-degree directional interpolation is obtained from two pattern probabilities, the 45-degree directional pattern probability and the 135-degree directional pattern probability. This follows that it is estimated which of two directions orthogonal to each other is appropriate to the interpolation to what extent.

Next, a ratio of the sum of the appropriateness of the 0-degree directional interpolation and the appropriateness of the 90-degree directional interpolation to the sum of the appropriateness of the 45-degree directional interpolation and the appropriateness of the 135-degree directional interpolation is obtained. Finally, the appropriateness of the 0-degree directional interpolation, the appropriateness of the 45-degree directional interpolation, the appropriateness of the 90-degree directional interpolation, and the appropriateness of the 135-degree directional interpolation are obtained.

While a difficulty is encountered in determining whether or not the two directions are different in angle by 45 degrees, it is relatively easy to determine whether or not the two directions are different in angle by 90 degrees. Specifically, it is difficult to obtain the appropriateness of the 0-degree directional interpolation and the appropriateness of the 45-degree directional interpolation respectively based on "the ratio of the appropriateness of the 0-degree directional interpolation to the appropriateness of the 45-degree directional interpolation", since a difference in angle between the two directions is as slight as 45 degrees. On the other hand, it is easy to obtain the appropriateness of the 0-degree directional interpolation and the appropriateness of the 90-degree directional interpolation respectively based on "the ratio of the appropriateness of the 0-degree directional interpolation to the appropriateness of the 90-degree directional interpolation", since a difference in angle between the two directions is large. Thus, the procedure like the enables the appropriateness of the interpolation in the directions at the respective angles to be obtained without needing any complicated operational processing.

One specific instance is now described on what type of the appropriateness is obtained with respect to each angle when the pattern exists in the 0-degree direction.

Since there is the pattern in the 0-degree direction, "the 0-degree directional pattern probability" is high anyway, whereas "the pattern probability in the 90-degree direction" orthogonal to the 0-degree direction is low. For that reason, the probabilities P0 and P90 calculated in the Steps S201 and 202 respectively appear as P0≈1 and P90≈0. Then, with respect to the 45-degree direction and the 135-degree direction, these directions are different from the actual pattern direction in angle by the same degrees (or 45 degrees), so that "the 45-degree directional pattern probability≈the 135-degree directional pattern probability" holds true. For that reason, the relation between the probabilities P45 and P135 calculated in the Steps S204 and S205 results in P45≈P135.

Thus, in the Step S206, "the probability Q90≈1÷(1+0)≈1" is obtained, and in the Step S207, "the probability Q45135≈0÷(1+0)≈0" is obtained. Then, in the Step S208, "the appropriateness of the 0-degree directional interpolation≈1×1≈1" is obtained, and in the Step S209, "the appropriateness of the 90-degree directional interpolation≈0" is obtained. Further, in the Step S210, "the appropriateness of the 45-degree directional interpolation≈0" is obtained, and in the Step S211, "the appropriateness of the 135-degree directional interpolation≈0" is obtained. Thus, the interpolation processing in the 0-degree direction is adapted to perform the demosaic processing, permitting a satisfactory image to be obtained.

By the way, with respect to a projected image portion of a subject having no pattern, the 0-degree directional pattern probability, the 45-degree directional pattern probability, the 90-degree directional pattern probability and the 135-degree directional pattern probability are all supposed to take large values equivalently, and as a result, "the appropriateness of the 0-degree directional interpolation≈0.25", "the appropriateness of the 45-degree directional interpolation≈0.25", "the appropriateness of the 90-degree directional interpolation≈0.25" and "the appropriateness of the 135-degree directional interpolation≈0.25" hold true respectively. Accordingly, the same degree of weights is applied to the interpolation processing in all the directions.

Figure 13:
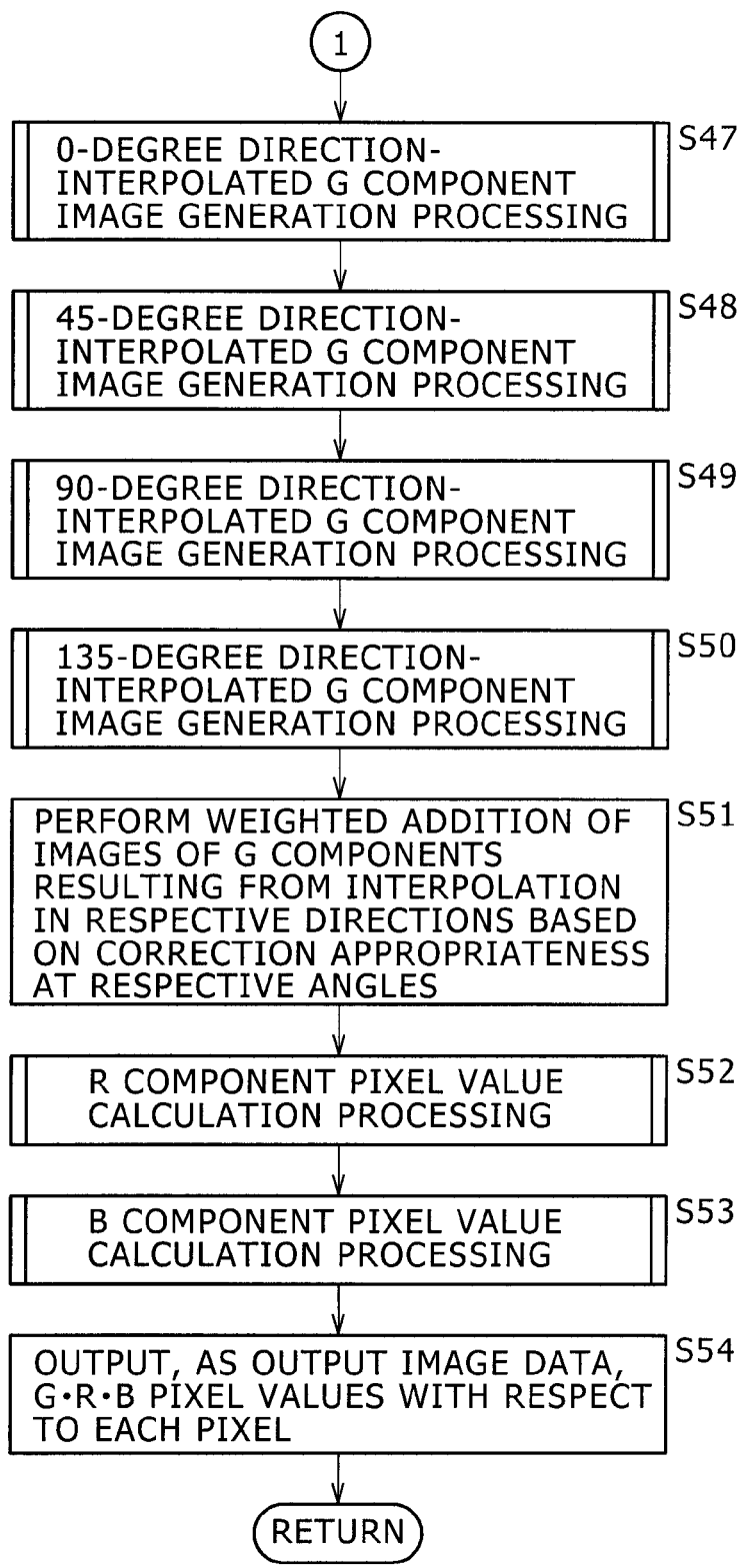
FIG. 13 is a flowchart following the flowchart in FIG. 12 to illustrate the demosaic processing.

The 0-degree direction-interpolated G component image generation processing to be performed in the Step S47 in FIG. 13 is now described with reference to the flowchart in FIG. 24.

With respect to the filter array of the color filter 22 previously described with reference to FIG. 6, the G values exist in every other pixel in the input image on lines whose Y-axis values are odd-numbered, so that the 0-degree directional interpolation is adaptable to calculate the interpolated pixel value of G for the pixels indicated by M. However, there is no G value in the input image on lines whose Y-axis values are even-numbered, so that the 0-degree directional interpolation is not adaptable to directly calculate the interpolated pixel value of G. Thus, an attempt is made to firstly calculate a W component image with respect to all the pixels based on the 0-degree directional interpolation, followed by performing the calculation of the G value with respect to all the pixels based on the correlation between the G and W pixel values.

First, in Step S241, the 0-degree direction-interpolated G component image calculation processing unit 71 selects one target pixel that remains unprocessed with respect to extraction or interpolation of the W value.

In Step S242, the 0-degree direction-interpolated G component image calculation processing unit 71 judges whether or not the target pixel is the pixel having the W pixel value. The pixels indicated by W are originally existent at positions represented by the coordinates (X, Y) where X and Y are both even-numbered. Thus, when the result of judgment in the Step S242 is that the target pixel is the pixel having the W pixel value, it suffices to assume this pixel value to be a W value with respect to the coordinates (X, Y), and the processing goes on to Step S251 described later.

When the result of judgment in the Step S242 is that the target pixel is not the pixel having the W pixel value, the 0-degree direction-interpolated G component image calculation processing unit 71 judges whether or not the W pixel exists as the pixel adjacent in the 0-degree direction to the target pixel in Step S243. The pixels at the coordinates (X−1, Y) and (X+1, Y) adjacent in the 0-degree direction to the pixels at the coordinates (X, Y) where X is odd-numbered and Y is even-numbered hold the W pixel value. Thus, when the result of judgment in the Step S243 is that no W pixel exists in the 0-degree direction with respect to the target pixel, the processing goes on to Step S245 described later.

When the result of judgment in the Step S243 is that the W pixel exists in the 0-degree direction with respect to the target pixel, the 0-degree direction-interpolated G component image calculation processing unit 71 obtains the interpolated pixel value of W based on the pixel value of the W pixel adjacent in the 0-degree direction in Step S244. Specifically, the 0-degree direction-interpolated G component image calculation processing unit 71 calculates an average of the pixel value with respect to the coordinates (X−1, Y) and the pixel value with respect to the coordinates (X+1, Y) to provide the interpolated pixel value of W with respect to the coordinates (X, Y), and the processing goes on to Step S251 described later.

When the result of judgment in the Step S243 is that no W pixel exists in the 0-degree direction with respect to the target pixel, the 0-degree direction-interpolated G component image calculation processing unit 71 judges whether or not the target pixel is the pixel having the G pixel value in the Step S245. When the result of judgment in the Step S245 is that the target pixel is not the pixel having the G pixel value, the processing goes on to Step S248 described later.

When the result of judgment in the Step S245 is that the target pixel is the pixel having the G pixel value, the 0-degree direction-interpolated G component image calculation processing unit 71 obtains the interpolated pixel value of M with respect to the target pixel based on each pixel value of the M pixels adjacent in the 0-degree direction in Step S246. Specifically, the pixels indicated by G exist at positions represented by the coordinates (X, Y) where X is even-numbered and Y is odd-numbered. Then, the pixels indicated by M exist as the pixels adjacent in the 0-degree direction to each G pixel, that is, at positions represented by the coordinates (X−1, Y) and (X+1, Y), so that it is possible to assume the average of the pixel values with respect to the two coordinates to be the interpolated pixel value of M with respect to the coordinates (X, Y).

In Step S247, the 0-degree direction-interpolated G component image calculation processing unit 71 calculates the W pixel value by adding the G pixel value and the interpolated pixel value of M with respect to the target pixel based on that the equation of "W pixel value=G pixel value+M pixel value" holds true, and the processing goes on to Step S251 described later.

When the result of judgment in the Step S245 is that the target pixel is not the pixel having the G pixel value, the 0-degree direction-interpolated G component image calculation processing 71 judges whether or not the target pixel is the pixel having the M pixel value in Step S248. When the result of judgment in the Step S248 is that the target pixel is not the pixel having the M pixel value, the processing goes on to the Step S251 described later.

When the result of judgment in the Step S248 is that the target pixel is the pixel having the M pixel value, the 0-degree direction-interpolated G component image calculation processing unit 71 obtains the interpolated pixel value of G with respect to the target pixel based on the G pixel values the pixels adjacent in the 0-degree direction to the target pixel hold in Step S249. Specifically, the pixels indicated by M exist at positions represented by the coordinates (X, Y) where X and Y are both odd-numbered. Then, the pixels indicated by G exist as the pixels adjacent in the 0-degree direction to each M pixel, that is, at positions represented by the coordinates (X−1, Y) and (X+1, Y), so that it is possible to assume the average of the pixel values with respect to the two coordinates to be the interpolated pixel value of G with respect to the coordinates (X, Y).

In Step S250, the 0-degree direction-interpolated G component image calculation processing unit 71 calculates the W pixel value by adding the M pixel value and the interpolated pixel value of G with respect to the target pixel based on that the equation of "W pixel value=G pixel value+M pixel value" holds true, and the processing goes on to the Step S251 described later.

When the result of judgment in the Step S242 is that the target pixel is the pixel having the W pixel value, or after the processing of the Step S244 or 247, or when the result of judgment in the Step S248 is that the target pixel is not the pixel having the M pixel value, or after the processing of the Step S250, the 0-degree direction-interpolated G component image calculation processing unit 71 judges whether or not the W value has been already obtained for all the pixels in the Step S251. The result of judgment in the Step S251 is that the W value is not obtained yet for all the pixels, the processing returns to the Step S241, causing reprocessing to be performed from the Step S241.

When the result of judgment in the Step S251 is that the W value has been already obtained for all the pixels, the 0-degree direction-interpolated G component image calculation processing unit 71 selects one target pixel that remains unprocessed with respect to determination of the G value in Step S252.

In Step S253, the 0-degree direction-interpolated G component image calculation processing unit 71 detects the G pixels existing within the predetermined range from the target pixel, wherein the predetermined range indicates a range experientially of experimentally determined based on the conditions such as the number of samples used for the principle component analysis and the closeness of correlation depending on a distance from the target pixel. Assuming that the target pixel position is represented as the coordinates (H, K), for instance, the predetermined range may include those such as a range having a size of 9×9 pixels represented by the coordinates (X, Y) where H−4≦X≦H+4 and K+4≦Y≦K+4. Alternatively a range having a different size or a range covering the predetermined number of pixels selected from the pixels existing close to each other with the target pixel as the center may also be used.

The predetermined range stated herein and a predetermined range with respect to the 90-degree direction-interpolated G component image generation processing as described later may be the same as or different from the predetermined range applied to the 0-degree, 45-degree, 90-degree or 135-degree directional pattern probability calculation processing.

In Step S254, the 0-degree direction-interpolated G component image calculation processing unit 71 performs the principle component analysis after plotting, on the two-dimensional space of G and W, the G pixel value of each pixel previously detected in the Step S253, together with the W value previously obtained with respect to the detected G pixel position.

Figure 25:
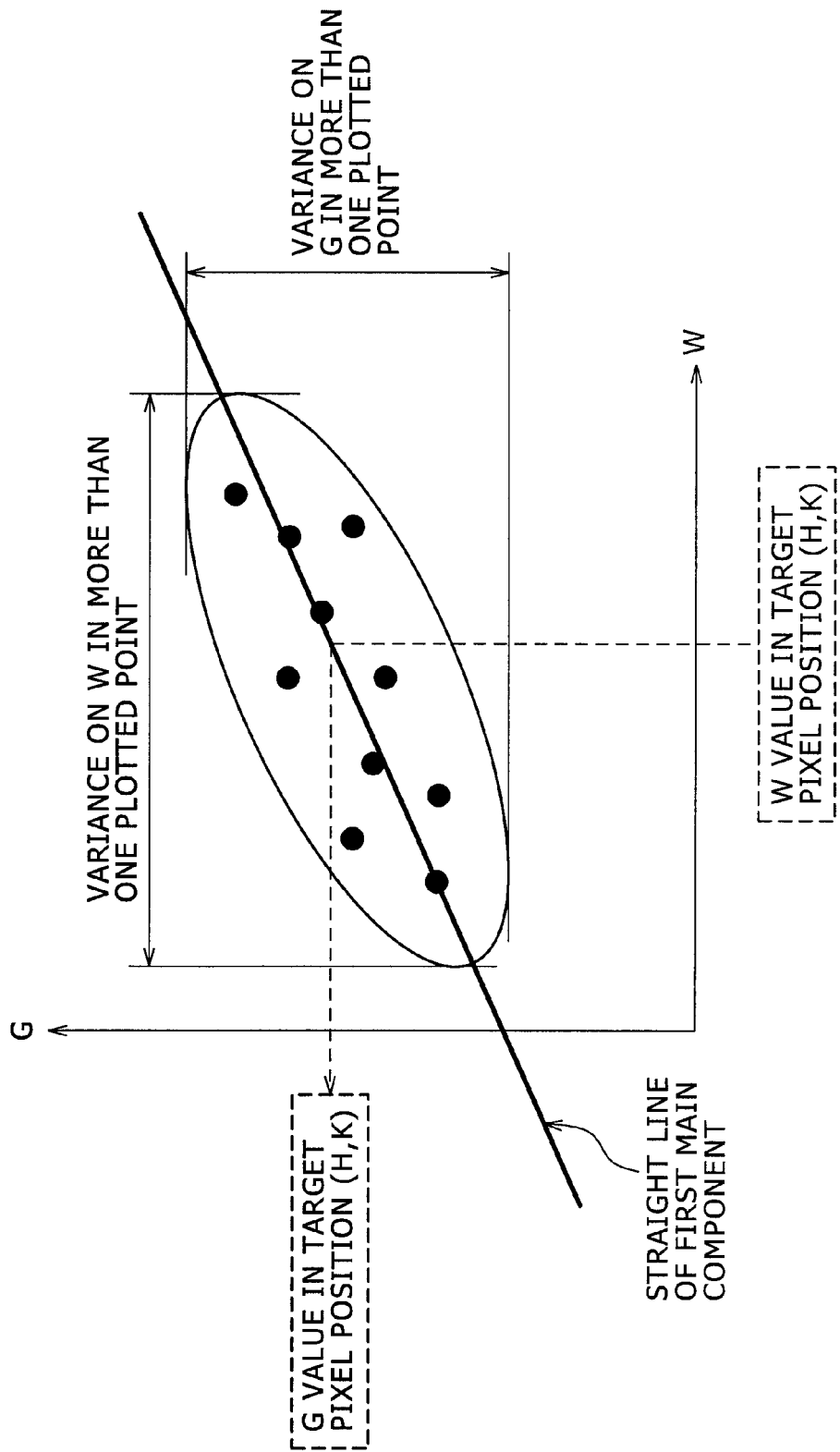
FIG. 25 is a graphic representation of principle component analysis.

Specifically, since the W value with respect to all the pixel positions has been already obtained through the processing, it is proper that there is also provided the W pixel value with respect to the detected G pixel positions. Thus, assuming that the predetermined range is defined as H−4≦X≦H+4 and K+4≦Y≦K+4 with respect to the coordinates (X, Y) of the target pixel, the G pixel represented by the coordinates (X, Y) where X is even-numbered and Y is odd-numbered exists at more than one position within the predetermined range, so that it is possible to form more than one pair of W and G pixel values. By plotting the more than one pair of W and G pixel values on the two-dimensional space of W and G to perform the principle component analysis, a straight line of the first principle component may be obtained as shown in FIG. 25.

In this processing, when it is assumed that the variance and the average of the detected G pixel values within the predetermined range in the Step S253 are respectively represented by varianceG and AveG, and that the variance and the average of the W pixel values with respect to these detected G pixel positions are respectively represented as varianceW and AveW, an equation of the straight line of the first principle component is shown by the following equation (5).

$$G = S \times \sqrt{\text{variance}G} \div \sqrt{\text{variance}W} \times (W - \text{Ave}W) + \text{Ave}G \quad (5)$$

where a coefficient S is assumed to be +1 when the correlation is positive, and to be −1 when the correlation is negative.

In Step S255, the 0-degree direction-interpolated G image calculation processing unit 71 calculates the G pixel value based on the straight line resulting from the principle component analysis, together with the W pixel value with respect to the target pixel.

Specifically, it suffices to obtain the G pixel value corresponding to the W pixel value with respect to the target pixel on the straight line of the first principle component, as shown in FIG. 25, and thus, the G value is calculated by substituting the W value with respect to the target pixel (H, K) in the equation of the straight line as shown by the equation (5), wherein the W and G values are assumed to be correlated to each other within the predetermined range such as those where H−4≦X≦H+4 and K+4≦Y≦K+4, for instance.

In Step S256, the 0-degree direction-interpolated G image calculation processing unit 71 judges whether or not the G value has been already obtained for all the pixels. When the result of judgment in the Step S256 is that the G value is not obtained yet for all the pixels, the processing returns to the Step S252, causing reprocessing to be performed from the Step S252. When the result of judgment in the Step S256 is that the G value has been already obtained for all the pixels, the processing returns to the Step S47 in FIG. 13, and is followed by the Step S48.

The processing like the may provide the G component image based on the 0-degree directional interpolation by, after calculating the W component image with respect to all the pixels through the 0-degree directional interpolation, performing the calculation of the G value with respect to all the pixels based on the correlation between the G and W values using the result of the calculation of the W component image.

The 45-degree direction-interpolated G component image generation processing to be performed in the Step S48 in FIG. 13 is now described with reference to the flowchart in FIG. 26.

With respect to the filter array of the color filter 22 previously described with reference to FIG. 6, the G values exist in every other pixel in the input image on 45-degree directional lines made up of the coordinates (X, Y) where X+Y is odd-numbered, so that the 45-degree directional interpolation is adaptable to calculate the interpolated pixel value of G for the pixels indicated by R or B. While there is no G value in the input image on 45-degree directional lines made up of the coordinates (X, Y) where X+Y is even-numbered, the 45-degree directional lines consist of the W or M pixels, so that it is possible to obtain the G value by the calculation of W−M.

First, in Step S281, the 45-degree direction-interpolated G component image calculation processing unit 72 selects one notice pixel that remains unprocessed with respect to extraction or interpolation of the G value.

In Step S282, the 45-degree direction-interpolated G component image calculation processing unit 72 judges whether or not the target pixel is the pixel having the G pixel value. The pixels indicated by G are originally existent at positions represented by the coordinates (X, Y) where X is even-numbered and Y is odd-numbered. Thus, when the result of judgment in the Step S282 is that the target pixel is the pixel having the G pixel value, it suffices to assume this pixel value to be a G value with respect to the coordinates (X, Y), and the processing goes on to Step S291 described later.

When the result of judgment in the Step S282 is that the target pixel is not the pixel having the G pixel value, the 45-degree direction-interpolated G component image calculation processing unit 72 judges whether or not the G pixel exists as the pixel adjacent in the 45-degree direction with respect to the target pixel in Step S283. The pixels at the coordinates (X−1, Y−1) and (X+1, Y+1) adjacent in the 45-degree direction to the pixel at the coordinates (X, Y) where X+Y is odd-numbered hold the G pixel value. Thus, when the result of judgment in the Step S283 is that no G pixel exists in the 45-degree direction with respect to the target pixel, the processing goes on to Step S285 described later.

When the result of judgment in the Step S283 is that the G pixel exists in the 45-degree direction with respect to the target pixel, the 45-degree direction-interpolated G component image calculation processing unit 72 obtains the interpolated pixel value of G based on the pixel value of the G pixel in the 45-degree direction in Step S284. Specifically, the 45-degree direction-interpolated G component image calculation processing unit 72 calculates an average of the pixel value with respect to the coordinates (X−1, Y−1) and the pixel value with respect to the coordinates (X+1, Y+1) to provide the interpolated pixel value of G with respect to the coordinates (X, Y), and the processing goes on to Step S291 described later.

When the result of judgment in the Step S283 is that no G pixel exists in the 45-degree direction with respect to the target pixel, the 45-degree direction-interpolated G component image calculation processing unit 72 judges whether or not the target pixel is the pixel having the W pixel value in the Step S285. When the result of judgment in the Step S285 is that the target pixel is not the pixel having the W pixel value, the processing goes on to Step S288 described later.

When the result of judgment in the Step S285 is that the target pixel is the pixel having the W pixel value, the 45-degree direction-interpolated G component image calculation processing unit 72 obtains the interpolated pixel value of M based on the pixel value of the M pixel in the 45-degree direction in Step S286. Specifically, the pixels indicated by W exist at positions represented by the coordinates (X, Y) where X and Y are both even-numbered. Then, the pixels indicated by M exist as the pixels adjacent in the 45-degree direction to each W pixel, that is, at positions represented by the coordinates (X−1, Y−1) and (X+1, Y+1), so that it is possible to assume the average of the pixel values with respect to the two coordinates to be the interpolated pixel value of M with respect to the coordinates (X, Y).

In Step S287, the 45-degree direction-interpolated G component image calculation processing unit 72 calculates the G pixel value by subtracting the interpolated pixel value of M from the W pixel value with respect to the target pixel based on that the equation of "G pixel value=W pixel value−M pixel value" holds true, and the processing goes on to Step S291 described later.

When the result of judgment in the Step S285 is that the target pixel is not the pixel having the W pixel value, the 45-degree direction-interpolated G component image calculation processing 72 judges whether or not the target pixel is the pixel having the M pixel value in Step S288. When the result of judgment in the Step S288 is that the target pixel is not the pixel having the M pixel value, the processing goes on to the Step S291 described later.

When the result of judgment in the Step S288 is that the target pixel is the pixel having the M pixel value, the 45-degree direction-interpolated G component image calculation processing unit 72 obtains the interpolated pixel value of W based on the W pixel values the pixels adjacent in the 45-degree direction to the target pixel hold in Step S289. Specifically, the pixels indicated by M exist at positions represented by the coordinates (X, Y) where X and Y are both odd-numbered. Then, the pixels indicated by W exist as the pixels adjacent in the 45-degree direction to each M pixel, that is, at positions represented by the coordinates (X−1, Y−1) and (X+1, Y+1), so that it is possible to assume the average of the pixel values with respect to the two coordinates to be the interpolated pixel value of W with respect to the coordinates (X, Y).

In Step S290, the 45-degree direction-interpolated G component image calculation processing unit 72 calculates the G pixel value by subtracting the M pixel value from the interpolated pixel value of W with respect to the target pixel based on that the equation of "G pixel value=W pixel value−M pixel value" holds true, and the processing goes on to the Step S291 described later.

When the result of judgment in the Step S282 is that the target pixel is the pixel having the G pixel value, or after the processing of the Step S284 or 287, or when the result of judgment in the Step S288 is that the target pixel is not the pixel having the M pixel value, or after the processing of the Step S290, the 45-degree direction-interpolated G component image calculation processing unit 72 judges whether or not the G value has been already obtained for all the pixels in the Step S291. When the result of judgment in the Step S291 is that the G value is not obtained yet for all the pixels, the processing returns to the Step S281, causing reprocessing to be performed from the Step S281. When the result of judgment in the Step S291 is that the G value has been already obtained for all the pixels, the processing returns to the Step S48 in FIG. 13, and is followed by the Step S49.

The processing like the may provide the G component image based on the 45-degree directional interpolation.

The 90-degree direction-interpolated G component image generation processing to be performed in the Step S49 in FIG. 13 is now described with reference to the flowchart in FIG. 27.

With respect to the filter array of the color filter 22 previously described with reference to FIG. 6, the G values exist in every other pixel in the input image on lines whose X-axis values are even-numbered, so that the 90-degree directional interpolation is adaptable to calculate the interpolated pixel value of G for the pixels indicated by W. However, there is no G value in the input image on lines whose X-axis values are odd-numbered, so that the 90-degree directional interpolation is not adaptable to directly calculate the interpolated pixel value of G. Thus, an attempt is made to firstly calculate the M component image with respect to all the pixels based on the 90-degree directional interpolation, followed by performing the calculation of the G value with respect to all the pixels based on the correlation between the G and M values.

First, in Step S321, the 90-degree direction-interpolated G component image calculation processing unit 73 selects one notice pixel that remains unprocessed with respect to extraction or interpolation of the M value.

In Step S322, the 90-degree direction-interpolated G component image calculation processing unit 73 judges whether or not the target pixel is the pixel having the M pixel value. The pixels indicated by M are originally existent at positions represented by the coordinates (X, Y) where X and Y are both odd-numbered. Thus, when the result of judgment in the Step S322 is that the target pixel is the pixel having the M pixel value, it suffices to assume this pixel value to be the M value with respect to the coordinates (X, Y), and the processing goes on to Step S331 described later.

When the result of judgment in the Step S322 is that the target pixel is not the pixel having the M pixel value, the 90-degree direction-interpolated G component image calculation processing unit 73 judges whether or not the M pixel exists as the pixel adjacent in the 90-degree direction with respect to the target pixel in Step S323. The pixels at the coordinates (X, Y−1) and (X, Y+1) adjacent in the 90-degree direction to the pixel at the coordinates (X, Y) where X is odd-numbered and Y is even-numbered hold the M pixel value. Thus, when the result of judgment in the Step S323 is that no M pixel exists in the 90-degree direction with respect to the target pixel, the processing goes on to Step S325 described later.

When the result of judgment in the Step S323 is that the M pixel exists in the 90-degree direction with respect to the target pixel, the 90-degree direction-interpolated G component image calculation processing unit 73 obtains the interpolated pixel value of M based on the pixel value of the M Pixel in the 90-degree direction in Step S324. Specifically, the 90-degree direction-interpolated G component image calculation processing unit 73 calculates an average of the pixel value with respect to the coordinates (X, Y−1) and the pixel value with respect to the coordinates (X, Y+1) to provide the interpolated pixel value of M with respect to the coordinates (X, Y), and the processing goes on to Step S331 described later.

When the result of judgment in the Step S323 is that no M pixel exists in the 90-degree direction with respect to the target pixel, the 90-degree direction-interpolated G component image calculation processing unit 73 judges whether or not the target pixel is the pixel having the G pixel value in Step S325. When the result of judgment in the Step S325 is that the target pixel is not the pixel having the G pixel value, the processing goes on to Step S328 described later.

When the result of judgment in the Step S325 is that the target pixel is the pixel having the G pixel value, the 90-degree direction-interpolated G component image calculation processing unit 73 obtains the interpolated pixel value of W based on the pixel value of the W pixel in the 90-degree direction in Step S326. Specifically, the pixels indicated by G exist at positions represented by the coordinates (X, Y) where X is even-numbered and Y is odd-numbered. Then, the pixels indicated by W exist as the pixels adjacent in the 90-degree direction to each G pixel, that is, at positions represented by the coordinates (X, Y−1) and (X, Y+1), so that it is possible to assume the average of the pixel values with respect to the two coordinates to be the interpolated pixel value of W with respect to the coordinates (X, Y).

In Step S327, the 90-degree direction-interpolated G component image calculation processing unit 73 calculates the M pixel value by subtracting the G pixel value from the interpolated pixel value of W with respect to the target pixel based on that the equation of "M pixel value=W pixel value−G pixel value" holds true, and the processing goes on to Step S331 described later.

When the result of judgment in the Step S325 is that the target pixel is not the pixel having the G pixel value, the 90-degree direction-interpolated G component image calculation processing unit 73 judges whether or not the target pixel is the pixel having the W pixel value in Step S328. When the result of judgment in the Step S328 is that the target pixel is not the pixel having the W pixel value, the processing goes on to the Step S331 described later.

When the result of judgment in the Step S328 is that the target pixel is the pixel having the W pixel value, the 90-degree direction-interpolated G component image calculation processing unit 73 obtains the interpolated pixel value of G based on the G pixel values the pixels adjacent in the 90-degree direction with respect to the target pixel hold in Step S329. Specifically, the pixels indicated by W exist at positions represented by the coordinates (X, Y) where X and Y are both even-numbered. Then, the pixels indicated by G exist as the pixels adjacent in the 90-degree direction to each W pixel, that is, at positions represented by the coordinates (X, Y−1) and (X, Y+1), so that it is possible to assume the average of the pixel values with respect to the two coordinates to be the interpolated pixel value of G with respect to the coordinates (X, Y).

In Step S330, the 90-degree direction-interpolated G component image calculation processing unit 73 calculates the M pixel value by subtracting the interpolated pixel value of G from the W pixel value with respect to the target pixel based on that the equation of "M pixel value=W pixel value−G pixel value" holds true, and the processing goes on to the Step S331 described later.

When the result of judgment in the Step S322 is that the target pixel is the pixel having the M pixel value, or after the processing of the Step S324 or 327, or when the result of judgment in the Step S328 is that the target pixel is not the pixel having the W pixel value, or after the processing of the Step S330, the 90-degree direction-interpolated G component image calculation processing unit 73 judges whether or not the M value has been already obtained for all the pixels in the Step S331. The result of judgment in the Step S331 is that the M value is not obtained yet for all the pixels, the processing returns to the Step S321, causing reprocessing to be performed from the Step S321.

When the result of judgment in the Step S331 is that the M value has been already obtained for all the pixels, the 90-degree direction-interpolated G component image calculation processing unit 73 selects one notice pixel that remains unprocessed with respect to determination of the G value in Step S332.

In Step S333, the 90-degree direction-interpolated G component image calculation processing unit 73 detects the G pixels existing within the predetermined range from the target pixel, wherein the predetermined range indicates a range experientially or experimentally determined based on the conditions such as the number of samples used for the principle component analysis and the closeness of correlation depending on a distance from the target pixel. Assuming that the target pixel position is represented as the coordinates (H, K), for instance, the predetermined range may include those such as a range having a size of 9×9 pixels represented by the coordinates (X, Y) where H−4≦X≦H+4 and K+4≦Y≦K+4. Alternatively, a range having a different size or a range covering the predetermined number of pixels selected from the pixels existing close to each other with the target pixel as the center may also be used.

In Step S334, the 90-degree direction-interpolated G component image calculation processing unit 73 performs the principle component analysis after plotting, on the two-dimensional space of G and M, the G pixel value of each pixel already detected in the Step S333, together with the M value already obtained with respect to the detected G pixel position.

Figure 28:
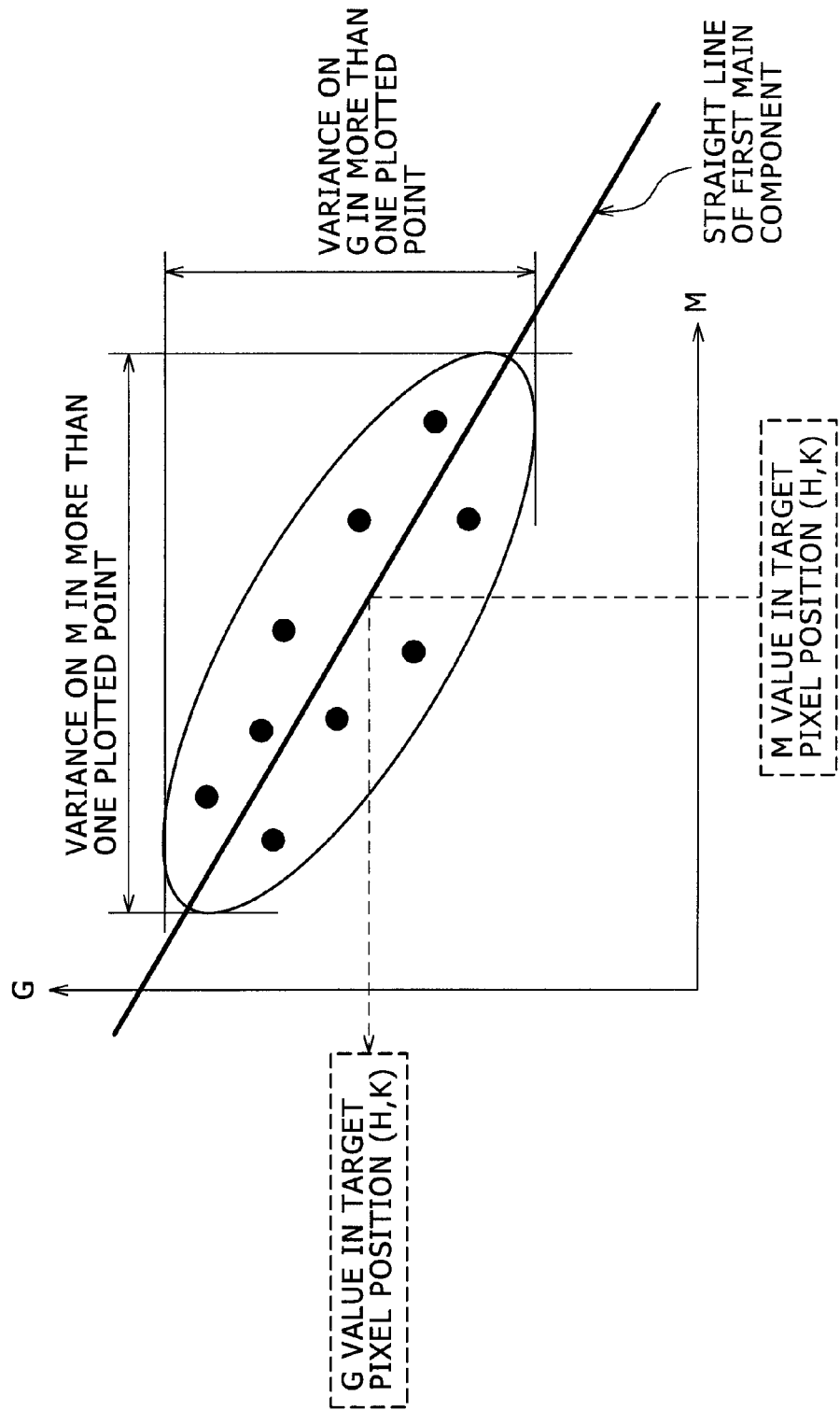
FIG. 28 is a graphic representation of principle component analysis.

Specifically, since the M value with respect to all the pixel positions has been already obtained through the processing, it is proper that there is also provided the M pixel value with respect to the detected G pixel positions. Thus, assuming that the predetermined range is defined as H−4≦X≦H+4 and K+4≦Y≦K+4 with respect to the coordinates (H, K) of the target pixel, the G pixel represented by the coordinates (X, Y), where X is even-numbered and Y is odd-numbered, exists at more than one position within the predetermined range, so that it is possible to form more than one pair of M and G values. By plotting the more than one pair of M and G values on the two-dimensional space of M and G to perform the principle component analysis, a straight line of the first principle component may be obtained as shown in FIG. 28.

In this processing, when it is assumed that the variance and the average of the detected G pixel values within the predetermined range in the Step S333 are respectively represented as varianceG and AveG, and that the variance and the average of the M pixel values with respect to these detected G pixel positions are respectively represented as variances and AveM, an equation of the straight line of the first principle component is shown by the following equation (6).

$$G = S \times \sqrt{\text{variance}G} \div \sqrt{\text{variance}M} \times (M - \text{Ave}M) + \text{Ave}G \quad (6)$$

where a coefficient S is assumed to be +1 when the correlation is positive, and to be −1 when the correlation is negative.

In Step S335, the 90-degree directional interpolated G image calculation processing unit 73 calculates the G pixel value based on the straight line resulting from the principle component analysis, together with the M pixel value with respect to the target pixel.

Specifically, it suffices to obtain the G pixel value corresponding to the M pixel value of the target pixel with respect to the pixels on the straight line of the first principle component, as shown in FIG. 28, and thus, the G value is calculated by substituting the M value with respect to the target pixel (H, K) in the equation of the straight line as shown by the equation (6), wherein the M and G values are assumed to be correlated to each other within the predetermined range such as those where H−4≦X≦H+4 and K+4≦Y≦K+4, for instance.

In Step S336, the 90-degree direction-interpolated G image calculation processing unit 73 judges whether or not the G value has been obtained for all the pixels. When the result of judgment in the Step S336 is that the G value is not obtained yet for all the pixels, the processing returns to the Step S332, causing reprocessing to be performed from the Step S332. When the result of judgment in the Step S336 is that the G value has been already obtained for all the pixels, the processing returns to the Step S49 in FIG. 13, and is followed by the Step S50.

The processing like the may provide the G component image based on the 90-degree directional interpolation by, after calculating the M component image with respect to all the pixels through the 90-degree directional interpolation, performing the calculation of the G value with respect to all the pixels based on the correlation between the G and M values using the result of the calculation of the M component image.

The 135-degree direction-interpolated G component image generation processing to be performed in the Step S50 in FIG. 13 is now described with reference to the flowchart in FIG. 29.

With respect to the filter array of the color filter 22 previously described with reference to FIG. 6, the G values exist in every other pixel in the input image on 135-degree directional lines made up of the coordinates (X, Y) where X−Y is odd-numbered, so that the 135-degree directional interpolation is adaptable to calculate the interpolated pixel value of G for the pixels indicated by R or B. While there is no G value in the input image on 135-degree directional lines made up of the coordinates (X, Y) where X−Y is even-numbered, the 135-degree directional lines consist of the W or M pixels, so that it is possible to obtain the G value by the calculation of W−M.

First, in Step S361, the 135-degree direction-interpolated G component image calculation processing unit 74 selects one notice pixel that remains unprocessed with respect to extraction or interpolation of the G value.

In Step S362, the 135-degree direction-interpolated G component image calculation processing unit 74 judges whether or not the target pixel is the pixel having the G pixel value. The pixels indicated by G are originally existent at positions represented by the coordinates (X, Y) where X is even-numbered and Y is odd-numbered. Thus, when the result of judgment in the Step S362 is that the target pixel is the pixel having the G pixel value, it suffices to assume this pixel value to be the G value with respect to the coordinates (X, Y), and the processing goes on to Step S371 described later.

When the result of judgment in the Step S362 is that the target pixel is not the pixel having the G pixel value, the 135-degree direction-interpolated G component image calculation processing unit 74 judges whether or not the G pixel exists as the pixel adjacent in the 135-degree direction with respect to the target pixel in Step S363. The pixels at the coordinates (X−1, Y+1) and (X+1, Y−1) adjacent in the 135-degree direction to the pixel at the coordinates (X, Y) where X+Y is odd-numbered hold the G pixel value. Thus, when the result of judgment in the Step S363 is that no G pixel exists in the 135-degree direction with respect to the target pixel, the processing goes on to Step S365 described later.

When the result of judgment in the Step S363 is that the G pixel exists in the 135-degree direction with respect to the target pixel, the 135-degree direction-interpolated G component image calculation processing unit 74 obtains the interpolated pixel value of G based on the pixel value of the G pixel in the 135-degree direction in Step S364. Specifically, the 135-degree direction-interpolated G component image calculation processing unit 74 calculates an average of the pixel value with respect to the coordinates (X−1, Y+1) and the pixel value with respect to the coordinates (X+1, Y−1) to provide the interpolated pixel value of G with respect to the coordinates (X, Y), and the processing goes on to Step S371 described later.

When the result of judgment in the Step S363 is that no G pixel exists in the 135-degree direction with respect to the target pixel, the 135-degree direction-interpolated G component image calculation processing unit 74 judges whether or not the target pixel is the pixel having the W pixel value in Step S365. When the result of judgment in the Step S365 is that the target pixel is not the pixel having the W pixel value, the processing goes on to Step S368 described later.

When the result of judgment in the Step S365 is that the target pixel is the pixel having the W pixel value, the 135-degree direction-interpolated G component image calculation processing unit 74 obtains the interpolated pixel value of M based on the pixel value of the M pixel in the 135-degree direction in Step S366. Specifically, the pixels indicated by W exist at positions represented by the coordinates (X, Y) where X and Y are both even-numbered. Then, the pixels indicated by M exist as the pixels adjacent in the 135-degree direction to each W pixel, that is, at positions represented by the coordinates (X−1, Y+1) and (X+1, Y−1), so that it is possible to assume the average of the pixel values with respect to the two coordinates to be the interpolated pixel value of M with respect to the coordinates (X, Y).

In Step S367, the 135-degree direction-interpolated G component image calculation processing unit 74 calculates the G pixel value by subtracting the interpolated pixel value of M from the W pixel value with respect to the target pixel based on that the equation of "G pixel value=W pixel value−M pixel value" holds true, and the processing goes on to Step S371 described later.

When the result of judgment in the Step S365 is that the target pixel is not the pixel having the W pixel value, the 135-degree direction-interpolated G component image calculation processing 74 judges whether or not the target pixel is the pixel having the M pixel value in Step S368. When the result of judgment in the Step S368 is that the target pixel is not the pixel having the M pixel value, the processing goes on to the Step S371 described later.

When the result of judgment in the Step S368 is that the target pixel is the pixel having the M pixel value, the 135-degree direction-interpolated G component image calculation processing unit 74 obtains the interpolated pixel value of W based on the W pixel values the pixels adjacent in the 135-degree direction with respect to the target pixel hold in Step S369. Specifically, the pixels indicated by M exist at positions represented by the coordinates (X, Y) where X and Y are both odd-numbered. Then, the pixels indicated by W exist as the pixels adjacent in the 135-degree direction to each M pixel, that is, at positions represented by the coordinates (X−1, Y+1) and (X+1, Y−1), so that it is possible to assume the average of the pixel values with respect to the two coordinates to be the interpolated pixel value of W with respect to the coordinates (X, Y).

In Step S370, the 135-degree direction-interpolated G component image calculation processing unit 74 obtains the G pixel value by subtracting the M pixel value from the interpolated pixel value of W with respect to the target pixel based on that the equation of "G pixel value=W pixel vaue−M pixel value" holds true, and the processing goes on to the Step S371 described later.

When the result of judgment in the Step S362 is that the target pixel is the pixel having the G pixel value, or after the processing of the Step S364 or 367, or when the result of judgment in the Step S368 is that the target pixel is not the pixel having the M pixel value, or after the processing of the Step S370, the 135-degree direction-interpolated G component image calculation processing unit 74 judges whether or not the G value has been already obtained for all the pixels in Step S371.

When the result of judgment in the Step S371 is that the G value is not obtained yet for all the pixels, the processing returns to the Step S361, causing reprocessing to be performed from the Step S361. When the result of judgment in the Step S371 is that the G value has been already obtained for all the pixels, the processing returns to the Step S50 in FIG. 13 and moves onto the Step S51.

The processing like the may provide the G component image based on the 135-degree directional interpolation.

Then, as described the above, in the Step S51 in FIG. 13, the G component image to be generated under consideration of the pattern direction and by the use of the property that the equation of W−M=G holds for the W and M component pixels is obtained by, after multiplying the G component image already corrected in the direction at each angle by the probability correction appropriateness as the weighting factor, performing the addition of the resultant G component image for each pixel.

The R component pixel value calculation processing to be performed in the Step S52 in FIG. 13 is now described with reference to the flowchart in FIG. 30.

In Step S401, the R component image calculation processing unit 81 selects one unprocessed target pixel.

In Step S402, the R component image calculation processing unit 81 detects the R pixels existing within the predetermined range from the target pixel, wherein the predetermined range indicates a range experientially or experimentally determined based on the conditions such as the number of samples used for the principle component analysis and the closeness of correlation depending on a distance from the target pixel. Assuming that the target pixel position is represented as the coordinates (H, K), for instance, the predetermined range may include those such as a range having a size of 9×9 pixels represented by the coordinates (X, Y), where H−4≦X≦H+4 and K+4≦Y≦K+4. Alternatively, a range having a different size or a range covering the predetermined number of pixels selected from the pixels existing close to each other with the target pixel as the center may also be used.

Further, the predetermined range stated herein and a predetermined range with respect to the B component pixel value calculation processing described later may be the same as or different from the predetermined range applied to any one of the processing.

Assuming that the target pixel position is represented as (H, K), for instance, the pixels indicated by R exist at positions represented by the coordinates (X, Y) where H−4≦X≦H+4, K+4≦Y≦K+4, X is odd-numbered, Y is even-numbered and X−Y−3 takes a multiple of 4.

In Step S403, the R component image calculation processing unit 81 acquires the G pixel value estimated through the processing in the Step S51 in FIG. 13 with respect to all the detected R pixel (X, Y) positions. Specifically, the R component image calculation processing unit 81 acquires more than one pair of R and G pixel values with respect to all the detected R pixel (X, Y) positions.

Figure 31:
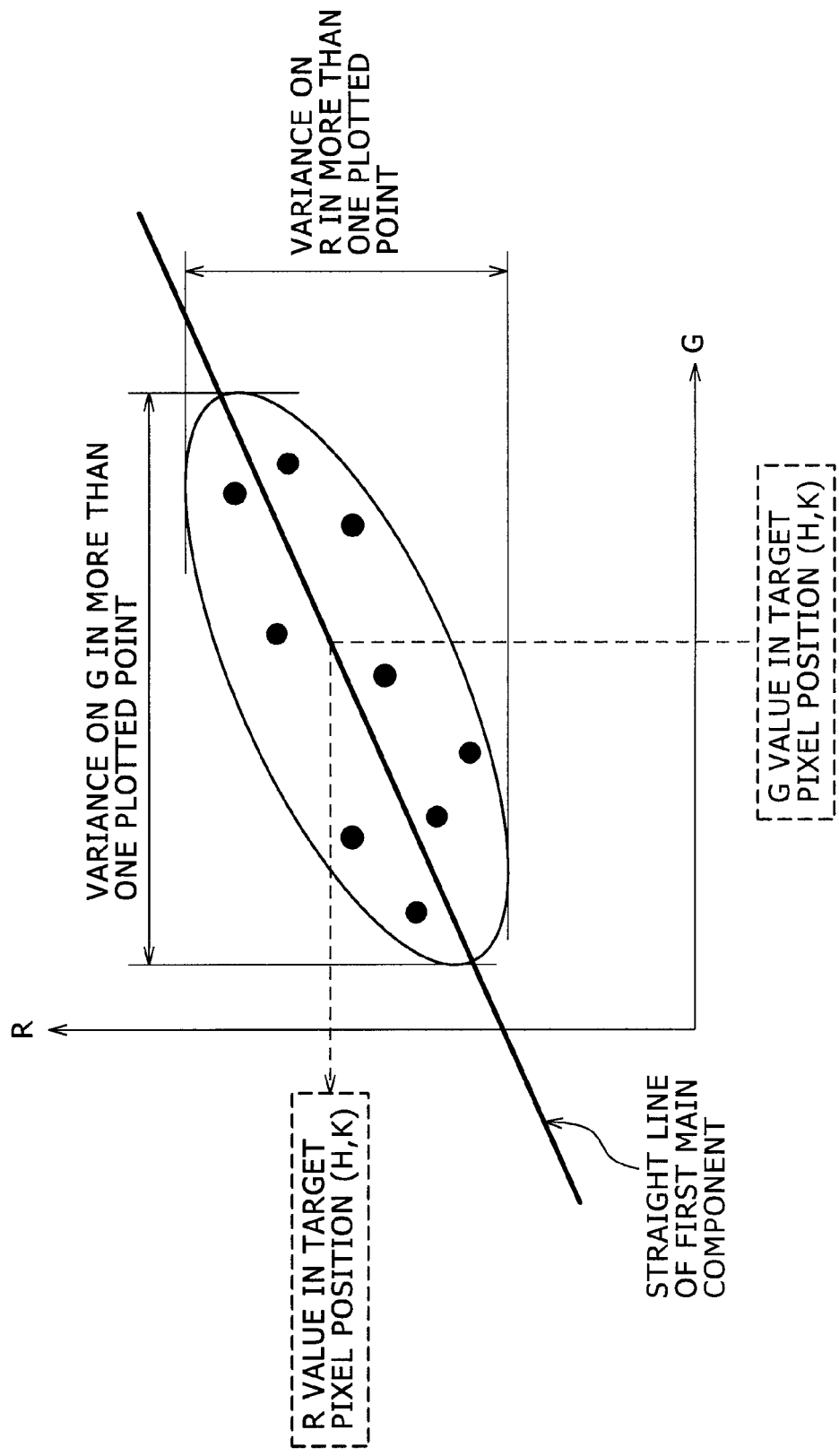
FIG. 31 is a graphic representation of principle component analysis.

In Step S404, the R component image calculation processing unit 81 performs the principle component analysis after plotting the pairs of R and G pixel values on the two-dimensional space of R and G, as shown in FIG. 31.

In this processing, when it is assumed that the variance and the average of the R pixel values within the predetermined range are respectively represented as varianceR and AveR, and that the variance and the average of the G pixel values with respect to these R pixel positions are respectively represented as varianceG and AveG, an equation of a straight line of the first principle component is shown as the following equation (7).

$$R = S \times \sqrt{varianceR} \div \sqrt{varianceG} \times (G - AveG) + AveR \quad (7)$$

where a coefficient S is assumed to be +1 when the correlation is positive, and to be −1 when the correlation is negative.

In Step S405, the R component image calculation processing unit 81 obtains the R value based on the straight line resulting from the principle component analysis, together with the G value with respect to the target pixel. Specifically, the R component image calculation processing unit 81 calculates the R value by substituting the G pixel value with respect to the target pixel in the equation (7)

In Step S406, the R component image calculation processing unit 81 judges whether or not the R value has been already obtained for all the pixels. When the result of judgment in the Step S406 is that the R value is not obtained yet for all the pixels, the processing returns to the Step S401, causing reprocessing to be performed from the Step S401. When the result of judgment in the Step S406 is that the R value has been already obtained for all the pixels, the processing returns to the Step S52 in FIG. 13, and is followed by the Step S53.

The processing like the may provide the R component pixel value for all the pixels based on the pixel value of the R component contained in the image data, together with the G pixel value estimated through the processing of the Step S51 in FIG. 13.

In this processing, It should be noted that the processing is put into practice assuming that the R and G pixel values are correlated to each other within the predetermined range such as those where H−4≦X≦H+4 and K+4≦Y≦K+4, for instance.

The B component pixel value calculation processing to be performed in the Step S53 in FIG. 13 is now described with reference to the flowchart in FIG. 32.

In Step S441, the B component image calculation processing unit 82 selects one unprocessed notice pixel.

In Step S442, the B component image calculation processing unit 82 detects the B pixels existing within the predetermined range from the target pixel, wherein the predetermined range indicates a range experientially or experimentally determined based on the conditions such as the number of samples used for the principle component analysis and the closeness of correlation depending on a distance from the target pixel. Assuming that the target pixel position is represented as the coordinates (H, K), for instance, the predetermined range may include those such as a range of a size of 9×9 pixels represented by the coordinates (X, Y), where H−4≦X≦H+4 and K+4≦Y≦K+4. Alternatively, a range having a different size or a range covering the predetermined number of pixels selected from the pixels existing close to each other with the target pixel as the center may also be used.

Assuming that the target pixel position is represented as the coordinates (H, K), for instance, the pixels indicated by B exist at positions represented by the coordinates (X, Y) where H−4≦X≦H+4, K+4≦Y≦K+4, X is odd-numbered, Y is even-numbered and X−Y−1 takes a multiple of 4.

In Step S443, the B component image calculation processing unit 82 acquires the G pixel value estimated through the processing of the Step S51 in FIG. 3 with respect to all the detected B pixel (X, Y) positions. Specifically, the B component image calculation processing unit 82 acquires more than one pair of B and G pixel values with respect to all the detected B pixel (X, Y) positions.

Figure 33:
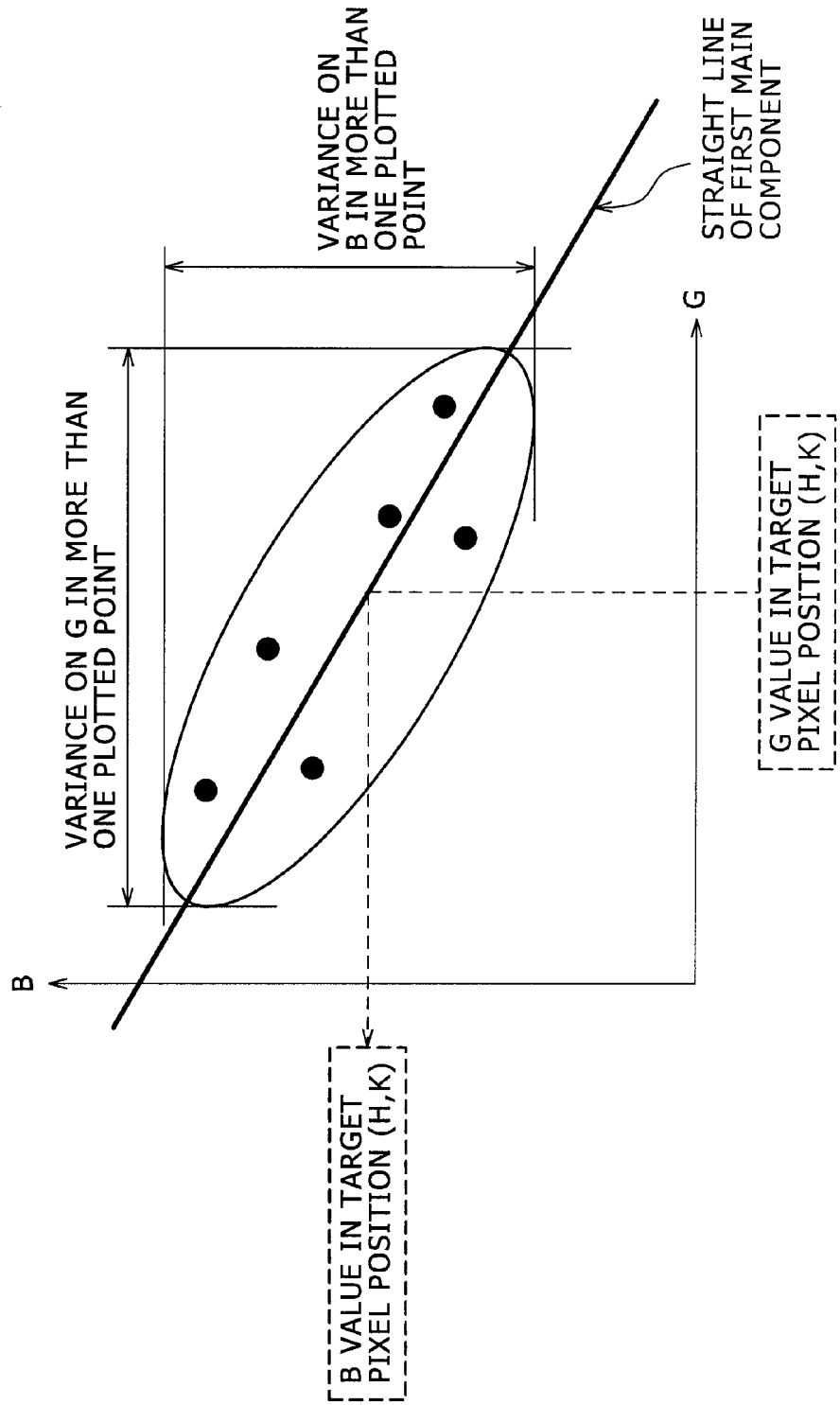
FIG. 33 is a graphic representation of principle component analysis.

In Step S444, the B component image calculation processing unit 82 performs the principle component analysis after plotting the pairs of B and G pixel values on the two-dimensional space of B and G, as shown in FIG. 33.

In this processing, when it is assumed that the variance and the average of the B pixel values within the predetermined range are respectively represented as varianceB and AveB, and that the variance and the average of the G pixel values with respect to these B pixel positions are respectively represented as varianceG and AveG, an equation of a straight line of the first principle component is shown as the following equation (8).

$$B = S \times \sqrt{\text{variance}B} \div \sqrt{\text{variance}G} \times (G - \text{Ave}G) + \text{Ave}B \quad (8)$$

where a coefficient S is assumed to be +1 when the correlation is positive, and to be −1 when the correlation is negative.

In Step S445, the B component image calculation processing unit 82 obtains the B value based on the straight line resulting from the principle component analysis, together with the G value with respect to the target pixel. Specifically, the B component image calculation processing unit 82 calculates the B value by substituting the G pixel value with respect to the target pixel in the equation (8).

In Step S446, the B component image calculation processing unit 82 judges whether or not the B value has been already obtained for all the pixels. When the result of judgment in the Step S446 is that the B value is not obtained yet for all the pixels, the processing returns to the Step S441, causing reprocessing to be performed from the Step S441. When the result of judgment in the Step S446 is that the B value has been already obtained for all the pixels, the processing returns to the Step S52 in FIG. 13, and is followed by the Step S53.

The processing like the may provide the B component pixel value for all the pixels based on the pixel value of the B component contained in the image data, together with the G pixel value estimated through the processing of the Step S51 in FIG. 13.

In this processing, it is also noted that the processing is put into practice assuming that the B and G pixel values are correlated to each other within the predetermined range such as those where H−4≦X≦H+4 and K+4≦Y≦K+4, for instance.

The respective processing has been described as related to one processing of obtaining the pixel data of the spectral component (or the G (green) component, for instance) in the predetermined frequency range having no chromatic aberration by subtracting the pixel (or the pixel indicated by M, for instance) data of the second pixel group having the second spectral component data from the pixel (or the pixel indicated by W, for instance) data of the first pixel group having the first spectral component data (in other words, by calculating the linear sum of the first pixel group and the second pixel group based on the weights W1 and W2 where the weight W1=1 and the weight W2=(−1). Specifically, the has been described on the case where the equation of G=W−M holds. On the other hand, if M' whose sensitivity is as low as ½ of the sensitivity of the M pixel is used, for instance, the equation of G=W−M' is not true. Thus, in this case, it suffices to perform the demosaic processing based on the equation of G=W−2×M', instead of the. Specifically, it is also allowable to perform the same processing as the by making an attempt to gain up an output value of the pixel corresponding to M in the solid-state imaging device 23 as much again, before supplying to the A/D converting unit 24. When the sensitivity of a signal corresponding to any one of the color components is inferior to that of other signals, it is also allowable to perform the same processing as the by making an attempt to gain up, at a predetermined scale factor, an output value of the corresponding pixel in the solid-state imaging device 23, before supplying to the A/D converting unit 24, likewise.

In other words, the present invention is applicable to cases where the first spectral component frequency band or the second spectral component frequency band is one that is not described above, or consists of more than one non-continuously separated frequency bands, for instance, as long as that an image of frequency range having no chromatic aberration and the demosaic processing is performed using the image as reference, based on the signal component corresponding to the spectral component in the predetermined frequency range resulting from subtracting the signal (or the value resulting from multiplying this signal by a predetermined factor) in the frequency band of the second spectral component from the signal (or the value resulting from multiplying this signal by a predetermined different factor) in the frequency band of the first spectral component. Further, an agreement of the spectral component in the predetermined frequency range resulting from subtracting the second spectral component frequency band from the first spectral component frequency band with the range of the frequency having no chromatic aberration, like the processing, preferably provides simplified processing. For instance, the present invention is also applicable, even if attempting to assume the second spectral component frequency band to be the infrared component where the first spectral component frequency band is specified as the G (green) component and the infrared component, or to assume the second spectral component frequency band to be the R (red) component and the B (blue) component where the first spectral component frequency band is specified as the visible light component except the infrared component.

The application of the present invention as described above enables to cancel lens' chromatic aberration and to perform the demosaic processing, while holding the pixels that are capable of acquiring the wide wavelength-band spectral component.

Figure 34:
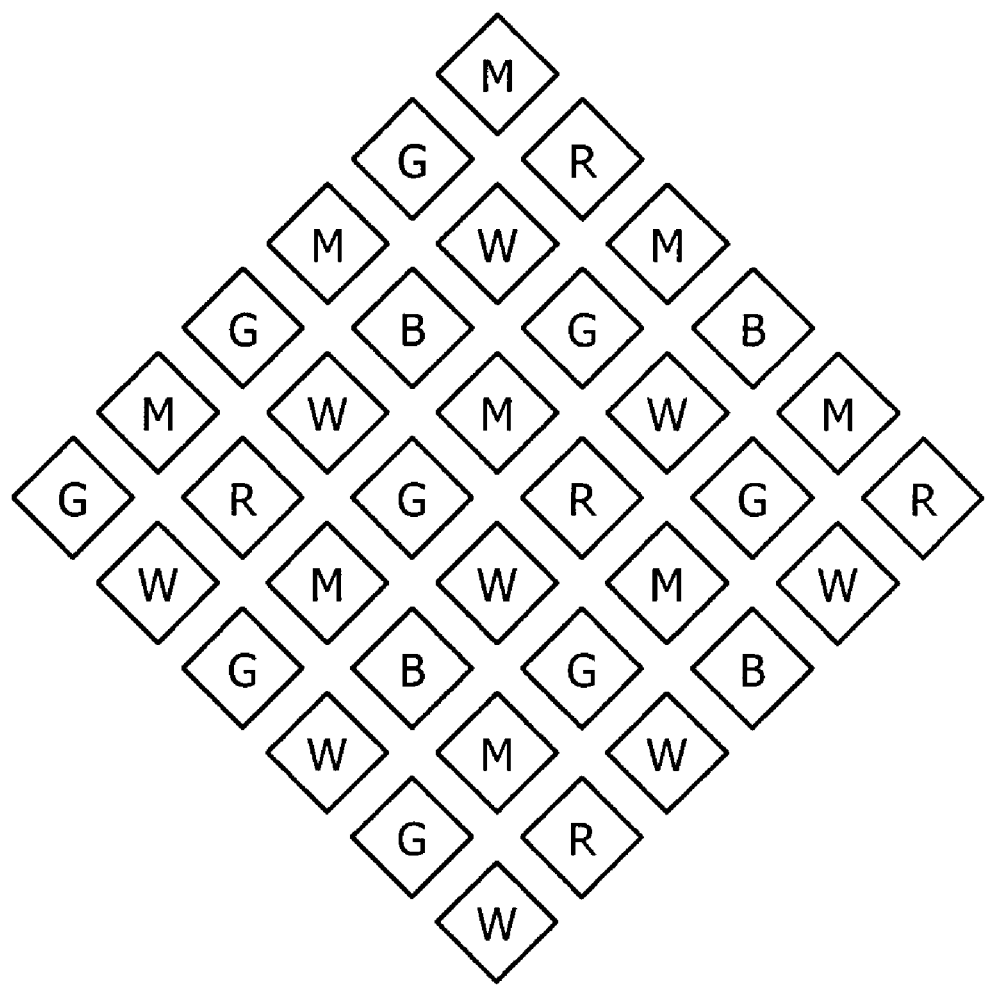
FIG. 34 illustrates a different type of color array of the color filter shown in FIG. 4.

It should be noted that setting of the color filter array may include an array structure other than one shown in FIG. 7, and an array shown in FIG. 34 may also be acceptable. The color filter array shown in FIG. 34 is equivalent to the array structure resulting from turning the array shown in FIG. 7 by 45 degrees.

Specifically, with respect to the color filter shown in FIG. 34, referring to the pixels indicated by G assuming that the X-axis direction is set as the 0-degree direction, the pixels indicated by G are disposed in every other pixel in all of the 0-degree direction, the 45-degree direction, the 90-degree direction and the 135-degree direction, wherein both the pixels adjacent in the 0-degree direction to the pixel indicated by G are of pixels indicted by B or R, both the pixels adjacent in the 90-degree direction to the pixel indicated by G are of pixels indicated by B or R, both the pixels adjacent in the 45-degree direction to the pixel indicated by G are of pixels indicted by M, and both the pixels adjacent in the 135-degree direction to the pixel indicated by G are of pixels indicated by W.

It should be noted that with respect to the color filter array shown in FIG. 34, the reversed arrangement of the W and M pixels may also allow to perform the demosaic processing in the same manner. In addition, the reversed arrangement of the B and R pixels may also allow to perform the demosaic processing in the same manner.

Specifically, the use of the color filter of a type that referring to the pixels indicated by G assuming that the X-axis direction is set as the 0-degree direction, the pixels indicated by G are disposed in every other pixel in all of the 0-degree, 45-degree, 90-degree and 135-degree directions, and other color component pixels, that is, the R, B, W and M pixels, are arranged adjacent in the respective directions so that the R and B pixels and the Wand M pixels are respectively located orthogonal to the G pixels are adaptable to perform the demosaic processing in the same manner.

It should be noted that, in the present embodiment, the demosaic processing is performed by obtaining the G component image based on the interpolation processing in the respective directions after calculating the pattern probability in the directions at four angles, 0, 45, 90 and 135 degrees. Alternatively, the present invention may also be applicable to processing which uses directions other than ones at four angles, 0, 45, 90 and 135 degrees. It is obvious that the present invention is also applicable to the processing with respect to directions at two angles, such as a pair of 0-degree direction and 90-degree direction, and a pair of 45-degree direction and 135-degree direction.

Typically, capturing of a landscape image and the like frequently results in an image containing the patterns in the 0-degree direction and the 90-degree direction with respect to an obtained image, in which case, however, there are not so much patterns in the 45-degree direction or the 135-degree direction, as compared with the patterns in the 0-degree and 90-degree directions. Thus, in order to reduce a circuit size or save an operation time, it is also allowable to perform the demosaic processing by, after calculating the pattern probability in the directions at two angles, that is, the 0-degree direction and the 90-degree direction, obtaining the G component image based on the interpolation processing in the respective directions.

The processing among the series of processing, particularly, the processing attained with the camera signal processing unit 25 is not limited to those by hardware; and it is also allowable to apply software to perform the processing. The software is installed, through the recording medium and the like, into a computer such as a computer whose dedicated hardware is integral with a program contained in the software and a general-purpose personal computer, for instance, adaptable to implement various functions through installation of various programs. In this case, the image-capture apparatus 11 previously described with reference to FIG. 4 includes a personal computer 101 as shown in FIG. 35, for instance.

Figure 35:
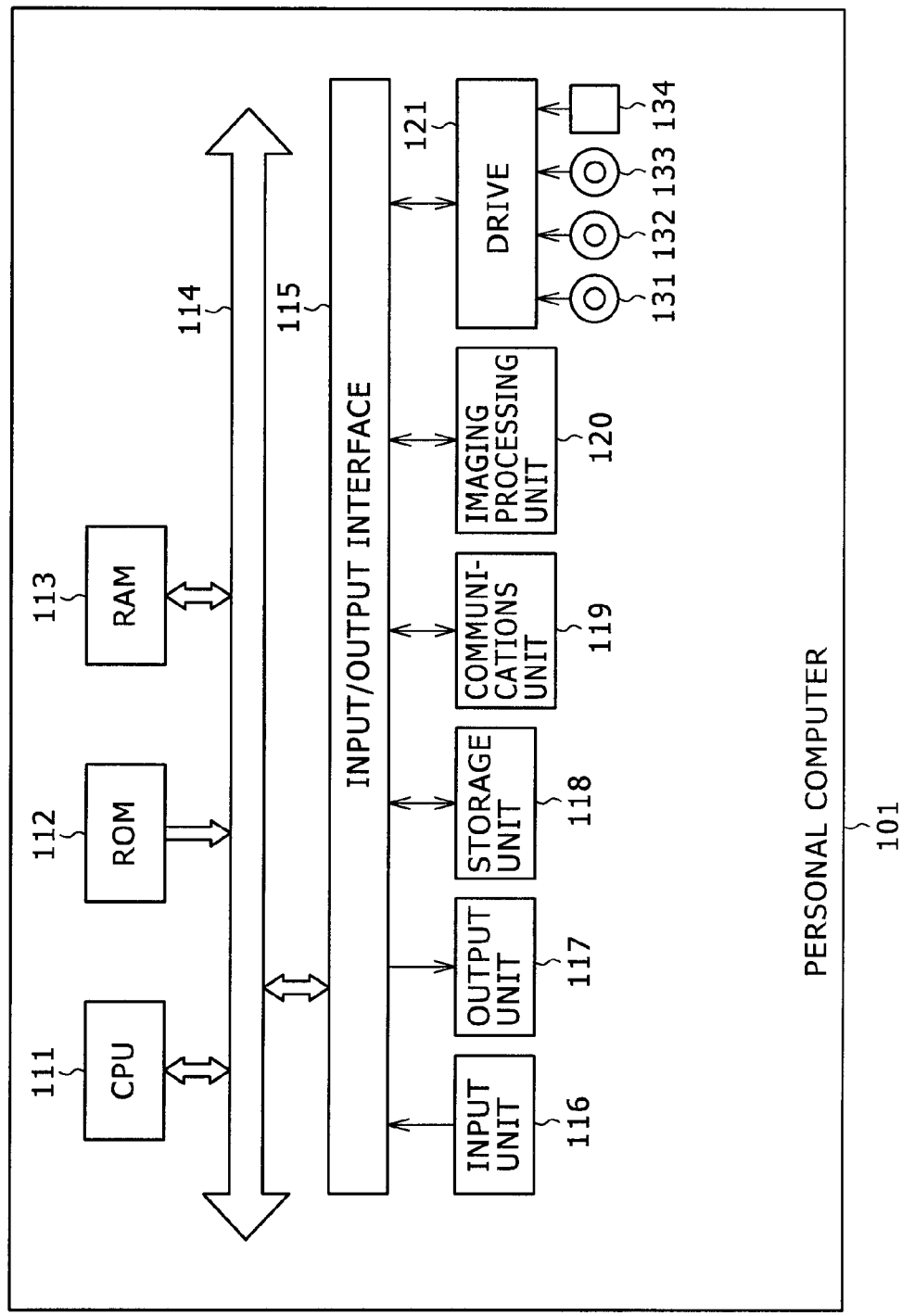
FIG. 35 is a block diagram showing a configuration of a personal computer.

Referring to FIG. 35, a CPU (Central Processing Unit) 111 performs various processing according to a program contained in a ROM (Read Only Memory) 112 or a program loaded from a storage unit 118 into a RAM (Random Access Memory) 113. Data such as those required for the CPU 111 to perform the various processing is also stored in the RAM 113 according to circumstances.

The CPU 111, the ROM 112, and RAM 113 are interconnected through a bus 114. An input/output interface 115 is also connected to the bus 114.

An input unit 116 including units such as a keyboard and a mouse, an output unit 117 including units such as a display and a speaker, the storage unit 118 including units such as a hard disk, a communications unit 119 including units such as a modem and a terminal adapter, and an image-capture processing unit 120 are all connected to the input/output interface 115. The communications unit 119 performs communication processing over a network including Internet.

The image-capture processing unit 120 is in the form of a unit having the optical lens 21, the color filter 22, the solid-state imaging device 23 and the A/D converting unit 24 previously described with reference to FIG. 4 or a unit adaptable to implement the same functions as the units, and performs the same processing as the under control of the CPU 111 having the functions of the camera signal processing unit 25 previously described with reference to FIG. 5 and the image compressing unit 27 shown in FIG. 4.

A drive 121 is also connected to the input/output interface 115 at need, and is fitted with the recording medium such as a magnetic disk 111, an optical disc 112, a magneto-optical disc 133 and a semiconductor memory 134 according to circumstances, permitting a computer program read out from the recording medium to be installed into the storage unit 118 at need.

When an attempt is made to adapt the software to perform the series of processing, the software is installed through the network and/or the recording medium into a computer such as a computer whose dedicated hardware is integral with a program contained in the software concerned, and a general-purpose personal computer adaptable to implement various functions through installation of various programs.

The recording medium includes not only program-contained package media such as the magnetic disk 111 (including floppy disks), the optical disc 112 (including CD-ROMs (Compact Disk-Read Only Memories) and DVDs (Digital Versatile Disks), the magneto-optical disc 133 (including MDs (Mini-Disks: Trade Mark) and the semiconductor memory 134 or those distributed separately from the apparatus body to supply the program to the users, but also the hard disks contained in the ROM 112 or the storage unit 118 containing the program or those supplied in the form of apparatus body-integrated media to the users.

In the present specification, the steps indicating the program recorded in the recording medium includes not only the processing that is performed in time series and in the order listed, but also the processing that is not always in time series but may be in parallel or individual manner.

The present application contains subject matters related to Japanese Patent Application No. 2006-213539 filed in Japanese Patent Office on Aug. 4, 2006, the entire content of which being incorporated herein by reference.

It should be understood by those skilled in the art that various modifications, combinations, sub-combinations, and alterations may occur depending on design requirements and other factors insofar as they are within the scope of appended claims and equivalents thereof.

What is claimed is:

1. A color filter allowing a light signal to pass through by each pixel and be incident on an imaging device, the light signal being inputted through a lens and including one of plural different spectral components, wherein:

the plural different spectral components include:

a first spectral component which has a widest frequency bandwidth among the plural different spectral components, a second spectral component corresponding to a predetermined frequency band close to a frequency that causes no chromatic aberration of the lens, and a third spectral component expressed in terms of a linear sum of a value resulting from multiplying the first spectral component by a first weighting factor and a value resulting from multiplying the second spectral component by a second weighting factor, and wherein the plural different spectral components are of five types of spectral components including the first spectral component, the second spectral component and the third spectral component, and pixels corresponding to the first spectral component and the third spectral component and pixels corresponding to a fourth spectral component and a fifth spectral component are respectively arranged adjacent to a pixel corresponding to the second spectral component in one of a 0-degree direction, a 45-degree direction, a 90-degree direction and a 135-degree direction assuming that one array direction of a plane, on which the pixels are arrayed, is set as the 0-degree direction, the pixels corresponding to the first spectral component and the third spectral component are arrayed in a direction orthogonal to the pixel corresponding to the second spectral component, and the pixels corresponding to the fourth spectral component and the fifth spectral component are arrayed in the 45 degree or the 135 degree direction from the pixel corresponding to the second spectral component.

2. The color filter according to claim 1, wherein
the first spectral component includes at least an infrared component.

3. The color filter according to claim 2, wherein
the first spectral component includes the infrared component and all frequency bands of visible light.

4. The color filter according to claim 1, wherein
the first spectral component includes all frequency bands of visible light.

5. The color filter according to claim 1, wherein
the second spectral component is a frequency component having a predetermined range that corresponds to a green component.

6. The color filter according to claim 1, wherein
the third spectral component is a spectral component resulted by excluding the second spectral component from the first spectral component.

7. The color filter according to claim 1, wherein
pixels corresponding to the second spectral component are disposed in every other pixel in all of a 0-degree direction, a 45-degree direction, a 90-degree direction and a 135-degree direction assuming that one array direction of a plane, on which the pixels are arrayed, is set as the 0-degree direction.

* * * * *